US012775865B2

(12) United States Patent
Harris

(10) Patent No.: US 12,775,865 B2
(45) Date of Patent: Oct. 27, 2026

(54) SYSTEM AND METHODS FOR SCALABLE CONTROL OF SUPERCONDUCTING QUBITS

(71) Applicant: 1372934 B.C. LTD., Burnaby (CA)

(72) Inventor: Richard G. Harris, North Vancouver (CA)

(73) Assignee: 1372934 B.C. LTD., Burnaby (CA)

( * ) Notice: Subject to any disclaimer, the term of this patent is extended or adjusted under 35 U.S.C. 154(b) by 3 days.

(21) Appl. No.: 18/879,188

(22) PCT Filed: Jun. 27, 2023

(86) PCT No.: PCT/US2023/069136
§ 371 (c)(1),
(2) Date: Dec. 26, 2024

(87) PCT Pub. No.: WO2024/172854
PCT Pub. Date: Aug. 22, 2024

(65) Prior Publication Data

US 2025/0390777 A1 Dec. 25, 2025

Related U.S. Application Data

(60) Provisional application No. 63/448,414, filed on Feb. 27, 2023, provisional application No. 63/390,185, filed on Jul. 18, 2022, provisional application No. 63/356,663, filed on Jun. 29, 2022.

(51) Int. Cl.
*G06N 10/40* (2022.01)

(52) U.S. Cl.
CPC .................................... *G06N 10/40* (2022.01)

(58) Field of Classification Search
CPC ........ G06N 10/40; G06N 10/00; G06N 10/20; G06N 10/80; H10N 60/10; H10N 60/12; H03K 17/92
USPC .......................................................... 327/527
See application file for complete search history.

(56) References Cited

U.S. PATENT DOCUMENTS 6,128,764 A 10/2000 Gottesman
6,317,766 B1 11/2001 Grover
7,533,068 B2 5/2009 Maassen van den Brink
7,843,209 B2 11/2010 Berkley
8,169,231 B2 5/2012 Berkley
(Continued)

FOREIGN PATENT DOCUMENTS

WO 2009143166 A2 11/2009
WO 2022066176 A1 3/2022

OTHER PUBLICATIONS

Ataides, et al., "The XZZX surface code", Nature Communications, https://doi.org/10.1038/s41467-021-22274-1,. 2021, 12 pages.
(Continued)

*Primary Examiner* — Hai L Nguyen
(74) *Attorney, Agent, or Firm* — Cozen O'Connor

(57) ABSTRACT

A system and associated method for scalable two-dimensional surface code comprises four sub-lattices of qubits, each selectively controlled by a set of analog lines. Eight sets of analog lines selectively control eight sets of inter-qubit couplers. The qubits and couplers have response homogenization devices comprising control structures to apply analog signals and DACs to apply static bias to qubits and couplers. A second surface code layer compensates for defective qubits.

69 Claims, 38 Drawing Sheets

(56) References Cited

U.S. PATENT DOCUMENTS

| | | | | |
|---|---|---|---|---|
| 8,174,305 | B2 | 5/2012 | Harris | |
| 9,361,169 | B2 | 6/2016 | Berkley | |
| 10,938,346 | B2 | 3/2021 | Berkley | |
| 11,182,230 | B2 | 11/2021 | Berkley | |
| 11,730,066 | B2 * | 8/2023 | Johnson | H10N 60/124 257/31 |
| 12,519,471 | B2 * | 1/2026 | Whittaker | G06N 10/40 |
| 2004/0071019 | A1 | 4/2004 | Magnus | |
| 2016/0033558 | A1 | 2/2016 | Jackson | |
| 2016/0071021 | A1 | 3/2016 | Raymond | |
| 2017/0256698 | A1 | 9/2017 | Nayfeh | |
| 2019/0303242 | A1 | 10/2019 | Kapit | |
| 2020/0401924 | A1 | 12/2020 | Paik | |
| 2021/0027188 | A1 | 1/2021 | Nickerson | |
| 2021/0365827 | A1 | 11/2021 | Monroe | |
| 2021/0374588 | A1 | 12/2021 | Gidney | |
| 2022/0123048 | A1 | 4/2022 | Swenson | |
| 2022/0147856 | A1 | 5/2022 | Kliuchnikov | |
| 2023/0106489 | A1 | 4/2023 | Harris | |

OTHER PUBLICATIONS

Auger, et al., "Fault-tolerance thresholds for the surface code with fabrication errors", arXiv:1706.04912v1, Jun. 15, 2017.

Barends, et al., "Logic Gates at the Surface Code Threshold: Superconducting Qubits Poised for Fault-tolerant Quantum Computing", arXiv:1402.4848 [quant-ph], 2014.

Barrett, et al., "Fault Tolerant Quantum Computation with Very High Threshold for Loss Errors", Phys. Rev. Lett. 105, 200502—Published Nov. 9, 2010, 4 pages.

Benjamin, et al., "Quantum Computing Without Local Control Of Qubit-Qubit Interactions", 2001.

Blais, et al., Cavity Quantum Electrodynamics for Superconducting Electrical Circuits: an Architecture for Quantum Computationl, arXiv: cond-mat/0402216v1 [cond-mat.mes-hall], Feb. 7.

Bravyi, et al. "Universal quantum computation with ideal Clifford gates and noisy ancillas", arXiv:quant-ph/0403025v2, Dec. 16, 2004.

Brown, et al., "A fault-tolerant non-Clifford gate for the surface code in two dimensions", Science Advances, May 22, 2020, vol. 6, Issue 21, 25 pages.

Chamberland, et al., "Building A Fault-Tolerant Quantum Computer Using Concatenated Cat Codes", 2022.

Chancellor, et al., "Scalable Universal Holonomic Quantum Computation Realized with an Adiabatic Quantum Data Bus and Potential implementation using Superconducting Flux Qubits", arXiv:1301.7100v3 [quant-ph], Mar. 21, 2013.

Chow, et al., "Complete Universal Quantum Gate Set Approaching Fault-tolerant Thresholds with Superconducting Qubits", arXiv:1202.5344v1 [quant-ph], Feb. 23, 2012.

Fowler, et al., "Surface codes: towards practical large-scale quantum computation"; Phys. Rev. A 86, 032324—Published Sep. 18, 2012, 5 pages.

Gottesman, et al., "Stabilizer Codes and Quantum Error Correction"; arXiv:quant-ph/9705052v1, 1997.

Harris, et al., "A Compound Josephson Junction Coupler for Flux Qubits with Minimal Crosstalk", arXiv:0904.3784v3, Jul. 16, 2009.

Horsman, et la., "Surface code quantum computing by lattice surgery", 2012 Journal of Physics, 14 123011, 28 pages.

Kelly, et al. "Fault-tolerant Superconducting Qubits, Ph.D. Thesis in Physics", UC Santa Barbara, 2015, https://escholarship.org/uc/item/5mn8f7tn.

Kjaergaard, et al., "Superconducting Qubits: Current State of Play|" arXiv:1905.13641v1, May 31, 2019.

Knill, et al., "QCSchemes", arXiv:quant-ph/0402171v1, Feb. 23, 2004, 17 pages.

Knill, et al., "QCThresholdAnalysis", arXiv:quantum-ph/0404104v1, 2004.

Kulik, et al., "Quantum Computational Gates With Radiation Free Couplings", WWW.arXiv.org preprint1 cond-mat/0203313 v1 (Mar. 14, 2002).

Lechner, et al., "A Quantum Annealing Architecture with All-to-all Connectivity from Local Interactions", Science Advances, vol. 1, No. 9, Oct. 23, 2015.

Lidar, et al., "Quantum Codes for Simplifying Design and Suppressing Decoherence in Superconducting Phase-Qubits", Quant. Inf. Proc. 1, pp. 155-182, 2002.

Lidar, et al., "Reducing Constraints on Quantum Computer Design by Encoded Selective Recoupling", Phys. Rev. Lett. 88, 017905, pp. 1-4, 2002.

Lintinski, et all. "A Game of Surface Codes: Large-Scale Quantum Computing with Lattice Surgery", arXiv:1808.02892v3, Feb. 3, 2019.

Manucharyan, et al., "Fluxonium: single Cooper pair circuit free of charge offsets", arXiv: 0906.0831v2, Oct. 20, 2009.

Nagayama, et al., "Surface code error correction on a defective lattice", IOP Publishing, New J. Phys. 19 (2017) 29 pages.

Neven, et al., "Supressing quantum errors by scaling a surface code logical qubits", arXiv:2207.06431v1, Jul. 13, 2022.

Nguyen, et al., "Scalable High-Performance Fluxonium Quantum Processor", 2022.

Raussendorf, et al, "Fault-tolerant quantum computation with high threshold in two dimensions", arXiv:quant-ph/0610082v2, May 14, 2007.

Tang, et al., "Robust surface code topology against sparse fabrication defects in a superconducting-qubit array", Phys. Rev. A 93. 032322—Published Mar. 15, 2016 (2018), 4 pages.

Yan, et al., "A tunable coupling scheme for implementing high-fidelity two-qubit gates", arXiv: 1803.09813v1, Mar. 26, 2018.

The Partial Supplementary European Search Report mailed Apr. 8, 2026, for European Application No. 23923154.1, 20 pages.

Hill, "A Surface Code Quantum Computer in Silicon", Science advances, 1(9), p. e1500707, Oct. 30, 2015.

* cited by examiner

SYSTEM AND METHODS FOR SCALABLE CONTROL OF SUPERCONDUCTING QUBITS

CROSS-REFERENCES TO RELATED APPLICATIONS

This patent application claims priority of U.S. Patent Application No. 63/356,663, filed on Jun. 29, 2022, this patent application also claims priority of U.S. Patent Application No. 63/390,185, filed on Jul. 18, 2022, this patent application also claims priority of U.S. Patent Application No. 63/448,414, filed on Feb. 27, 2023, the entire disclosures of which are hereby incorporated by reference herein for all purposes.

FIELD

This disclosure generally relates to scalable control of superconducting qubits, and in particular, to scalable control of superconducting qubits that implement surface code.

BACKGROUND

Hybrid Computing System Comprising a Quantum Processor

A hybrid computing system can include a digital or classical computer communicatively coupled to an analog computer. In some implementations, the analog computer is a quantum computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. A quantum processor may take the form of a superconducting quantum processor. A superconducting quantum processor may include a number of superconducting qubits and associated local bias devices. A superconducting quantum processor may also include couplers (also known as coupling devices) that selectively provide communicative coupling between qubits. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

A system for scalable control is described, the system comprises: a first plurality of qubits; a second plurality of qubits; a third plurality of qubits; a fourth plurality of qubits, wherein the first, second, third and fourth plurality of qubits are arranged in a two-dimensional array, wherein at least one qubit in the first plurality of qubits and at least one qubit in the second plurality of qubits are each directly communicatively coupled to two respective qubits in the third plurality of qubits and to two respective qubits in the fourth plurality of qubits; a first set of analog lines, communicatively coupled to selectively provide analog signals to each of the qubits in the first plurality of qubits; a second set of analog lines, communicatively coupled to selectively provide analog signals to each of the qubits in the second plurality of qubits; a third set of analog lines, communicatively coupled to selectively provide analog signals to each of the qubits in the third plurality of qubits; and a fourth set of analog lines, communicatively coupled to selectively provide analog signals to each qubit in the fourth plurality of qubits. The system may further comprise: a first plurality of couplers, where each coupler of the first plurality of couplers directly communicatively couples either a respective qubit in the first plurality of qubits to a respective qubit in the third plurality of qubits or a respective qubit in the second plurality of qubits to a respective qubit in the third plurality of qubits; and a second plurality of couplers, where each coupler in the second plurality of couplers directly communicatively couples either a respective qubit in the first plurality of qubits to a respective qubit in the fourth plurality of qubits or a respective qubit in the second plurality of qubits to a respective qubit in the fourth plurality of qubits. Each qubit in the first, second, third, and fourth pluralities of qubits may be a respective fluxonium qubit. Each fluxonium qubit may comprise a respective kinetic inductor, the kinetic inductor comprising a segment of kinetic inductance material. Each qubit in the first, second, third and fourth pluralities of qubits is a respective transmon qubit. Each qubit in the first and second pluralities of qubits is a respective data qubit; each qubit in the third and fourth pluralities of qubits is a respective stabilizer qubit; and each stabilizer qubit is operable to perform parity measurements on nearest-neighbor data qubits. Each set of analog lines in the first, second, third and fourth sets of analog lines may comprise a respective first very high frequency (VHF) control line. The first VHF control line in the first set of analog lines may be inductively coupled to a qubit body of each qubit in the first plurality of qubits to control rotations about an axis in an XY-plane of a Bloch sphere; the first VHF control line in the second set of analog lines may be inductively coupled to a qubit body of each qubit in the second plurality of qubits to control rotations about an axis in the XY-plane of the Bloch sphere; the first VHF control line in the third set of analog lines may be inductively coupled to a qubit body of each qubit in the third plurality of qubits to control rotations about an axis in the XY-plane of the Bloch sphere; and the first VHF control line in the fourth set of analog lines may be inductively coupled to a qubit body of each qubit in the fourth plurality of qubits to control rotations about an axis in the XY-plane of the Bloch sphere. Each set of analog lines in the first, second, third and fourth sets of analog lines may further comprise: a respective second VHF control line; and at least one respective analog bias line. The respective second VHF control line in the first set of analog lines may be inductively coupled to a compound Josephson junction (CJJ) of each qubit in the first plurality of qubits to control rotations about a Z-axis of a Bloch sphere; the respective second VHF control line in the second set of analog lines may be inductively coupled to a CJJ of each qubit in the second plurality of qubits to control rotations about the Z-axis of the Bloch sphere; the respective second VHF control line in the third set of analog lines may be inductively coupled to a CJJ of each qubit in the third plurality of qubits to control rotations about the Z-axis of the Bloch sphere; and the respective second VHF control line in the fourth set of analog lines may be inductively coupled to a CJJ of each qubit in the fourth plurality of qubits to control rotations about the Z-axis of the Bloch sphere. The at least one respective analog bias line in the first, second, third and fourth set of analog lines may be inductively coupled to a respective compound-compound Josephson junction (CCJJ) in each qubit in the first, second, third and fourth pluralities of qubits. Each qubit in the first, second, third, and fourth pluralities of qubits the system may further comprise: a respective first control structure communicatively coupled to a respective qubit body of each qubit in the first, second, third, and fourth pluralities of qubits, and operable to apply analog signals to the respective qubit body of each qubit in the first, second, third, and fourth pluralities of qubits from one of the first, second, third, and fourth sets of analog lines; a respective first digital to analog converter (DAC) communicatively coupled to a respective qubit body of each qubit in the first, second, third, and fourth pluralities of qubits and operable to apply static bias to the respective qubit body of each qubit in the first, second, third, and fourth pluralities of qubits; a respective second control structure communicatively coupled to a respective compound-compound Josephson junction (CCJJ) of each qubit in the first, second, third, and fourth pluralities of qubits and operable to apply analog signals to the respective CCJJ of each qubit in the first, second, third, and fourth pluralities of qubits from one of the first, second, third, and fourth sets of analog lines; and a respective second DAC communicatively coupled to a respective CCJJ of each qubit in the first, second, third, and fourth pluralities of qubits and operable to apply static bias to the respective CCJJ of each qubit in the first, second, third, and fourth pluralities of qubits.

A system for scalable control is described. The system comprises: a first plurality of qubits; a second plurality of qubits; a third plurality of qubits; a fourth plurality of qubits, wherein at least one qubit in the first plurality of qubits and at least one qubit in the second plurality of qubits are each directly communicatively coupled to two respective qubits in the third plurality of qubits and to two respective qubits in the fourth plurality of qubits; a first plurality of couplers, each coupler in the first plurality of couplers directly communicatively couples either a respective one of the first plurality of qubits to a respective one of the third plurality of qubits or a respective one of the second plurality of qubits to a respective one of the third plurality of qubits; a second plurality of couplers, each of the second plurality of couplers directly communicatively couples either a respective one of the first plurality of qubits to a respective one of the fourth plurality of qubits or a respective one of the second plurality of qubits to a respective one of the fourth plurality of qubits; a first set of analog coupler lines, each line in the first set of analog coupler lines coupled to selectively provide a first analog signal to a respective coupler in a first subset of the second plurality of couplers; a second set of analog coupler lines, each line in the second set of analog coupler lines coupled to selectively provide a second analog signal to a respective coupler in a second subset of the second plurality of couplers; a third set of analog coupler lines, each line in the third set of analog coupler lines coupled to selectively provide a third analog signal to a respective coupler in a third subset of the second plurality of couplers; a fourth set of analog coupler lines, each line in the fourth set of analog coupler lines coupled to selectively provide a fourth analog signal to a respective coupler in a fourth subset of the second plurality of couplers; a fifth set of analog coupler lines, each line in the fifth set of analog coupler lines coupled to selectively provide a fifth analog signal to a respective coupler in a first subset of the first plurality of couplers; a sixth set of analog coupler lines, each line in the sixth set of analog coupler lines coupled to selectively provide a sixth analog signal to a respective coupler in a second subset of the first plurality of couplers; a seventh set of analog coupler lines, each line in the seventh set of analog coupler lines coupled to selectively provide a seventh analog signal to a respective coupler in a third subset of the first plurality of couplers; and an eighth set of analog coupler lines, each line in the eighth set of analog coupler lines coupled to selectively provide an eighth analog signal to a respective coupler in a fourth subset of the first plurality of couplers. Each qubit in the first, second, third and fourth pluralities of qubits may be a respective fluxonium qubit. Each fluxonium qubit may comprise a respective kinetic inductor, the kinetic inductor comprising a segment of kinetic inductance material. Each qubit in the first, second, third and fourth pluralities of qubits may be a respective transmon qubit. Each qubit in the first and second pluralities of qubits is a data qubit; and each qubit in the third and fourth pluralities of qubits is a stabilizer qubit, wherein each stabilizer qubit is operable to perform parity measurement on nearest-neighbor data qubits. Each analog line in the first, second, third, fourth, fifth, sixth, seventh and eighth sets of analog coupler lines may comprise a respective very high frequency (VHF) line. Each VHF line in the first, second, third, fourth, fifth, sixth, seventh and eighth sets of analog coupler lines may be operable to apply a control pulse with a low and a high operating level to a respective coupler in the first and second pluralities of couplers. Each analog line in the first, second, third, fourth, fifth, sixth, seventh and eighth set of analog coupler lines may further comprise at least one additional analog line. Each coupler in the first and second pluralities of couplers the system may further comprise: a respective first digital to analog converter (DAC) communicatively coupled to a respective coupler body of each coupler in the first and second pluralities of couplers and operable to apply a static bias to the respective coupler body of each coupler in the first and second pluralities of couplers; a respective control structure communicatively coupled to a respective compound-compound Josephson junction (CCJJ) of each coupler in the first and second pluralities of couplers and operable to apply analog signals to the respective CCJJ of each coupler in the first and second pluralities of couplers from one of the first, second, third, fourth, fifth, sixth, seventh, and eighth sets of analog lines; and a respective second DAC communicatively coupled to a respective CCJJ of each coupler in the first and second pluralities of couplers and operable to apply static bias to the respective CCJJ of each coupler in the first and second pluralities of couplers.

A method to operate a quantum processor is described. The quantum processor comprises: a first plurality of qubits; a second plurality of qubits; a third plurality of qubits; fourth plurality of qubits, wherein at least one qubit in the first plurality of qubits and at least one qubit in the second plurality of qubits are directly communicatively coupled to two respective qubits in the third plurality of qubits and to two respective qubits in the fourth plurality of qubits; a first plurality of couplers, each coupler in the first plurality of couplers provides direct communicative coupling between either a respective one of the first plurality of qubits and a respective one of the third plurality of qubits or a respective one of the second plurality of qubits and a respective one of the third plurality of qubits; and a second plurality of couplers, each of the second plurality of couplers provides direct communicative coupling between either a respective one of the first plurality of qubits and a respective one of the fourth plurality of qubits or a respective one of the second plurality of qubits and a respective one of the fourth plurality of qubits. The method is executed by a digital processor communicatively coupled to the quantum processor. The method comprises: applying a pulse signal to qubits in the third and fourth pluralities of qubits to initialize the qubits in the third and fourth pluralities of qubits to a respective ground state of the qubits in the third and fourth pluralities of qubits; applying a Hadamard transformation to qubits in the third plurality of qubits; concurrently applying: a first CNOT gate using the qubits in the second plurality of qubits as a control and using qubits in the fourth plurality of qubits as a target, and a second CNOT gate using qubits in the first plurality of qubits as a target and the qubits in the third plurality of qubits as a control; concurrently applying: a third CNOT gate using the qubits in the first plurality of qubits as a control and using qubits in the fourth plurality of qubits as a target, and a fourth CNOT gate using qubits in the second plurality of qubits as a target and the qubits in the third plurality of qubits as a control; concurrently applying: a fifth CNOT gate using the qubits in the first plurality of qubits as a control and using qubits in the fourth plurality of qubits as a target, and a sixth CNOT gate using qubits in the second plurality of qubits as a target and the qubits in the third plurality of qubits as a control; concurrently applying: a seventh CNOT gate using the qubits in the second plurality of qubits as a control and using qubits in the fourth plurality of qubits as a target, and an eighth CNOT gate using qubits in the first plurality of qubits as a target and the qubits in the third plurality of qubits as a control; applying a Hadamard transformation to qubits in the third plurality of qubits; and reading out a respective state of each of the qubits in the third and fourth pluralities of qubits. The quantum processor may further comprises: a first set of analog lines, communicatively coupled to selectively provide a first analog signal to each qubit in the first plurality of qubits; a second set of analog lines, communicatively coupled to selectively provide a second analog signal to each qubit in the second plurality of qubits; a third set of analog lines, communicatively coupled to selectively provide a third analog signal to each qubit in the third plurality of qubits; a fourth set of analog lines, communicatively coupled to selectively provide a fourth analog signal to each qubit in the fourth plurality of qubits; a first set of analog coupler lines, each line in the first set of analog coupler lines communicatively coupled to selectively provide analog signals to a respective coupler in a first subset of the second plurality of couplers; a second set of analog coupler lines, each line in the second set of analog coupler lines communicatively coupled to selectively provide analog signals to a respective coupler in a second subset of the second plurality of couplers; a third set of analog coupler lines, each line in the third set of analog coupler lines communicatively coupled to selectively provide analog signals to a respective coupler in a third subset of the second plurality of couplers; and a fourth set of analog coupler lines, each line in the first set of analog coupler lines communicatively coupled to selectively provide analog signals to a respective coupler in a fourth subset of the second plurality of couplers, and wherein each set of analog lines in the first, second, third, and fourth sets of analog lines comprises a respective very high frequency (VHF) control line. Applying a signal to at least one qubit in the third and fourth pluralities of qubits to initialize the at least one qubit in the third and fourth plurality of qubits to a respective ground state of the at least one qubit in the third and fourth plurality of qubits may include applying a large-amplitude tilt to a respective qubit body of the at least one qubit in the third and fourth pluralities of qubits via a respective first VHF control line, wherein applying a signal to the at least one qubit in the third plurality of qubits includes applying a very high frequency signal to a qubit body of the at least one qubit in the third plurality of qubits via a respective VHF control line. The quantum processor further comprises: a fifth set of analog coupler lines, each line in the fifth set of analog coupler lines communicatively coupled to selectively provide analog signals to a respective coupler in a first subset of the first plurality of couplers; a sixth set of analog coupler lines, each line in the sixth set of analog coupler lines communicatively coupled to selectively provide analog signals to a respective coupler in a second subset of the first plurality of couplers; a seventh set of analog coupler lines, each line in the seventh set of analog coupler lines communicatively coupled to selectively provide analog signals to a respective one coupler in a third subset of the first plurality of couplers; and an eighth set of analog coupler lines, each line in the eighth set of analog coupler lines communicatively coupled to selectively provide analog signals to a respective coupler in a fourth subset of the first plurality of couplers, wherein each analog line in the first through eighth sets of analog coupler lines comprises a respective VHF line. Concurrently applying a first CNOT gate using the qubits in the second plurality of qubits as a control and using the qubits in the fourth plurality of qubits as a target, and a second CNOT gate using the qubits in the first plurality of qubits as a target and the qubits in the third plurality of qubits as a control may include applying a very high frequency signal to the couplers in the first plurality of couplers via a VHF line in the fifth set of analog coupler lines, and applying a very high frequency signal to the couplers in the second plurality of couplers via a VHF line in the first set of analog coupler lines. Currently applying a third CNOT gate using the qubits in the first plurality of qubits as a control and using the qubits in the fourth plurality of qubits as a target, and a fourth CNOT gate using the qubits in the second plurality of qubits as a target and the qubits in the third plurality of qubits as a control may include applying a very high frequency signal to the couplers in the first plurality of couplers via a VHF line in the sixth set of analog coupler lines, and applying a very high frequency signal to the couplers in the second plurality of couplers via a VHF line in the second set of analog coupler lines Concurrently applying a fifth CNOT gate using the qubits in the first plurality of qubits as a control and using the qubits in the fourth plurality of qubits as a target, and a sixth CNOT gate using the qubits in the second plurality of qubits as a target and the qubits in the third plurality of qubits as a control may include applying a very high frequency signal to the couplers in the first plurality of couplers via a VHF line in the seventh set of analog coupler lines, and applying a very high frequency signal to the couplers in the second plurality of couplers via a VHF line in the third set of analog coupler lines. Concurrently applying a seventh CNOT gate using the qubits in the second plurality of qubits as a control and using the qubits in the fourth plurality of qubits as a target, and an eighth CNOT gate using the qubits in the first plurality of qubits as a target and the qubits in the third plurality of qubits as a control may include applying a very high frequency signal to the couplers in the first plurality of couplers via a VHF line in the eighth set of analog coupler lines, and applying a very high frequency signal to the couplers in the second plurality of couplers via a VHF line in the fourth set of analog coupler lines.

A quantum processor comprises one or more quantum logic units, each quantum logic unit respectively comprising: a plurality of physical qubits; a plurality of couplers, each coupler providing controllable coupling between a pair of physical qubits of the plurality of physical qubits; a plurality of logical qubits, each logical qubit comprising a subset of the physical qubits of the plurality of physical qubits coupled together, at least one logical qubit of the plurality of logical qubits comprising one or more 2-local interaction registers; a shift register comprising one or more logical qubits of the plurality of logical qubits; and a plurality of merge blocks connecting two or more adjacent logical qubits of the plurality of logical qubits; wherein the shift register is selectively communicatively coupled to the one or more 2-local interaction registers by a merge block of the plurality of merge blocks. Each logical qubit may comprise one or more control lines that provide a shared control bias to the at least a subset of the physical qubits in the respective logical qubit. The shift register may comprise a plurality of logical qubits selectively coupled by one or more merge blocks of the plurality of merge blocks. Each merge block of the plurality of merge blocks may contain at least one line of physical qubits. Each merge block may comprise one or more control lines that provide a shared control bias to the at least one line of physical qubits. The plurality of physical qubits may comprise data qubits and error measurement qubits. In use, the data qubits contain quantum computation information, and the measurement qubits comprise parity enforcers. The quantum processor may further comprise a memory block in communication with the shift register. The one or more 2-local interaction registers may connect the shift register and one or more memory blocks. The one or more 2-local interaction registers may provide XX, XY, XZ, YY, YZ, and ZZ interactions. The one or more 2-local interaction registers that provide XY, XZ, YY, and YZ interactions may comprise rectangular logical qubits with mixed boundary conditions. The one or more 2-local interaction registers that provide XX and ZZ interactions may connect shift register stages to one another and connect shift register stages to one or more memory blocks. The 2-local interaction registers that provide XX and ZZ interactions may comprise merge blocks of the plurality of merge blocks. In use, the quantum processor may further comprise at least one error-corrected single qubit operation block that is not in a Clifford group. The at least one error-corrected single qubit operation block may comprise a magic state distillation module. The quantum processor may comprise two or more communicatively coupled quantum logic units.

A method of operation in a quantum processor is described. The method comprises: inducing a signal in one or more target data blocks control lines to initialize a target data block, the target data block comprising a first set of one or more logical qubits, the target data block being nominally empty; inducing a signal in one or more merge block control lines to activate a merge block, the merge block comprising at least one line of physical qubits, the merge block connecting the target data block to a source data block, the source data block comprising a second set of one or more logical qubits and containing data; running a plurality of surface code cycles over the target data block, the merge block, and the source data block to move data from the source data block to the target data block through the merge block; and measuring the second set of logical qubits comprising the source data block and the at least one line of physical qubits comprising the merge block. Running a plurality of surface code cycles may comprise running d surface code cycles, wherein d comprises a minimum number of data qubits that must be simultaneously bit or phase flipped to realize either a logical X operation or a logical Z operation. The data may be moved across a Z-edge to perform a merge operation corresponding to a ZZ measurement, wherein, to perform the merge operation the method may include: inducing a signal in one or more target data blocks control lines to initialize a target data block comprises inducing the signal in the one or more target data blocks control lines to initialize the first set of one or more logical qubits in a $|+\rangle$ state; inducing a signal in one or more merge block control lines to activate a merge block comprises inducing the signal in the one or more merge block control lines to initialize the at least one line of physical qubits of the merge block in a $|+\rangle$ state; and measuring the second set of logical qubits comprising the source data block and the at least one line of physical qubits comprising the merge block comprises measuring the second set of logical qubits comprising the source data block and the at least one line of physical qubits comprising the merge block in an X basis. The data may be moved across a X-edge to perform a merge operation corresponding to a XX measurement, wherein, to perform the merge operation the method may include: inducing a signal in one or more target data blocks control lines to initialize a target data block comprises inducing the signal in the one or more target data blocks control lines to initialize the first set of one or more logical qubits in a $|0\rangle$ state; inducing a signal in one or more merge block control lines to activate a merge block comprises inducing the signal in the one or more merge block control lines to initialize the at least one line of physical qubits of the merge block in a $|0\rangle$ state; and measuring the second set of logical qubits comprising the source data block and the at least one line of physical qubits comprising the merge block comprises measuring the second set of logical qubits comprising the source data block and the at least one line of physical qubits comprising the merge block in a Z basis. The method may further comprise measuring one or more logical qubits of the first set of logical qubits, the one or more logical qubits having not received any of the data. Inducing a signal in one or more target data block control lines to initialize a target data block may comprise inducing the signal in a shift register, the shift register comprising the one or more target data blocks. Inducing a signal in one or more target data block control lines to initialize a target data block may comprise inducing the signal in a 2-local interaction register, the 2-local interaction register comprising the one or more target data blocks. Inducing a signal in a 2-local interaction register may comprise inducing the signal in one of a XX, XY, XZ, YY, YZ, and ZZ interaction register.

A quantum processor comprises: a first surface code layer; a second surface code layer, wherein each of the first and the second surface code layer respectively comprises: a first plurality of qubits; a second plurality of qubits; a third plurality of qubits; a fourth plurality of qubits, wherein the first, second, third and fourth plurality of qubits are arranged in a two-dimensional array; and a plurality of inter-layer couplers; wherein each coupler in the plurality of inter-layer couplers directly communicatively couples one of: a respective one qubit in the first plurality of qubits in the first surface code layer and a respective one qubit in the first plurality of qubits in the second surface code layer; a respective one qubit in the second plurality of qubits in the first surface code layer and a respective one qubit in the second plurality of qubits in the second surface code layer; a respective one qubit in the third plurality of qubits in the first surface code layer and a respective one qubit in the third plurality of qubits in the second surface code layer; and or a respective one qubit in the fourth plurality of qubits in the first surface code layer and a respective one qubit in the fourth plurality of qubits in the second surface code layer. The quantum processor may further comprise: a first plurality of couplers, each coupler of the first plurality of couplers providing communicative coupling between either a respective one qubit in the first plurality of qubits and a respective one qubit in the third plurality of qubits or a respective one qubit in the second plurality of qubits and a respective one qubit in the third plurality of qubits; and a second plurality of couplers, each coupler in the second plurality of couplers providing communicative coupling between either a respective one qubit in the first plurality of qubits and a respective one qubit in the fourth plurality of qubits or a respective one qubit in the second plurality of qubits and a respective one qubit in the fourth plurality of qubits. Each qubit in the first and the second plurality of qubits in the first and the second surface code layer is a respective data qubit; and each qubit in the third and fourth plurality of qubit in the first and the second surface code layer is a respective stabilizer qubit, and each qubit in the third and fourth plurality of qubits in the first and the second surface code layer is operable to perform parity measurements on nearest-neighbor data qubits. Each of the first and the second surface code layer may further comprise: a first set of analog lines, selectively communicatively coupled to each of the qubits in the first plurality of qubits to transmit analog signals to each of the qubits in the first plurality of qubits; a second set of analog lines, selectively communicatively coupled to each of the qubits in the second plurality of qubits to transmit analog signals to each of the qubits in the second plurality of qubits; a third set of analog lines, selectively communicatively coupled to each of the qubits in the third plurality of qubits to transmit analog signals to each of the qubits in the third plurality of qubits; and a fourth set of analog lines, selectively communicatively coupled to each qubit in the fourth plurality of qubits to transmit analog signals to each qubit in the fourth plurality of qubits. Each of the first and the second surface code layer may further respectively comprise: a first set of analog coupler lines, each line in the first set of analog coupler lines operable to transmit an analog signal to a respective one coupler in a first subset of the second plurality of couplers; a second set of analog coupler lines, each line in the second set of analog coupler lines operable to transmit an analog signal to a respective one coupler in a second subset of the second plurality of couplers; a third set of analog coupler lines, each line in the third set of analog coupler lines operable to transmit an analog signal to a respective one coupler in a third subset of the second plurality of couplers; a fourth set of analog coupler lines, each line in the first set of analog coupler lines operable to transmit an analog signal to a respective one coupler in a fourth subset of the second plurality of couplers; a fifth set of analog coupler lines, each line in the fifth set of analog coupler lines operable to transmit an analog signal to a respective one coupler in a first subset of the first plurality of couplers; a sixth set of analog coupler lines, each line in the sixth set of analog coupler lines operable to transmit an analog signal to a respective one coupler in a second subset of the first plurality of couplers; a seventh set of analog coupler lines, each line in the seventh set of analog coupler lines operable to transmit an analog signal to a respective one coupler in a third subset of the first plurality of couplers; and an eighth set of analog coupler lines, each line in the eighth set of analog coupler lines operable to transmit an analog signal to a respective one coupler in a fourth subset of the first plurality of couplers. Each set of analog lines in the first, the second, the third and the fourth set of analog lines may comprise a respective time-dependent control line. Each line in the first the second, the third, the fourth, the fifth, the sixth, the seventh, and the eighth set of analog coupler lines may comprises a respective very high frequency (VHF) line. The quantum processor may further comprise: a first inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a second inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a third inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a fourth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a fifth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer; a sixth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; a seventh inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; and an eighth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer; and wherein each coupler in the plurality of inter-layer couplers further comprises four adiabatic quantum-flux-parametrons (aQFP) switches, wherein the aQFP switches selectively control communicative coupling of the inter-layer coupler to qubits of the first and the second surface code layers. Each of the first, the second, the third, the fourth, the fifth, the sixth, the seventh, and the eighth inter-layer coupler control line may be a respective VHF line.

A method to operate a quantum processor is described. The quantum processor comprises a first surface code layer and a second surface code layer, wherein each of the first and second surface code layer comprises: a first plurality of qubits; a second plurality of qubits; a third plurality of qubits; fourth plurality of qubits, wherein a respective qubit in the first plurality of qubits and a respective qubit in the second plurality of qubits are each directly communicatively coupled to two respective qubits in the third plurality of qubits and to two respective qubits in the fourth plurality of qubits; and a plurality of inter-layer couplers; wherein each coupler of the plurality of inter-layer couplers directly communicatively couples one of a qubit in the first surface code layer and a respective homologous qubit in the second surface code layer. The quantum processor has at least one defective qubit in the first surface code layer. The method is executed by a digital processor communicatively coupled to the quantum processor. The method comprises: deactivating the defective qubit in the first surface code layer; activating the homologous qubit in the second surface code layer by activating inter-layer couplers between qubits in the first surface code layer directly communicatively coupled to the defective qubit and the homologous qubits in the second surface code layer; performing a surface code computation; and reading out a respective state of the qubits in the third and fourth plurality of qubits. Each of the first and second surface code layer may further comprise a respective first plurality of couplers, each coupler in the first plurality of couplers directly communicatively couples either a respective one of the first plurality of qubits and a respective one of the third plurality of qubits or a respective one of the second plurality of qubits and a respective one of the third plurality of qubits; and a second plurality of couplers, each of the second plurality of couplers directly communicatively couples either a respective one of the first plurality of qubits and a respective one of the fourth plurality of qubits or a respective one of the second plurality of qubits and a respective one of the fourth plurality of qubits. Deactivating the defective qubit in the first surface code layer may comprise: deactivating couplers in the first and second plurality of couplers between the at least one defective qubit in the first plurality of qubits and qubits in the third and the fourth plurality of qubits in the first surface code layer directly communicatively coupled to the at least one defective qubit; and activating the homologous qubit in the second surface code layer may comprise: activating inter-layer couplers between the qubits in the third and the fourth plurality of qubits in the first surface code layer that are directly communicatively coupled to the at least one defective qubit in the first plurality of qubits and respective qubits in the third and fourth plurality of qubits in the second surface code layer; and activating couplers in the first and the second plurality of couplers in the second surface code layer between qubits in the third and the fourth plurality of qubits that are coupled to an activated inter-layer couplers and a corresponding working qubit in the first plurality of qubits coupled thereto in the second surface code layer. Performing a surface code computation may comprise: applying a signal to the qubits in the third and the fourth plurality of qubits in the first surface code layer to initialize ground states of the qubits in the third and the fourth plurality of qubits; applying a Hadamard transformation to the qubits in the third plurality of qubits in the first surface code layer; for a first one of the qubits in the third plurality of qubits in the first surface code layer coupled to an activated inter-layer coupler, applying a first SWAP gate between the first one of the qubits in the third plurality of qubits in the first surface code layer and a respective first qubit in the third plurality of qubits in the second surface code layer; concurrently applying: a first CNOT gate, wherein the qubits in the second plurality of qubits in the first surface code layer are controls and the qubits in the fourth plurality of qubits in the first surface code layer are targets; and a second CNOT gate, wherein the qubits in the first plurality of qubits in the first surface code layer and the corresponding working qubit in the first plurality of qubits in the second surface code layer are targets and the qubits in the third plurality in the of qubits in the first surface code layer and the first qubits in the third plurality of qubits in the second surface code layer are controls; applying a second SWAP gate between the first one of the qubits in the third plurality of qubits in the first surface code layer coupled to the activated inter-layer coupler and the respective first qubit in the third plurality of qubits in the second surface code layer; for a first one of the qubits in the fourth plurality of qubits coupled to an activated inter-layer coupler, applying a third SWAP gate between the first one of the qubits in the fourth plurality of qubits in the first surface code layer and a respective first qubit in the fourth plurality of qubits in the second surface code layer; concurrently applying: a third CNOT gate, wherein the qubits in the first plurality of qubits in the first surface code layer and the corresponding working qubit in the first plurality of qubits in the second surface code layer are controls and the qubits in the fourth plurality of qubits in the first surface code layer and the first qubit in the fourth plurality of qubits in the second surface code layer are targets; and a fourth CNOT gate, wherein the qubits in the second plurality of qubits in the first surface code layer are targets and the qubits in the third plurality of qubits in the first surface code layer are controls; applying a fourth SWAP gate between the first one of the qubits in the fourth plurality of qubits in the first surface code layer coupled to the activated inter-layer coupler and the respective first qubit in the fourth plurality of qubits in the second surface code layer; for a second one of the qubits in the fourth plurality of qubits coupled to an activated inter-layer coupler, applying a fifth SWAP gate between the qubit in the fourth plurality of qubits in the first surface code layer and a respective second qubit in the fourth plurality of qubits in the second surface code layer; concurrently applying: a fifth CNOT gate, wherein the qubits in the first plurality of qubits in the first surface code layer and the corresponding working qubit in the first plurality of qubits in the second surface code layer are controls and the qubits in the fourth plurality of qubits in the first surface code layer and the second qubit in the fourth plurality of qubits in the second surface code layer are targets; and a sixth CNOT gate, wherein the qubits in the second plurality of qubits in the first surface code layer are targets and the qubits in the third plurality of qubits in the first surface code layer are controls; applying a sixth SWAP gate between the second one of the qubits in the fourth plurality of qubits in the first surface code layer coupled to the activated inter-layer coupler and the respective second qubit in the fourth plurality of qubits in the second surface code layer; for a second one of the qubits in the third plurality of qubits coupled to an activated inter-layer coupler, applying a seventh SWAP gate between the second qubit in the third plurality of qubits in the first surface code layer and a respective second qubit in the third plurality of qubits in the second surface code layer; concurrently applying: a seventh CNOT gate, wherein the qubits in the first plurality of qubits in the first surface code layer are controls and the qubits in the fourth plurality of qubits in the first surface code layer are targets; and an eighth CNOT gate, wherein the qubits in the second plurality of qubits in the first surface code layer and the corresponding working qubit in the first plurality of qubits in the second surface code layer are targets and the qubits in the third plurality of qubits in the first surface code layer and the second qubit in the third plurality of qubits in the second surface code layer are controls; applying an eighth SWAP gate between the second one of the qubits in the third plurality of qubits in the first surface code layer coupled to the activated inter-layer coupler and the respective second qubit in the third plurality of qubits in the second surface code layer; and applying a Hadamard transformation to the qubits in the third plurality of qubits. The quantum processor may further comprise, for each of the first and the second surface code layer, a first set of analog lines, selectively communicatively coupled to qubits in the first plurality of qubits to transmit an analog signal to each of the qubits in the first plurality of qubits; a second set of analog lines, selectively communicatively coupled to qubits in the second plurality of qubits to transmit an analog signal to each of the qubits in the second plurality of qubits; a third set of analog lines, selectively communicatively coupled to qubits in the third plurality of qubits to transmit an analog signal to each of the qubits in the third plurality of qubits; a fourth set of analog lines, selectively communicatively coupled to qubits in the fourth plurality of qubits to transmit an analog signal to each qubits in the fourth plurality of qubits. Applying a signal to the qubits in the third and the fourth plurality of qubits to initialize ground states of the qubits in the third and the fourth plurality of qubits may include applying a large-amplitude tilt to a respective qubit body of each of the qubit in the third and the fourth plurality of qubits via a respective line of a respective one of the third and the fourth set of analog lines, and applying a Hadamard transformation to the qubits in the third plurality of qubits includes applying the Hadamard transformation to the qubits in the third plurality of qubits via the third set of analog lines. Each of the first and the second surface code layer of the quantum processor may further comprises: a first set of analog coupler lines, each line in the first set of analog coupler lines operable to transmit an analog signal to a respective one coupler in a first subset of the second plurality of couplers; a second set of analog coupler lines, each line in the second set of analog coupler lines operable to transmit an analog signal to a respective one coupler in a second subset of the second plurality of couplers; a third set of analog coupler lines, each line in the third set of analog coupler lines operable to transmit an analog signal to a respective one coupler in a third subset of the second plurality of couplers; a fourth set of analog coupler lines, each line in the first set of analog coupler lines operable to transmit an analog signal to a respective one coupler in a fourth subset of the second plurality of couplers; a fifth set of analog coupler lines, each line in the fifth set of analog coupler lines operable to transmit an analog signal to a respective one coupler in a first subset of the first plurality of couplers; a sixth set of analog coupler lines, each line in the sixth set of analog coupler lines operable to transmit an analog signal to a respective one coupler in a second subset of the first plurality of couplers; a seventh set of analog coupler lines, each line in the seventh set of analog coupler lines operable to transmit an analog signal to a respective one coupler in a third subset of the first plurality of couplers; and an eighth set of analog coupler lines, each line in the eighth set of analog coupler lines operable to transmit analog signal to a respective one coupler in a fourth subset of the first plurality of couplers. Concurrently applying a first CNOT gate and a second CNOT gate may include applying a very high frequency signal to the couplers in the first plurality of couplers via a very high frequency (VHF) line in the fifth set of analog coupler lines and applying a very high frequency signal to the couplers in the second plurality of couplers via a VHF line in the first set of analog coupler lines. Concurrently applying a third CNOT gate and a fourth CNOT gate may include applying a very high frequency signal to the couplers in the first plurality of couplers via the VHF line in the sixth set of analog coupler lines, and applying a very high frequency signal to the couplers in the second plurality of couplers via the VHF line in the second set of analog coupler lines. Concurrently applying a fifth CNOT gate and a sixth CNOT gate may include applying a very high frequency signal to the couplers in the first plurality of couplers via the VHF line in the seventh set of analog coupler lines, and applying a very high frequency signal to the couplers in the second plurality of couplers via the VHF line in the third set of analog coupler lines. Concurrently applying a seventh CNOT gate and an eighth CNOT gate may includes applying a very high frequency signal to the couplers in the first plurality of couplers via the VHF line in the eighth set of analog coupler lines, and applying a very high frequency signal to the couplers in the second plurality of couplers via the VHF line in the fourth set of analog coupler lines. The quantum processor may further comprise a first inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a second inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a third inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a fourth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a fifth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer; a sixth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; a seventh inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; an eighth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer. Each coupler in the plurality of inter-layer couplers may further comprise four adiabatic quantum-flux-parametrons (aQFP) switches, wherein the aQFPs selectively control communicative coupling control of the inter-layer coupler to qubits of the first and the second surface code layers. Activating inter-layer couplers between the qubits in the third plurality of qubits in the first surface code layer that are directly communicatively coupled to the at least one defective qubit in the first plurality of qubits and the qubits in the third plurality of qubits in the second surface code layer and activating inter-layer couplers between the qubits in the fourth plurality of qubits in the first surface code layer that are directly communicatively coupled to the at least one defective qubit in the first plurality of qubits and the qubits in the fourth plurality of qubits in the second surface code layer may comprise transmitting analog signals to the inter-layer couplers via the first, the second, the third, the fourth, the fifth, the sixth, the seventh and the eighth inter-layer coupler control lines and aQFP switches.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
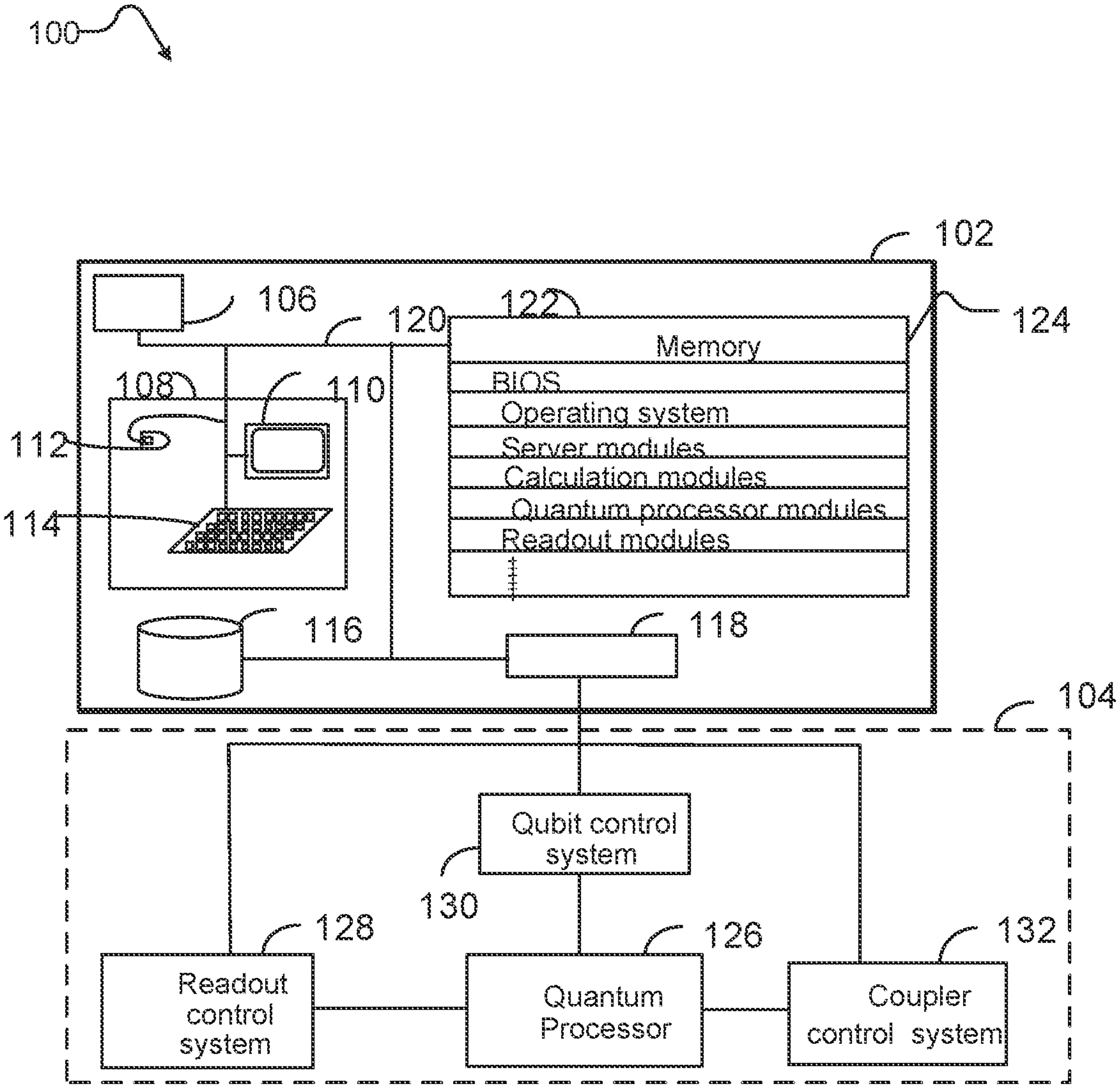
FIG. 1 is a schematic diagram of a hybrid computing system including a digital computer coupled to an analog computer, in accordance with the present systems, devices, and methods.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with digital and analog computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Quantum Computing

Quantum processors may perform two general types of quantum computation. The first, referred to as quantum annealing and/or adiabatic quantum computation, generally relies on the physical evolution of a quantum system. The second, referred to as gate model and/or circuit model quantum computation, relies on the use of quantum gate operations to perform computations with data. Surface code refers to a particular implementation of error-corrected gate model or circuit model quantum computation (QC), in which logical qubits are encoded into portions or patches of a two-dimensional lattice of physical qubits using a two-dimensional low density parity check scheme. The theoretical foundations of two-dimensional surface code may be found in the literature; see for example: Daniel Gottesman (Gottesman, D., 1997, Stabilizer Codes and Quantum Error Correction, URL https://arxiv.org/abs/quant-ph/9705052); Alexi Kitaev and Sergei Bravyi (Bravyi, S., and A. Kitaev, 2005, Phys. Rev. A 71, 022316); Emanuel Knill (Knill, E., 2004a, Fault-tolerant postselected quantum computation: Schemes, eprint 0402171); Robert Raussendorf and Jim Harrington (Raussendorf, R., and J. Harrington, 2007, Phys. Rev. Lett. 98, 190504); Austin Fowler et al. (Fowler, A. G. et al., 2012, Phys. Rev. A 86, 032324); and Daniel Litinski (Litinski, D., 2019, Quantum 3, 128, ISSN 2521-327X). Surface code is one method of implementing universal gate model quantum computing. See Horsman et al., *Surface code quantum computing by lattice surgery*, New Journal of Physics, Volume 14, December 2012.

Implementations of surface code generally use a large number of physical qubits to form a single logical qubit with error correction. While many proposals regarding implementation of universal quantum computing with surface code, such as those discussed above, rely on the ability to apply arbitrary control sequences at arbitrary locations within a quantum processing unit (QPU), these implementations may not be feasible at larger scales due to their control line demands. For example, some implementations may use multiple control lines for each qubit and coupler, which may become unsustainable in terms of physical space and connection hardware as qubit numbers move towards the thousands. In addition, control lines typically run from room temperature to the quantum processor, and as such can be a source of noise and processor heating. As discussed in further detail herein, in some implementations it may be beneficial to hard-wire specific parts of a QPU to perform a predetermined set of tasks. The implementation of near-arbitrary control may be replaced using multiple components to store, move, and manipulate data. Data manipulation components must facilitate at least a set of operations that satisfy the conditions for universality. The operations performed by the data manipulation components may occur between logical qubits. For example, a merge operation may occur between two code surfaces by turning ON parity measurement between the two patches of surface code. "Merging" in this context refers to connecting logical qubits along a shared edge such that the logical qubits interact according to a relationship defined by the construction of the merge block. Merging and separating logical qubits may cause them to become entangled, while lattice surgery may be used to move logical qubits and to perform logic. Lattice surgery refers to a method of deforming and combining planar surface codes as defined by Horsman et al. cited above.

Hybrid Computing Systems

FIG. 1 illustrates a hybrid computing system 100 comprising a digital computer 102. The example digital computer 102 includes one or more digital processors 106 that may be used to perform classical digital processing tasks. Digital computer 102 may further include at least one system memory 122, and at least one system bus 120 that couples various system components, including system memory 122 to digital processor(s) 106. System memory 122 may store one or more sets of processor-executable instructions, which may be referred to as modules 124.

The digital processor(s) 106 may be any logic processing unit or circuitry (for example, integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 126. Quantum processor 126 may include at least one superconducting integrated circuit. Digital computer 102 may communicate with analog computer 104 via, for instance, a controller 118. Certain computations may be performed by analog computer 104 at the instruction of digital computer 102, as described in greater detail herein.

Digital computer 102 may include a user input/output subsystem 108. In some implementations, the user input/output subsystem includes one or more user input/output components such as a display 110, a mouse 112, and/or a keyboard 114.

System bus 120 may employ any known bus structures or architectures, including a memory bus with a memory controller, a peripheral bus, and a local bus. System memory 122 may include non-volatile memory, such as read-only memory ("ROM"), static random-access memory ("SRAM"), Flash NAND; and volatile memory such as random-access memory ("RAM").

Digital computer 102 may also include other non-transitory computer- or processor-readable storage media or non-volatile memory 116. Non-volatile memory 116 may take a variety of forms, including: a hard disk drive for reading from and writing to a hard disk (for example, a magnetic disk), an optical disk drive for reading from and writing to removable optical disks, and/or a solid state drive (SSD) for reading from and writing to solid state media (for example NAND-based Flash memory). Non-volatile memory 116 may communicate with digital processor(s) via system bus 120 and may include appropriate interfaces or controllers 118 coupled to system bus 120. Non-volatile memory 116 may serve as long-term storage for processor- or computer-readable instructions, data structures, or other data (sometimes called program modules or modules 124) for digital computer 102.

Although digital computer 102 has been described as employing hard disks, optical disks and/or solid-state storage media, those skilled in the relevant art will appreciate that other types of non-transitory and non-volatile computer-readable media may be employed. Those skilled in the relevant art will appreciate that some computer architectures employ non-transitory volatile memory and non-transitory non-volatile memory. For example, data in volatile memory may be cached to non-volatile memory or a solid-state disk that employs integrated circuits to provide non-volatile memory.

Various processor- or computer-readable and/or executable instructions, data structures, or other data may be stored in system memory 122. For example, system memory 122 may store instructions for communicating with remote clients and scheduling use of resources including resources on the digital computer 102 and analog computer 104. Also, for example, system memory 122 may store at least one of processor executable instructions or data that, when executed by at least one processor, causes the at least one processor to execute the various algorithms to execute instructions. In some implementations system memory 122 may store processor- or computer-readable calculation instructions and/or data to perform pre-processing, co-processing, and post-processing to analog computer 104. System memory 122 may store a set of analog computer interface instructions to interact with analog computer 104. For example, the system memory 122 may store processor- or computer-readable instructions, data structures, or other data which, when executed by a processor or computer causes the processor(s) or computer(s) to execute one, more or all of the acts of the method 900 of FIG. 9, method 1900 of FIG. 19, method 2500 of FIGS. 25A and 25B, method 2600 of FIGS. 26A and 26B, and method 2700 of FIGS. 27A and 27B.

Analog computer 104 may include at least one analog processor such as quantum processor 126. Analog computer 104 may be provided in an isolated environment, for example, in an isolated environment that shields the internal elements of the quantum computer from heat, magnetic field, and other external noise. The isolated environment may include a refrigerator, for instance a dilution refrigerator, operable to cryogenically cool the analog processor, for example to temperature below approximately 1 K.

Analog computer 104 may include programmable elements such as qubits, couplers, and other devices (also referred to herein as controllable devices). Qubits may be read out via a readout control system 128. Readout results may be sent to other computer- or processor-readable instructions of digital computer 102. Qubits may be controlled via a qubit control system 130. Qubit control system 130 may include on-chip Digital to Analog Converters (DACs) and analog lines that are operable to apply a bias to a target device. Couplers that couple qubits may be controlled via a coupler control system 132. Coupler control system 132 may include tuning elements such as on-chip DACs and analog lines. Qubit control system 130 and coupler control system 132 may be used to control the behavior of one of more qubits and couplers based on signals including instructions provided by digital computer 102. Programmable elements may be included in quantum processor 126 in the form of an integrated circuit. Qubits and couplers may be positioned in layers of the integrated circuit that comprise a first material. Other devices, such as readout control system 128, may be positioned in other layers of the integrated circuit that comprise a second material. In accordance with the present disclosure, a quantum processor, such as quantum processor 126, may be designed to perform quantum annealing and/or adiabatic quantum computation, or gate-model quantum computation in accordance with the techniques described herein for example implementing error-corrected quantum computation (QC). Examples of quantum processors are described in U.S. Pat. No. 7,533,068.

Two-Dimensional Surface Code

Surface code is a particular implementation of error-corrected quantum computation (QC), wherein logical qubits are encoded into portions or patches of a two-dimensional lattice of physical qubits using a two-dimensional low density parity check scheme. In the present disclosure and the appended claims, the term 'logical qubit' is mean to denote a plurality of qubits linked together by coupling devices so that in a low energy-state all the qubits in the logical qubit will take the same spin value. In some implementations, the ability of surface code to identify errors lies in the separation of a physical qubit lattice into four sub-lattices: the first sub-lattice comprises a first plurality of qubits, also called data qubits (data-A, or DA) in the present description and the appended claims; the second sub-lattice comprises a second plurality of qubits, also called data qubits (data-B, or DB) in the present description and the appended claims; and the third and fourth sub-lattices comprise two group of qubits called stabilizer qubits. In the present description and the appended claims stabilizer qubits are also called measure qubits. Providing two data qubit sub-lattices, data-A and data-B, is useful to build a scalable technology, allowing for a relatively sparse number of control lines. The data qubits are typically only read near the end of the computation, or at least at the end of a subroutine within that computation. Stabilizer qubits are used to perform parity measurements on their nearest-neighbor data qubits. Each data qubit in an interior of a patch of surface code is coupled to four stabilizer qubits, two of which measure XXXX parity and are referred to as measure-X ($M_X$) qubits, and two of which measure ZZZZ parity and are referred to as measure-Z ($M_Z$) qubits. There are two-local parity stabilizers on the edges of a patch of surface code, corresponding to either XX parity or ZZ parity measurements, and alternating data qubits on the edges are subject to only three parity measurements. By measuring all stabilizers in a repeated cycle, the entire set of data-A and data-B qubits is projected into a quantum state that is a simultaneous eigenstate of all of the XXXX, ZZZZ, XX, and ZZ operators. Errors are heralded by changes in the individual stabilizer outcomes between successive cycles. Through the use of stabilizers, one may advantageously side-step the restrictions of the no-cloning theorem that prevent explicitly measuring the data qubits to identify errors.

A feature of two-dimensional surface code is that it is not necessary to physically correct any identified errors in vivo, rather it is sufficient to only track identified errors in classical software and correct any final read of an erroneous physical qubit after a corresponding logical qubit has been read.

Transmon Qubits

Figure 2:
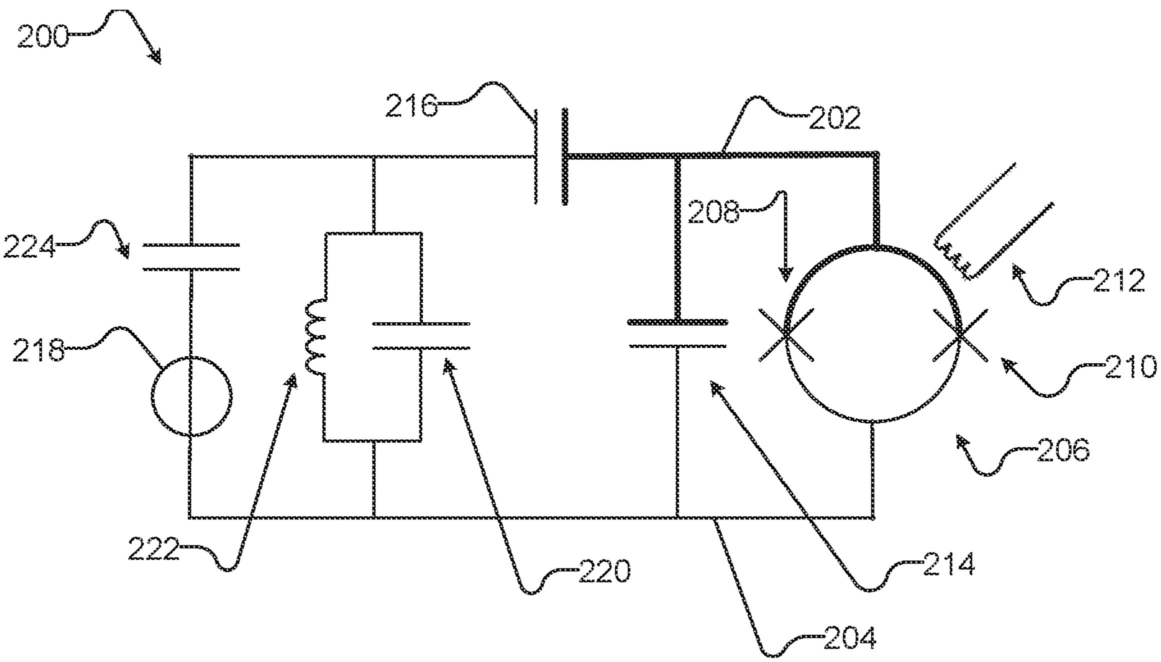
FIG. 2 is a schematic diagram of an example transmon qubit, in accordance with the present systems, devices, and methods.

FIG. 2 is a schematic diagram of an example implementation of a superconducting qubit 200, according to the present disclosure. Superconducting qubit 200 is an example of a transmon qubit.

Superconducting qubit 200 includes a first superconducting island 202 (shown in bold lines) and a second superconducting island 204 communicatively coupled by a DC superconducting quantum interference device (DC-SQUID) 206. DC-SQUID 206 includes a Josephson junction 208 and a Josephson junction 210 coupled in parallel with each other via a superconducting loop. In some implementations, Josephson junctions 208 and 210 are symmetric junctions. A flux bias can be applied to DC-SQUID 206 by an interface 212 to tune a Josephson energy of superconducting qubit 200. Superconducting qubit 200 also includes a shunt capacitor 214.

Superconducting qubit 200 can be controlled by a gate electrode capacitively communicatively coupled to first superconducting island 202 by a gate capacitance 216 with a gate voltage supplied by a supply 218. Superconducting qubit 200 may be coupled to a resonator that can be modeled by a lumped capacitance 220 and a lumped inductance 222, and an additional coupling capacitance 224.

Capacitively Coupled Transmon Qubits

There are three physical methods for directly coupling any superconducting qubits to one another: galvanic coupling, inductive coupling, and capacitive coupling. Additionally, a resonant drive can be added to one (or both) of the qubits that form a two-qubit gate. In one example implementation, capacitive coupling may be used as a coupling method for coupling a plurality of transmon qubits, such as superconducting qubit 200 of FIG. 2. A structure to implement a tunable capacitive coupling has been described by Yan et al. (Yan, F. et al., 2018, Phys. Rev. Applied 10, 054062). Entangling gates can be realized by pulsing the capacitive coupling ON and OFF between a pair of resonant transmon qubits.

Fluxonium Qubits

In order to build a scalable quantum processor, not only is high qubit coherence desirable, but so are minimal cross-talk between qubits and a high circuit density. Therefore, it may be advantageous to build an integrated stack consisting of multiple metal layers and dielectric spacer layers having the above-noted characteristics.

A type of superconducting qubit, known as a fluxonium qubit, is a form of flux qubit having an extremely large body inductance, referred to as a "superinductance". For a discussion of fluxonium qubits see Manucharyan, V. E., et al., 2009, Science 326 (5949), 113. One method for producing the superinductance of a fluxonium qubit is through a long chain of large Josephson junctions. However, it is also possible to manufacture the superinductance from a high kinetic inductance (KI) material. More details can be found in International Patent Application No PCT/US2022/037457.

Figure 3:
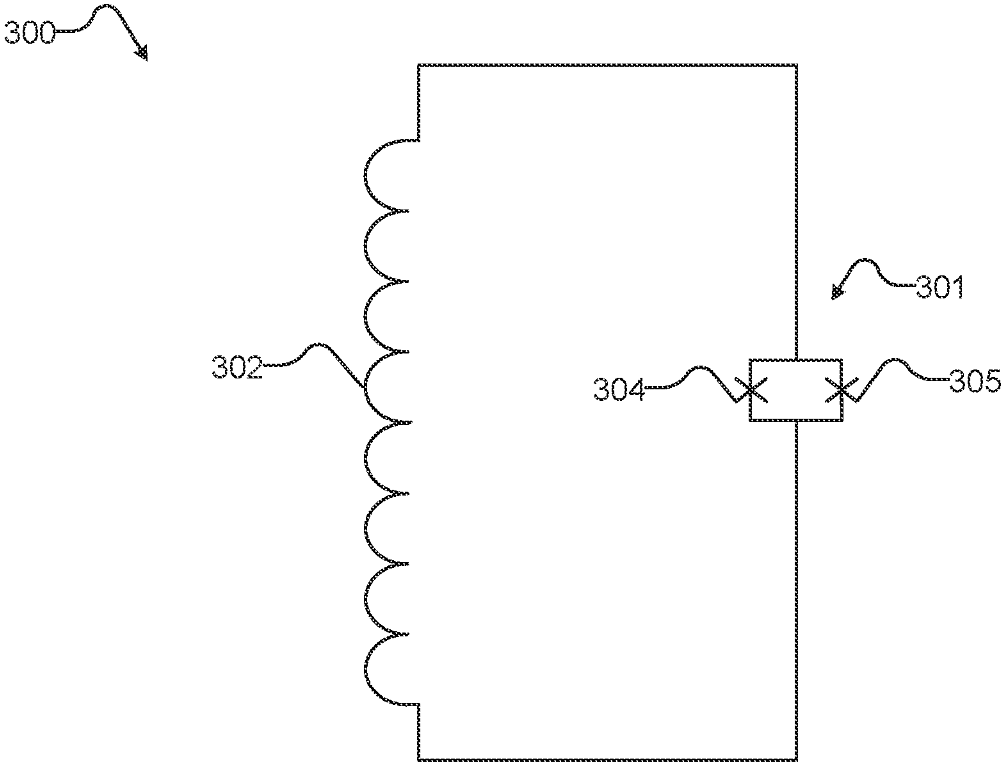
FIG. 3 is a schematic diagram of an example fluxonium qubit, in accordance with the present systems, devices, and methods.

FIG. 3 is a schematic diagram of an example superconducting qubit 300 that replaces the array of Josephson junctions of a fluxonium qubit with a kinetic inductor. Superconducting qubit 300 comprises a Josephson junction structure 301 and a segment of kinetic inductance material 302. In the present example implementation, Josephson junction structure 301 comprises two Josephson junctions 304 and 305 that form a compound Josephson junction (CJJ). A person skilled in the art will understand that Josephson junction structure 301 may alternatively include only one Josephson junction or include compound-compound Josephson junctions (CCJJ) and in certain implementations, Josephson junction structure 301 may include other structures, e.g., inductors in series with Josephson junctions 304 and 305. Segment of kinetic inductance material 302 may comprise niobium nitride (NbN), niobium titanium nitride (NbTiN) or titanium nitride (TiN).

Inductively Coupled Fluxonium Qubits

Tunable inductive couplers (see, for example, Harris, R., et al., *A Compound Josephson Junction Coupler for Flux Qubits With Minimal Crosstalk*, arXiv: 0904.3784v3 [cond-mat.supr-con], or U.S. Pat. No. 8,174,305) may be employed to couple fluxonium qubits. Tunable inductive couplers may be turned on and off using a low bandwidth pulse and can have gate times shorter than 30 ns. Given the large anharmonicity of fluxonium qubits with KI material, it is relatively easy to craft entangling gates between a pair of resonant fluxonium qubits using a pulsed inductive coupling.

VHF Control of Fluxonium Qubits

The design and manufacturing of very high frequency (VHF) signal distribution, both on-chip and off-chip, is easier and more scalable than at microwave frequencies due to lower interference with other devices. In the present disclosure and the appended claims, the term "very high frequency" is used to indicate the following range of frequencies: $\omega_q/2\pi \in 30\text{-}300$ MHz. Therefore, for building a practical quantum computing system, it is advantageous to use VHF signals to apply qubit gates. For example, modulated VHF signals may be applied to the qubit body to perform rotations about axes within the XY-plane of the Bloch sphere. For performing phase rotations about the Z-axis, a modulated VHF signal may be applied to the compound Josephson junction (CJJ) loop of the qubit that will cause $\omega_q$ to oscillate about its nominal zero-point. Since the $\omega_q$ versus CJJ flux bias transfer curve is nearly exponential around the zero-point for typical device parameters, then such modulated pulse control may be used to accrue a nonzero phase.

Homogenization and Sharing of Control Signals

In-situ qubit homogenization techniques may be utilized so that multiple qubits can be controlled using shared template control signals carried by a shared control line, as described in U.S. Pat. No. 11,182,230 and below with reference to FIGS. 10 and 11. In-situ tunable transformers between each target device and the shared control line can then facilitate scalable control of large patches of surface code, for example by using a small number of VHF bias lines to control a plurality of fluxonium qubits. Those template signals can be generated at room temperature, on cold support chips, and/or integrated into the fabric of a quantum processing unit (QPU).

Example Quantum Processor

Figure 4:
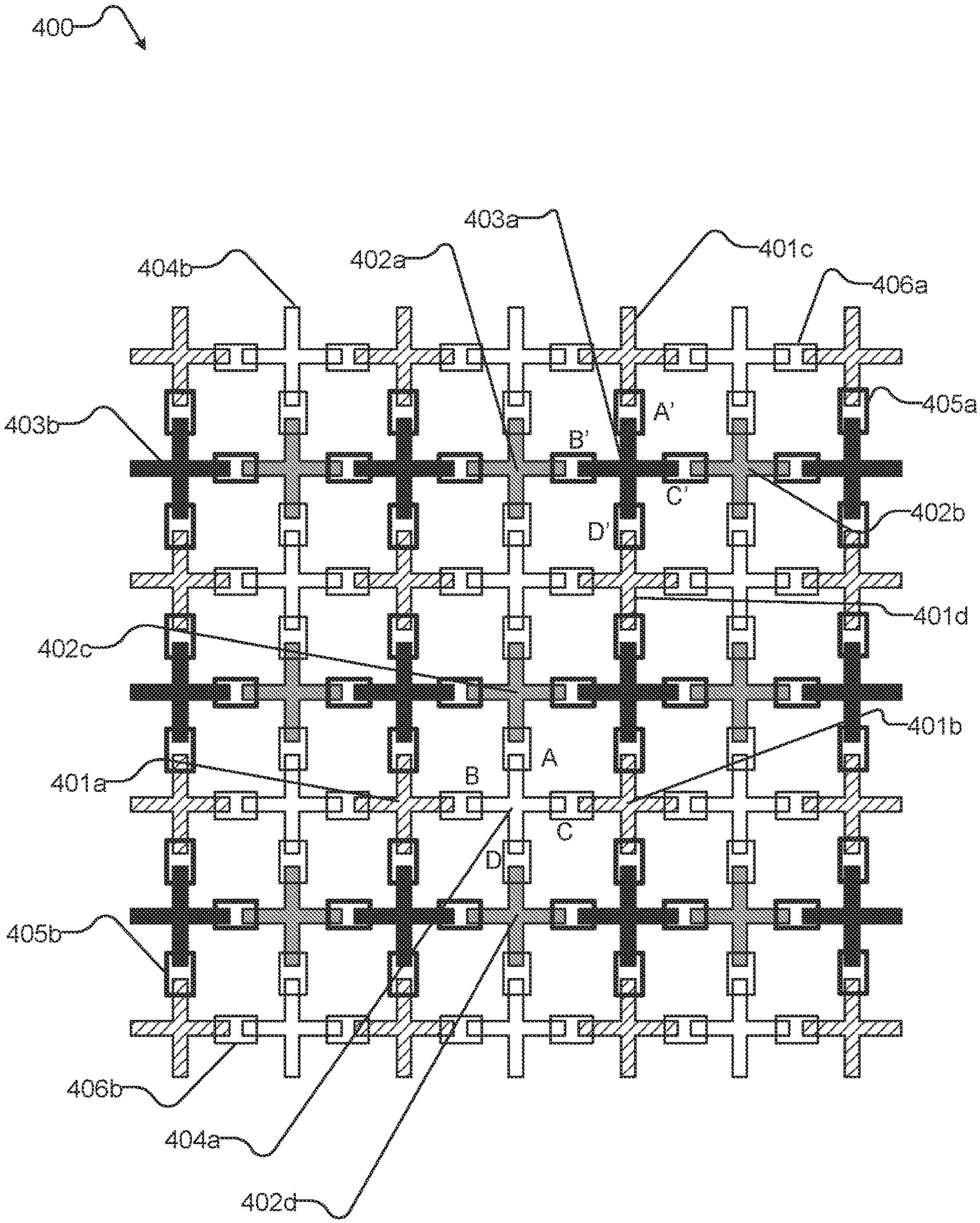
FIG. 4 is a schematic diagram of an example portion of a quantum processor implementing surface code, in accordance with the present systems, devices, and methods.

FIG. 4 is a schematic diagram of an example portion of a quantum processor 400 capable of implementing 2D surface code in accordance with the present systems, devices, and methods. Quantum processor 400 may, for example, be all or a portion of quantum processor 126 used in hybrid computing system 100 of FIG. 1.

Quantum processor 400 shows an example implementation of an arrangement of physical qubits to provide one or more logical qubits. A logical qubit is a collection of one or more physical qubits that collectively act as a single qubit for the purposes of calculations. In the example of a gate model quantum algorithm, a logical qubit acts as a single qubit for the purposes of quantum logic operations. However, as discussed below, multiple physical qubits are used to form a single logical qubit to provide quantum error correction and thereby a more fault tolerant logical qubit.

Quantum processor 400 comprises four pluralities of qubits arranged in a two-dimensional lattice. In at least one implementation, quantum processor 400 comprises a plurality of fluxonium qubits with high KI material, such as superconducting qubit 300 of FIG. 3. In another implementation, quantum processor 400 comprises a plurality of transmon qubits, such as superconducting qubit 200 of FIG. 2. Quantum processor 400 comprises a first plurality of qubits (shaded with diagonal lines, qubits 401*a*, 401*b*, 401*c* and 401*d* called out for illustrative purposes, collectively referenced as 401), a second plurality of qubits (shown in grey, qubits 402*a*, 402*b*, 402*c*, and 402*d* called out for illustrative purposes, collectively referenced as 402), a third plurality of qubits (shown in black, qubits 403*a* and 403*b* called out for illustrative purpose, collectively referenced as 403), and a fourth plurality of qubits (shown in white, qubits 404*a* and 404*b* called out for illustrative purposes, collectively referenced as 404).

Each qubit in first plurality of qubits 401 is directly communicatively coupled to at least one qubit in third plurality of qubits 403 and at least one qubit in fourth plurality of qubits 404, where qubits in first plurality of qubits 401 that are not located at an edge of the two-dimensional lattice are directly communicatively coupled to two qubits in third plurality of qubits 403 and two qubits in fourth plurality of qubits 404.

Each qubit in second plurality of qubits 402 is directly communicatively coupled to at least one qubit in third plurality of qubits 403 and at least one qubit in fourth plurality of qubits 404, where qubits in second plurality of qubits 402 that are not located at an edge of the two-dimensional lattice are directly communicatively coupled to two qubits in third plurality of qubits 403 and two qubits in fourth plurality of qubits 404.

Each qubit in third plurality of qubits 403 is directly communicatively coupled to at least one qubit in first plurality of qubits 401 and at least one qubit in the second plurality of qubits 402, where qubits in third plurality of qubits 403 that are not located at an edge of the two-dimensional lattice are directly communicatively coupled to two qubits in first plurality of qubits 401 and two qubits in second plurality of qubits 402.

Each qubit in fourth plurality of qubits 404 is directly communicatively coupled to at least one qubit in first plurality of qubits 401 and at least one qubit in second plurality of qubits 402, where qubits in fourth plurality of qubits 404 that are not located at an edge of the two-dimensional lattice are directly communicatively coupled to two qubits in first plurality of qubits 401 and two qubits in second plurality of qubits 402.

First and second pluralities of qubits 401 and 402 hold a quantum state of the logical qubit while third and fourth pluralities of qubits 403 and 404 are used for error detection. Logical qubits may be used as quantum memories to act as physical qubits in error corrected quantum algorithms such as surface code. As used herein, a logical qubit refers to a qubit that is used for problem solving, typically formed from two or more physical qubits. For example, in some implementations, a logical qubit may be formed from two physical qubits and a coupler coupling those two physical qubits. In other implementations, a logical qubit may include a number of physical qubits coupled together to reduce the susceptibility of the quantum processor to noise.

Quantum processor 400 also includes a first plurality of couplers (shown in bold lines, couplers 405*a* and 405*b* called out for illustrative purposes, collectively referenced as 405) and a second plurality of couplers 406 (shown in regular lines, couplers 406*a* and 406*b* called out for illustrative purposes, collectively referenced as 406) that provide communicative coupling between pairs of qubits in the two-dimensional lattice. First and second pluralities of couplers 405 and 406 are arranged in quantum processor 400 in grid or a two-dimensional array. These couplers may provide either inductive, capacitive coupling or galvanic a two-dimensional coupling, or a combination thereof. Couplers 405 and 406 may be used as parity enforcing couplers to find errors in the data qubit by reading out the error qubits. A parity enforcing coupler is any coupler that is coupled such that the overall energy state of the system has two levels, one when all of the connected qubits have an even number of qubits in a given state, and one when all of the connected qubits have an odd number of qubits in a given state.

Each coupler in first plurality of couplers 405 (also referred to as "x-couplers" in the present disclosure) provides communicative coupling between one qubit in third plurality of qubits 403 and one qubit in first plurality of qubits 401, or between one qubit in third plurality of qubits 403 and one qubit in second plurality of qubits 402.

Each coupler in second plurality of couplers 406 (also referred to as "z-couplers" in the present disclosure) provides communicative coupling between one qubit in fourth plurality of qubits 404 and one qubit in first plurality of qubits 401, or between one qubit in fourth plurality of qubits 404 and one qubit in second plurality of qubits 402.

In quantum processor 400, each qubit in third plurality of qubits 403 that is not located at an edge of quantum processor 400 is directly communicatively coupled to four other qubits (i.e., two qubits from first plurality of qubits 401 and two qubits from second plurality of qubits 402) via four couplers from first plurality of couplers 405. Each qubit in fourth plurality of qubits 404 that is not located at an edge of quantum processor 400 is directly communicatively coupled to four other qubits (i.e., two qubits from first plurality of qubits 401 and two qubits from second plurality of qubits 402) via four couplers from second plurality of couplers 406.

Although the portion of quantum processor 400 is shown in FIG. 4 as comprising 16 qubits in first plurality of qubits 401, nine qubits in second plurality of qubits 402, 12 qubits in third plurality of qubits 403, 12 qubits in fourth plurality of qubits 404, 48 couplers in first plurality of couplers 405, and 48 couplers in second plurality of couplers 406, a person skilled in the art would understand that the number of qubits and couplers illustrated in FIG. 4 is for example purposes only, and in other implementations, quantum processor 400 may comprise a different number of qubits and couplers.

The Surface Code Cycle

Hadamard gate (H-gate, or Hadamard transformation) is a one-qubit gate that can be implemented by the concatenation of a rotation about the X-axis of the Bloch sphere by $\pi$ followed by a rotation about the Y-axis by $\pi/2$. The truth table for this operation reveals that it maps computational basis states ($|0\rangle$ ; $|1\rangle$ ) onto the symmetric and antisymmetric superposition states ($+\rangle$ ;$-\rangle$ ), and vice-versa. This operation is typically used to transform a given qubit state between the computational (Z) basis and the superposition (X) basis.

A CNOT gate is a two-qubit gate in which one qubit acts as a control qubit and the second qubit is the target qubit that is conditionally manipulated based on the state of the control device. The truth table for this operation reveals that a computational state of the target qubit is flipped only if the control qubit is in state $|1\rangle$ . This produces a particularly interesting effect when the control device is in a superposition state, as the state of the target qubit then becomes entangled with that of the control qubit. A basic operation for spreading entanglement across a network of qubits includes: starting a control qubit in state $|0\rangle$ , applying an H-gate to the control qubit, and then applying a CNOT gate to one or more target qubits initialized in state $|0\rangle$ . This process can then be concatenated to propagate entanglement across networks with limited connectivity.

Application of CNOT gates between stabilizer qubits (also called measure qubits in the present disclosure), i.e., qubits in third and fourth pluralities of qubits 403 and 404, and data qubits, i.e., qubits in first and second pluralities of qubits 401 and 402, followed by measurement of the measure qubits, i.e., qubits in third and fourth pluralities of qubits 403 and 404, projects the entire set of data qubits into a Bell-like entangled state. The state of a logical qubit (i.e., the collective state of all data qubits in first and second plurality of qubits 401 and 402) then becomes encoded into something akin to a two-dimensional repetition code. In the absence of noise and no manipulation of the logical qubits, that state will be a steady state. When errors occur, there will be changes to some parity measurements. Classical post-processing of those changes advantageously allows identification of individual errors and correction of the final outcome of a quantum computation accordingly. Examples of error detection processes are described in detail in Fowler et al., 2012, Phys. Rev. A 86, 032324.

Figure 5A:
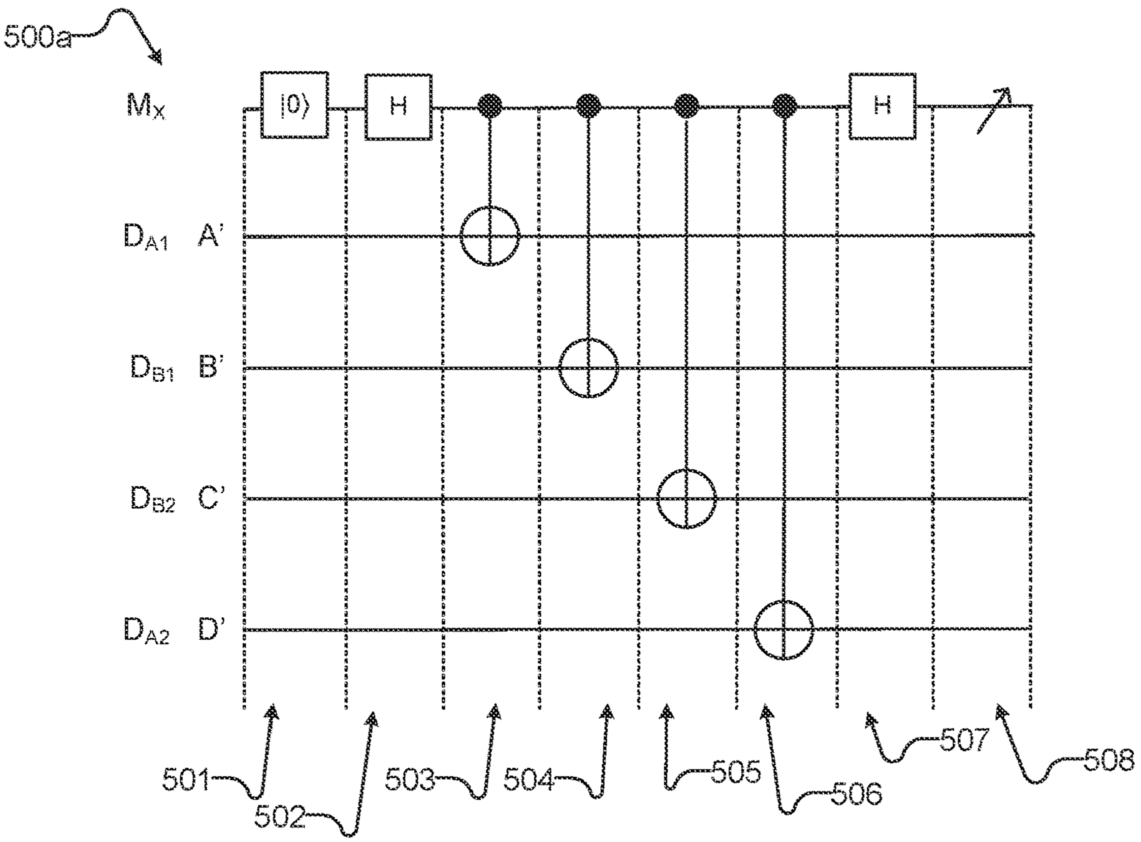
FIG. 5A is a diagram of an example gate sequence for measuring XXXX parity operators, in accordance with the present systems, devices, and methods.

FIG. 5A is a diagram of an example gate sequence 500*a* for measuring XXXX parity operators. Measuring XXXX parity operators includes measuring the state of qubits in third plurality of qubits 403.

Figure 5B:
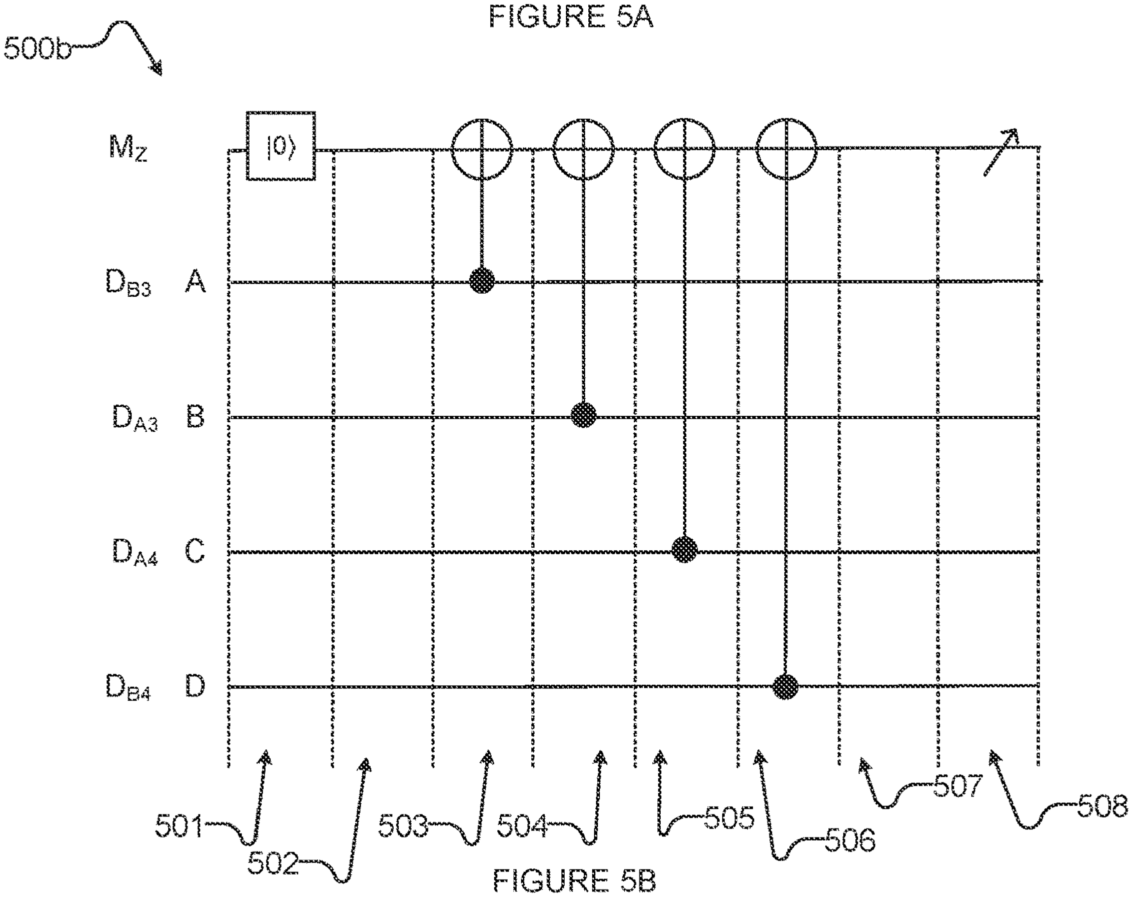
FIG. 5B is a diagram of an example gate sequence for measuring ZZZZ parity operators, in accordance with the present systems, devices, and methods.

FIG. 5B is a diagram of an example gate sequence 500*b* for measuring ZZZZ parity operators. Measuring ZZZZ parity operators includes measuring the state of qubits in fourth plurality of qubits 404. Similar or even identical structures are indicated with the same reference numbers in FIGS. 5A and 5B. Control qubits are shown in FIGS. 5A and 5B as solid dots and target qubits are shown as hollow crosshair dots. Particularly notable is the order in which the entangling operations are performed: in each of gate sequence 500_a_ and 500_b_ the pattern ABCD or A'B'C'D' is followed. Example of patterns ABCD (corresponding to applying a two-qubit gate between qubit 404_a_ and qubits 402_c_, 401_a_, 401_b_, 402_d_) and A'B'C'D' (corresponding to applying a two-qubit gate between qubit 403_a_ and qubits 401_c_, 402_a_, 402_b_, 401_c_) are also shown in FIG. 4. A person skilled in the art would understand that patterns ABCD and A'B'C'D' shown in FIG. 4 are for example only and that alternate patterns can be used that are optimal for different logical qubit layouts and different boundary conditions.

Gate sequence 500_a_ illustrates sequential operations performed on: one measure-X qubit ($M_X$) in third plurality of qubits 403, a first data qubit ($DA_1$) in first plurality of qubits 401, a first data qubit ($DB_1$) in second plurality of qubits 402, a second data qubit ($DB_2$) in second plurality of qubits 402, and a second data qubit ($DA_2$) in first plurality of qubits 401. Gate sequence 500_a_ is an example of pattern A'B'C'D'.

Gate sequence 500_b_ illustrates sequential operations performed on: one measure-Z qubit ($M_Z$) in fourth plurality of qubits 404, a third data qubit ($DB_3$) in second plurality of qubits 402, a third data qubit ($DA_3$) in first plurality of qubits 401, a fourth data qubit ($DA_4$) in first plurality of qubits 401, and a fourth data qubit ($DB_4$) in second plurality of qubits. Gate sequence 500_b_ is an example of pattern ABCD.

Gate sequences 500_a_ and 500_b_ are executed simultaneously or in parallel. Individual data qubits (qubits in first and second plurality of qubits 401 and 402) engage with only one measure-X or measure-Z qubit at any given time. When a data-A qubit is engaged in an X-parity measurement (e.g., in act 503 described below), a data-B qubit is engaged in a Z-parity measurement in the same time step. The roles of the data qubits then exchange in the next act (e.g., act 504). Eventually every data qubit interacts with two measure-X and two measure-Z qubits, but they follow a sequence that avoids conflicts between the two types of parity measurements.

At 501, parity qubits $M_X$ and $M_Z$ are initialized in their ground states $|0\rangle$. See acts 902_a_, 902_b_ of method 900 described below for more details.

At 502, an H-gate (Hadamard gate) is applied to $M_X$.

At 503, a first two-qubit gate operation (e.g., a CNOT gate) is applied to first data qubit ($DA_1$) in first plurality of qubits 401 and to $M_X$, where $DA_1$ is used as the target qubit and $M_X$ is used as the control qubit. As well, a second two-qubit gate operation (e.g., a CNOT gate) is applied to third data qubit ($DB_3$) in second plurality of qubits 402 and to $M_Z$, where $DB_3$ is used as the control qubit and $M_Z$ is used as target.

At 504, a third two-qubit gate operation (e.g., a CNOT gate) is applied to first data qubit ($DB_1$) in the second plurality of qubits 402 and to $M_X$, where $DB_1$ is used as the target qubit and $M_X$ is used as control qubit. As well, a fourth two-qubit gate operation (e.g., a CNOT gate) is applied to third data qubit ($DA_3$) in the first plurality of qubits 401 and to $M_Z$, where $DA_3$ is used as control qubit and $M_Z$ is used as target.

At 505, a fifth two-qubit gate operation (e.g., a CNOT gate) is applied to second data qubit ($DB_2$) in the second plurality of qubits 402 and to $M_X$, where $DB_2$ is used as target qubit and $M_X$ as control qubit. As well, a sixth two-qubit gate operation (e.g., a CNOT gate) is applied to fourth data qubit ($DA_4$) in first plurality of qubits 401 and to $M_Z$, where $DA_4$ is used as control qubit and $M_Z$ is used as target qubit.

At 506, a seventh two-qubit gate operation (e.g., a CNOT gate) is applied to second data qubit ($DA_2$) in first plurality of qubits 401 and to $M_X$, where $DA_2$ is used as target qubit and $M_X$ is used as control qubit. An eighth two-qubit the gate operation (e.g., a CNOT gate) is applied to fourth data qubit ($DB_4$) in second plurality of qubits 402 as control and to $M_Z$, where $DB_4$ is used as control qubit and $M_Z$ is used as target qubit.

At 507, an H-gate is applied to $M_X$.

At 508, the states of $M_X$ and $M_Z$ are Read Out in the Z-Basis, Each Yielding Either 0 or 1. Reading out the state of $M_X$ leads to measuring XXXX parity operators, while reading out the state of $M_Z$ leads to measuring ZZZZ parity operators.

Scalable Control

Figure 6:
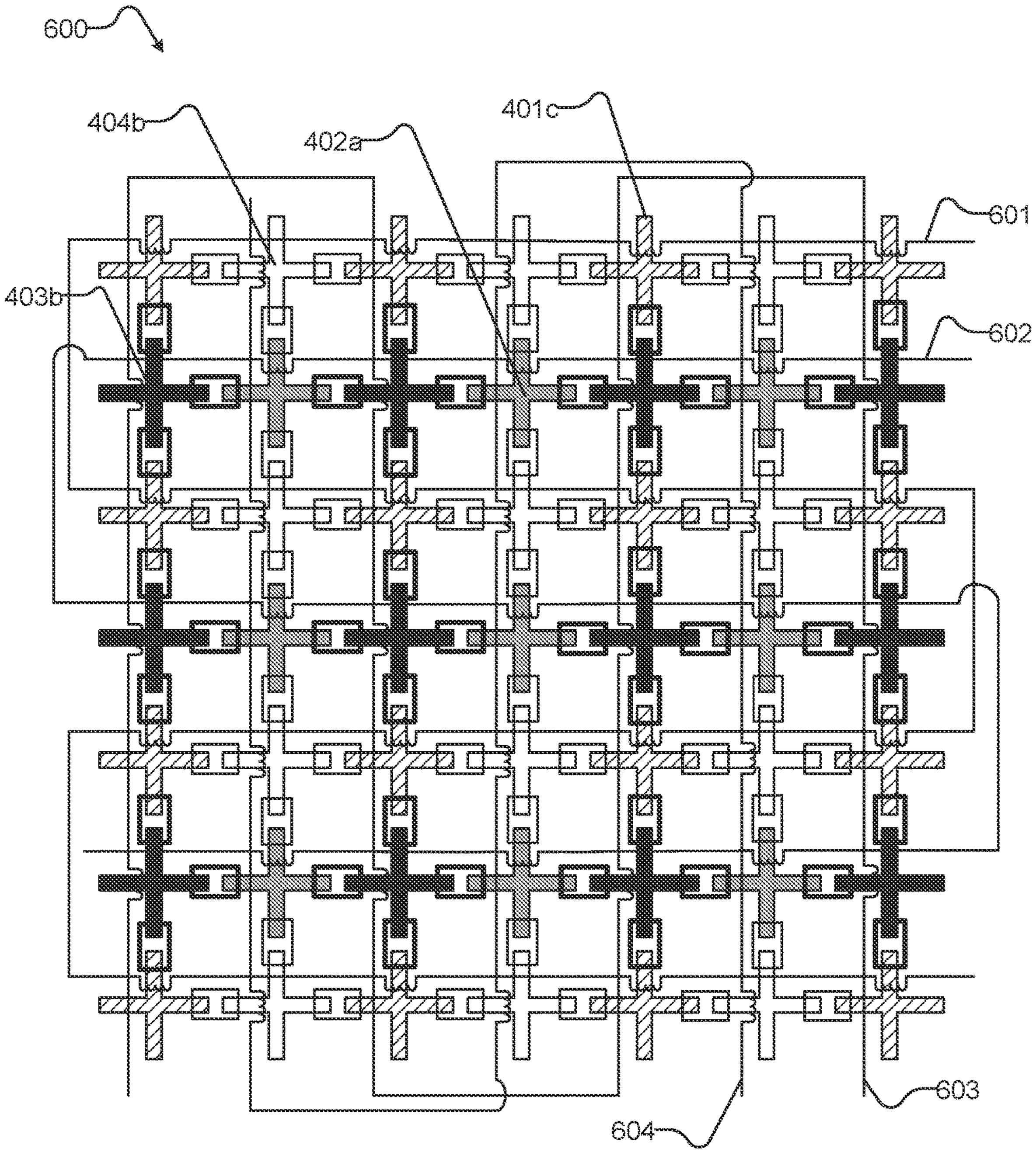
FIG. 6 is a schematic diagram of an example portion of a quantum processor with shared qubit control lines, in accordance with the present systems, devices, and methods.
Figure 7:
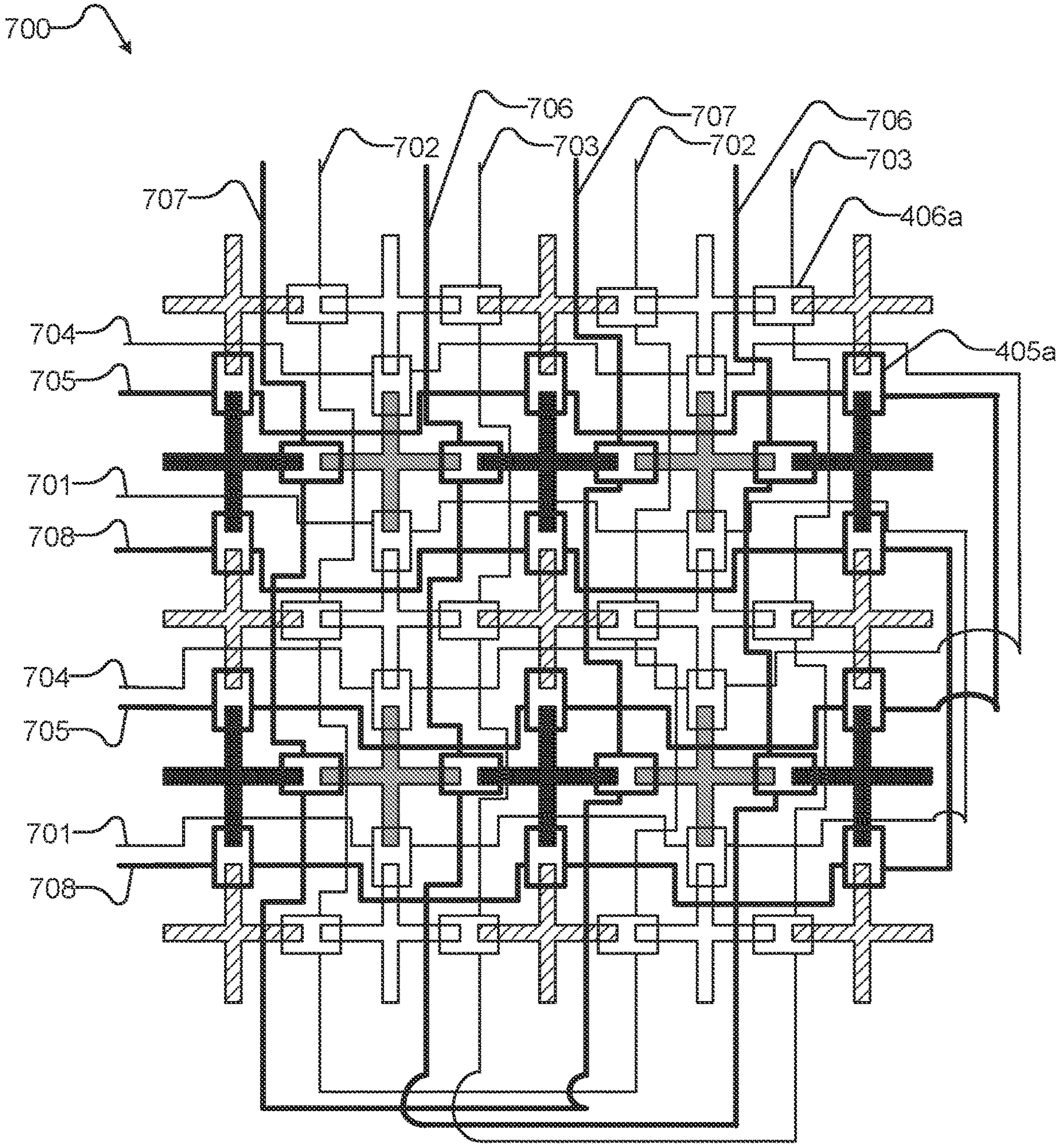
FIG. 7 is a schematic diagram of an example portion of a quantum processor with shared coupler control lines, in accordance with the present systems, devices, and methods.

Patterns ABCD and A'B'C'D' may be used to control a patch of 2-D surface code with a sparse number of control lines, assuming device and control signals can be sufficiently homogenized, as described with references to FIGS. 6 and 7.

FIG. 6 is a schematic diagram of the example portion 600 of quantum processor 400 of FIG. 4, further illustrating shared qubit control lines.

Quantum processor 400 comprises: a first bundle of analog lines 601 that provide control signals to each of the qubits in first plurality of qubits 401, a second bundle of analog lines 602 that provide control signals to each of the qubits in second plurality of qubits 402, a third bundle of analog lines 603 that provide control signals to each of the qubits in third plurality of qubits 403, and a fourth bundle of analog lines 604 that provide control signals to each of the qubits in fourth plurality of qubits 404. In the present disclosure and the appended claims, the term 'bundle' is used to indicate one or more lines (e.g., analog lines) that are laid out in a substantially similarly fashion and provide control signals to the same subset of qubits, couplers or other devices on a processor. The term 'bundle' is used in the present disclosure and the appended claims interchangeably with the term 'set' or 'plurality'.

Each plurality of qubits 401, 402, 403, and 404 is biased by a single bundle of analog lines 601, 602, 603 and 604, respectively, so that the entire array of qubits of quantum processor 400 can be operated using only four bundles of analog lines.

Each bundle of analog lines 601, 602, 603, and 604 may transmit more than one analog signal line. In one example implementation using fluxonium qubits, each bundle of analog lines 601, 602, 603, and 604 comprises a first VHF control line that is inductively coupled to the respective body of each qubit in the first, second, third, and fourth pluralities of qubits 401, 402, 403, and 404 for rotations about an axis in the XY-plane of the Bloch sphere, and a second VHF control line that is inductively coupled to the respective CJJ of each qubit in the first, second, third, and fourth pluralities of qubits 401, 402, 403, and 404 for rotations about the Z-axis of the Bloch sphere. Each bundle of analog lines 601, 602, 603, and 604 may comprise additional analog bias lines inductively coupled to a respective CCJJ of each qubit in the first, second, third, and fourth pluralities of qubits 401, 402, 403, and 404. FIG. 7 is a schematic diagram of an example portion 700 of quantum processor 400 of FIG. 4 with shared coupler control lines. The coupler control lines are addressed according the ABCD-A'B'C'D' sequence described in FIGS. 5A and 5B. Portion 700 is a smaller portion of quantum processor 400 of FIG. 4 to reduce visual clutter. A person skilled in the art would understand that coupler control lines are addressed in the same manner through the lattice of quantum processor 400 and other quantum processor architectures with larger lattices.

Quantum processor 400 comprises eight sets of analog lines 701, 702, 703, 704, 705, 706, 707, and 708. Each set of analog lines provides control signals to a subset of the couplers in first plurality of couplers 405 or to a subset of the couplers in second plurality of couplers 406, to enable the ABCD-A'B'C'D' sequence described above with respect to FIGS. 5A and 5B.

First set of analog lines 701 provides control signals to couplers in a first subset of second plurality of couplers 406 of portion 700 of quantum processor 400. First set of analog lines 701 provides control signals used in act A of sequence ABCD.

Second set of analog lines 702 provides control signals to couplers in a second subset of second plurality of couplers 406 of portion 700 of quantum processor 400. Second set of analog lines 702 provides control signals used in act B of sequence ABCD.

Third set of analog lines 703 provides control signals to couplers in a third subset of second plurality of couplers 406 of portion 700 of quantum processor 400. Third set of analog lines 703 provides control signals used in act C of sequence ABCD.

Fourth set of analog lines 704 provides control signals to couplers in a fourth subset of second plurality of couplers 406 of portion 700 of quantum processor 400. Fourth set of analog lines 704 provides control signals used in act D of sequence ABCD.

Fifth set of analog lines 705 provides control signals to couplers in a first subset of first plurality of couplers 405 of portion 700 of quantum processor 400. Fifth set of analog lines 705 provides control signals used in act A' of sequence A'B'C'D'. Fifth set of analog lines 705 is shown in thicker line for illustrative purposes.

Sixth set of analog lines 706 provides control signals to couplers in a second subset of first plurality of couplers 405 of portion 700 of quantum processor 400. Sixth set of analog lines 706 provides control signals used in act B' of sequence A'B'C'D'. Sixth set of analog lines 706 is shown in thicker line for illustrative purposes.

Seventh set of analog lines 707 provides control signals to couplers in a third subset of first plurality of couplers 405 of portion 700 of quantum processor 400. Seventh set of analog lines 707 provides control signals used in act C' of sequence A'B'C'D'. Seventh set of analog lines 707 is shown in thicker line for illustrative purposes.

Eighth set of analog lines 708 provides control signals to couplers in a fourth subset of first plurality of couplers 405 of portion 700 of quantum processor 400. Eighth set of analog lines 708 provides control signals used in act D' of sequence A'B'C'D'. Eighth set of analog lines 708 is shown in thicker line for illustrative purposes.

Therefore, there are separate analog controls lines for couplers connected to qubits in fourth plurality of qubits 404 (measure-Z qubits, ABCD sequence) and for couplers connected to qubits in third plurality of qubits 403 (measure-X qubits, A'B'C'D' sequence), allowing applying two-qubit operations to qubits 404 according to sequence ABCD simultaneously (or in parallel) to applying two-qubit operations to qubits 403 according to sequence A'B'C'D' with a relatively low number of analog lines.

Each set of analog lines 701, 702, 703, 704, 705, 706, 707 and 708 may comprise more than one analog signal line. In one example implementation, each set of analog lines 701 702, 703, 704, 705, 706, 707 and 708 comprises a first VHF bias line to provide a pulse to couplers of first and second pluralities of couplers 405 and 406 for oscillating between a high operating level (H) and a low operating level (L), as well as additional analog bias lines. In at least one implementation using fluxonium qubits, a CNOT gate may be realized by applying a $Y_{\pi/2}$ gate, a $X_{\pi}$ gate, a H-gate and a $Z_{-\pi/2}$ gate to data qubits (DB, control qubit) via second bundle of analog lines 602, and applying a $X_{-\pi/2}$ gate to qubit $M_Z$ (target qubit) via fourth bundle of analog lines 604. The $Z_{-\pi/2}$ gate applied to data qubits can provide a Gaussian pulse that briefly toggles the control qubit between low and high operating levels. A control pulse with two peaks applied to couplers of second plurality of couplers 406 between qubits $M_Z$ and data qubits DB via first set of analog lines 701 realizes a pair of partially-entangling $\sqrt{iSWAP}$ gates.

Figure 8:
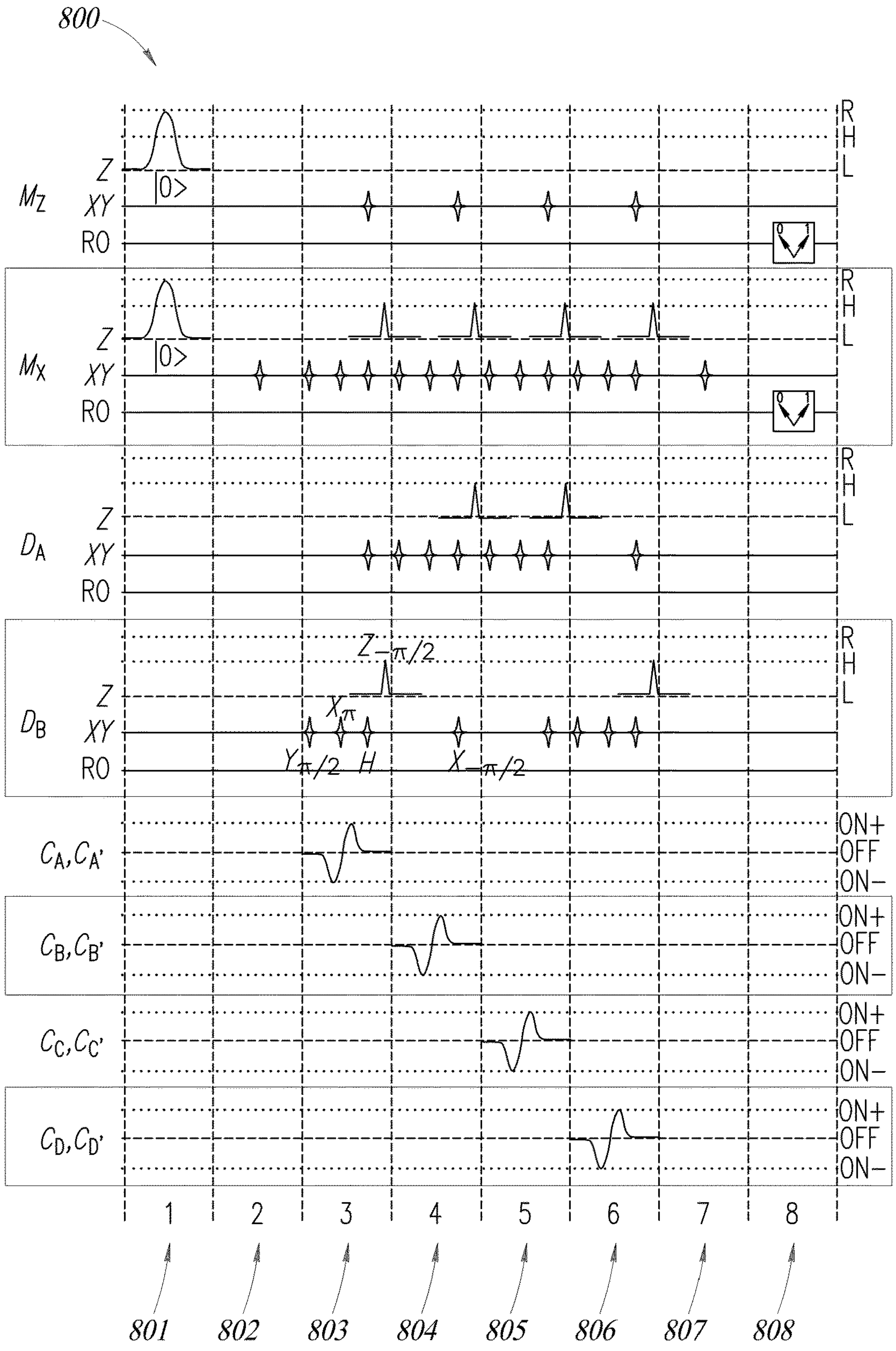
FIG. 8 is a diagram of an example CNOT waveform sequence using the quantum processor of FIG. 4, in accordance with the present systems, devices, and methods.

FIG. 8 is a diagram of an example CNOT waveform sequence 800 that can, in some implementations, be performed using processor 400 of FIG. 4. CNOT waveform sequence 800 has been divided in FIG. 8 in eight uniform time blocks 801, 802, 803, 804, 805, 806, 807 and 808 (along horizontal axis), for ease of illustration, that provide an example implementation which corresponds to the acts of method 900 of FIG. 9.

Figure 9:
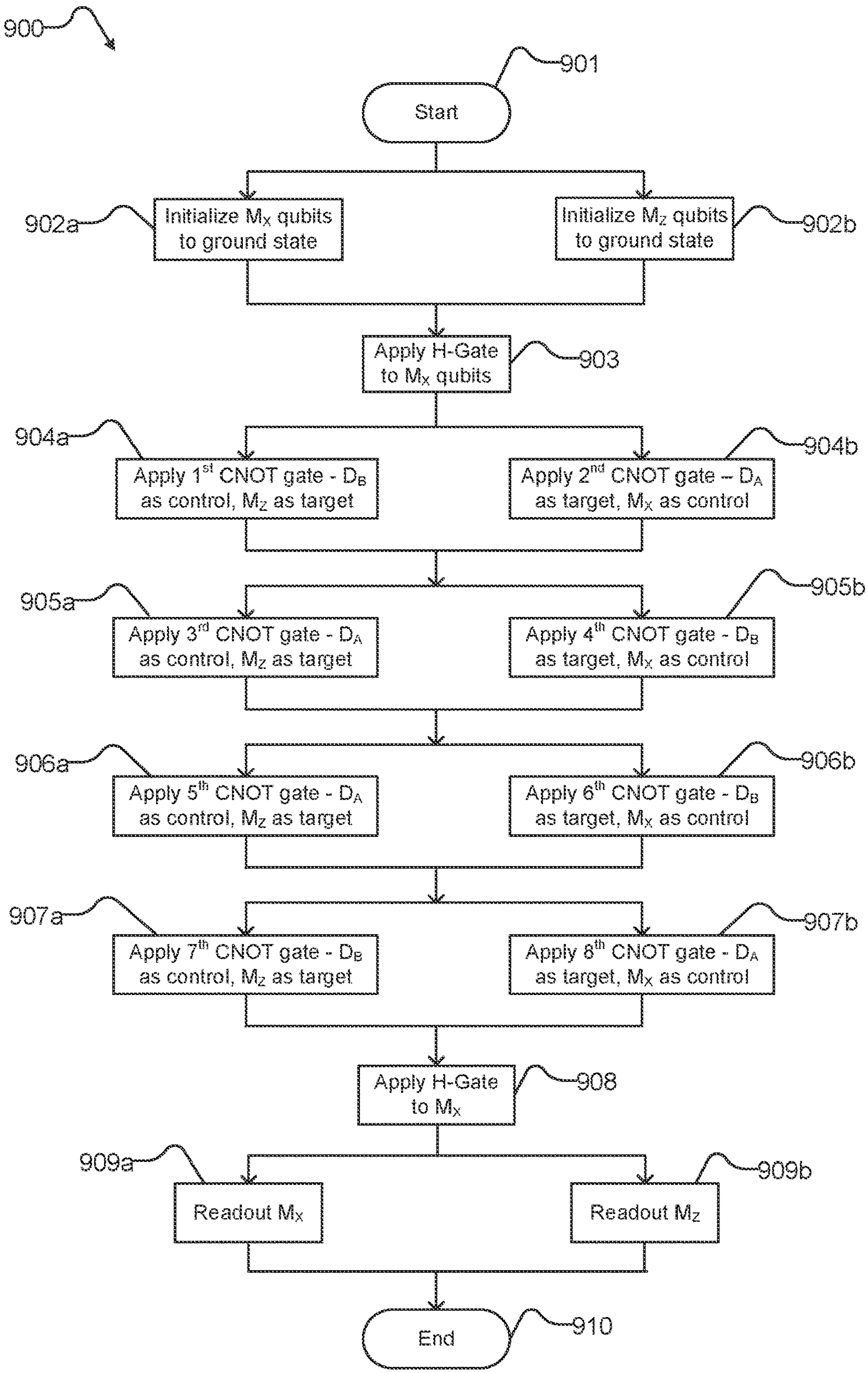
FIG. 9 is a flow diagram illustrating an example surface code method in a quantum processor, in accordance with the present systems, devices, and methods.

FIG. 9 is a flow diagram illustrating an example surface code implementation method 900 that can be performed in a quantum processor, for example quantum processor 400 of FIG. 4, including qubit control lines and coupler control lines of FIGS. 6 and 7, respectively.

Method 900 may be executed by a classical computer, for example digital computer 102 of FIG. 1, in communication with the quantum processor. Method 900 comprises acts 901, 902*a*, 902*b*, 903, 904*a*, 904*b*, 905*a*, 905*b*, 906*a*, 906*b*, 907*a*, 908, 909*a*, 909*b*, and 910; however, a person skilled in the art will understand that the number of acts is an example, and in some implementations, certain acts may be omitted, further acts may be added, and/or the order of the acts may be changed. Method 900 implements sequences 500*a* and 500*b* of FIGS. 5A and 5B, respectively, and CNOT waveform sequence 800 of FIG. 8.

Method 900 starts at 901, for example in response to a call from another routine.

Acts 902*a* and 902*b* are executed by digital computer 102 in parallel or concurrently, or even simultaneously. Acts 902*a* and 902*b* correspond to time block 801 of FIG. 8 and act 501 of FIGS. 5A and 5B.

At 902*a*, digital computer 102 initializes qubits ($M_X$) in third plurality of qubits 403 to their ground state. In at least one implementation, digital computer 102 may cause a pulse to be applied to the CJJ of qubits $M_X$ via the second VHF control line in third bundle of analog lines 603 to cause a rotation about the Z-axis of the Bloch sphere. In another implementation, digital computer 102 may cause a large-amplitude tilt to be applied to the qubit body of qubits $M_X$ via the first VHF control line in third bundle of analog lines 603.

At 902*b*, digital computer 102 initializes qubits ($M_Z$) in fourth plurality of qubits 404 to their ground state. In at least one implementation, digital computer 102 may cause a pulse to be applied to the CJJ of qubits $M_Z$ via the second VHF control line in fourth bundle of analog lines 604 to cause a rotation about the Z-axis of the Bloch sphere. In another implementation, digital computer 102 may cause a large-amplitude tilt to be applied to the qubit body of qubits $M_Z$ via the first VHF control line in fourth bundle of analog lines 604. At 903, digital computer 102 causes an Hadamard gate (H-gate) to be applied to qubits $M_X$. In at least one implementation, digital computer 102 causes a pulse to be applied to the body of the qubits via the first VHF control line in third bundle of analog lines 603 to cause a rotation about an axis in the XY-plane. Since at 902*a* qubits $M_X$ have been initialized to the energy Eigenbasis ground state |0⟩, qubits $M_X$ will then be in the superposition state |+⟩. Act 903 corresponds to time block 802 of FIG. 8 and act 502 of FIGS. 5A and 5B. Acts 904*a* and 904*b* are executed by digital computer 102 in parallel or concurrently, or even simultaneously. Acts 904*a* and 904*b* correspond to time block 803 of FIG. 8 and act 503 of FIGS. 5A and 5B, implementing acts A and A' of sequences ABCD and A'B'C'D', respectively.

At 904*a*, digital computer 102 causes a first CNOT gate to be applied to data qubits (DB) in second plurality of qubits 402 as control qubits and to qubits $M_Z$ in fourth plurality of qubits 404 as target qubits. This may be achieved using second bundle of analog lines 602, fourth bundle of analog lines 604, and first set of analog lines 701, as described above with reference to FIG. 7.

At 904*b*, digital computer 102 causes a second CNOT gate to be applied to data qubits (DA) in first plurality of qubits 401 as target qubits and to qubits $M_X$ in third plurality of qubits 403 as control qubits. This may be achieved using first bundle of analog lines 601, third bundle of analog lines 603, and fifth set of analog lines 705 as described above with reference to FIG. 7.

Acts 905*a* and 905*b* are executed by digital computer 102 in parallel or concurrently, or even simultaneously. Acts 905*a* and 905*b* correspond to time block 804 of FIG. 8 and act 504 of FIGS. 5A and 5B, implementing acts B and B' of sequences ABCD and A'B'C'D', respectively.

At 905*a*, digital computer 102 causes a third CNOT gate to be applied to data qubits DA in first plurality of qubits 401 as control qubits and to qubits $M_Z$ as target qubits, using: first bundle of analog lines 601, fourth bundle of analog lines 604, and second set of analog lines 702, as described above with reference to FIG. 7.

At 905*b*, digital computer 102 causes a fourth CNOT gate to be applied to data qubits DB in second plurality of qubits 402 as target qubits and to qubits $M_X$ as control qubits, using: second bundle of analog lines 602, third bundle of analog lines 603, and sixth set of analog lines 706, as described above with reference to FIG. 7.

Acts 906*a* and 906*b* are executed by digital computer 102 in parallel or concurrently, or even simultaneously. Acts 906*a* and 906*b* correspond to time block 805 of FIG. 8 and act 505 of FIGS. 5A and 5B, implementing acts C and C' of sequences ABCD and A'B'C'D', respectively.

At 906*a*, digital computer 102 causes a fifth CNOT gate to be applied to data qubits DA in first plurality of qubits 401 as control qubits and to qubits $M_Z$ as target qubits, using: first bundle of analog lines 601, fourth bundle of analog lines 604, and third set of analog lines 703, as described above with reference to FIG. 7.

At 906*b*, digital computer 102 causes a sixth CNOT gate to be applied to data qubits DB in second plurality of qubits 402 as target qubits and to qubits $M_X$ as control qubits, using: second bundle of analog lines 602, third bundle of analog lines 603, and seventh set of analog lines 707, as described above with reference to FIG. 7.

Acts 907*a* and 907*b* are executed by digital computer 102 in parallel or concurrently, or even simultaneously. Acts 907*a* and 907*b* correspond to time block 806 of FIG. 8 and act 506 of FIGS. 5A and 5B, implementing acts D and D' of sequences ABCD and A'B'C'D', respectively.

At 907*a*, digital computer 102 cause a seventh CNOT gate to be applied to data qubits DB in second plurality of qubits 402 as control qubits and to qubits $M_Z$ as target qubits, using: second bundle of analog lines 602, fourth bundle of analog lines 604, and fourth set of analog lines 704, as described above with reference to FIG. 7.

At 907*b*, digital computer 102 causes an eighth CNOT gate to be applied to data qubits DA in first plurality of qubits 401 as target qubits and to qubits $M_X$ as control qubits, using: first bundle of analog lines 601, third bundle of analog lines 603, and eighth set of analog lines 708, as described above with reference to FIG. 7.

At 908, digital computer 102 causes an H-gate to be applied to qubits $M_X$. In at least one implementation, digital computer 102 may cause a pulse to be applied to the body of the qubit via first VHF control line in third bundle of analog lines 603 to cause a rotation about an axis in the XY-plane of the Bloch sphere. Act 908 corresponds to time block 807 of FIG. 8 and act 507 of FIGS. 5A and 5B.

Acts 909*a* and 909*b* are executed by digital computer 102 in parallel or concurrently, or even simultaneously. Acts 909*a* and 909*b* correspond to time block 808 of FIG. 8 and act 508 of FIGS. 5A and 5B.

At 909*a*, digital computer 102 causes states of qubits $M_X$ to be read out. In some implementations, qubits $M_X$ are read out via readout control system 128. In at least one implementation, a frequency multiplexing resonant readout (FMRR) is employed, as explained in U.S. Pat. No. 10,938,346.

At 909*b*, digital computer 102 causes states of qubits $M_Z$ to be read out. By reading out the stabilizer qubits, one may advantageously side-step the restrictions of the no-cloning theorem that prevent explicitly measuring the data qubits to identify errors. In some implementations, qubits $M_X$ are read out via readout control system 128. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 910, method 900 ends, until it is, for example, invoked again.

Device Homogenization and the Use of Template Signals

A surface code quantum processing unit (QPU) may suffer from manufacturing defects or differences between devices on the same die. Some defects can render a small number of devices unusable in an otherwise functional die. Therefore, it may be advantageous to use on-chip magnetic flux DACs to homogenize qubit and coupler properties, as well as to isolate broken devices. In-situ homogenization of devices is highly desirable because it may enable the surface code to be run on a QPU using only a small number of shared bias lines, as is the case in the implementations shown in FIGS. 6 and 7.

Physical Qubit Homogenization

The qubits in a quantum processor, such as quantum processor 400, may be controlled by modulated AC signals to perform rotations about axes in the XY-plane and about the Z-axis of the Bloch sphere. For a fluxonium qubit, these controls correspond to applying magnetic signals to the qubit body and CJJ, respectively. It may be desirable to use compound-compound Josephson junctions (CCJJs) to homogenize manufacturing variations (Harris et al., 2010, Phys. Rev. B81, 134510) in both the qubits and the inter-qubit couplers. It may further be desirable to have such a qubit CCJJ in communication with static on-chip DACs and an analog pre-bias line in communication with the minor lobes of the CCJJ to apply signals to ameliorate junction variations, as well as a programmable DAC in communication with the major loop of the qubit to homogenize the energy spacing of the qubit at a low (L) operating point, as shown in FIG. 8. In at least one implementation, qubit energy spacings are homogenized using CCJJ controls as discussed above. Given that small-but-fast pulses to target biases are shared among members of a qubit sub-lattice, as shown in FIG. 8, the mutual inductances between global biases and target loops of each qubit can beneficially be in-situ tunable to homogenize the response of the qubits to these signals.

As described below with reference to FIG. 10, a local DAC can flux bias the tunable mutual inductances between global biases and target loops of each qubit to a point where the response of the qubit is homogenized, despite attenuation and distortion of the control pulses as the control pulses travel down the control lines, as well as differences in qubit-field coupling matrix elements between qubits. All time-dependent signals are provided by the shared XY- and Z-control lines, while the tunable mutual inductances between the global biases and their target loops remain static during the surface code cycle.

Figure 10:
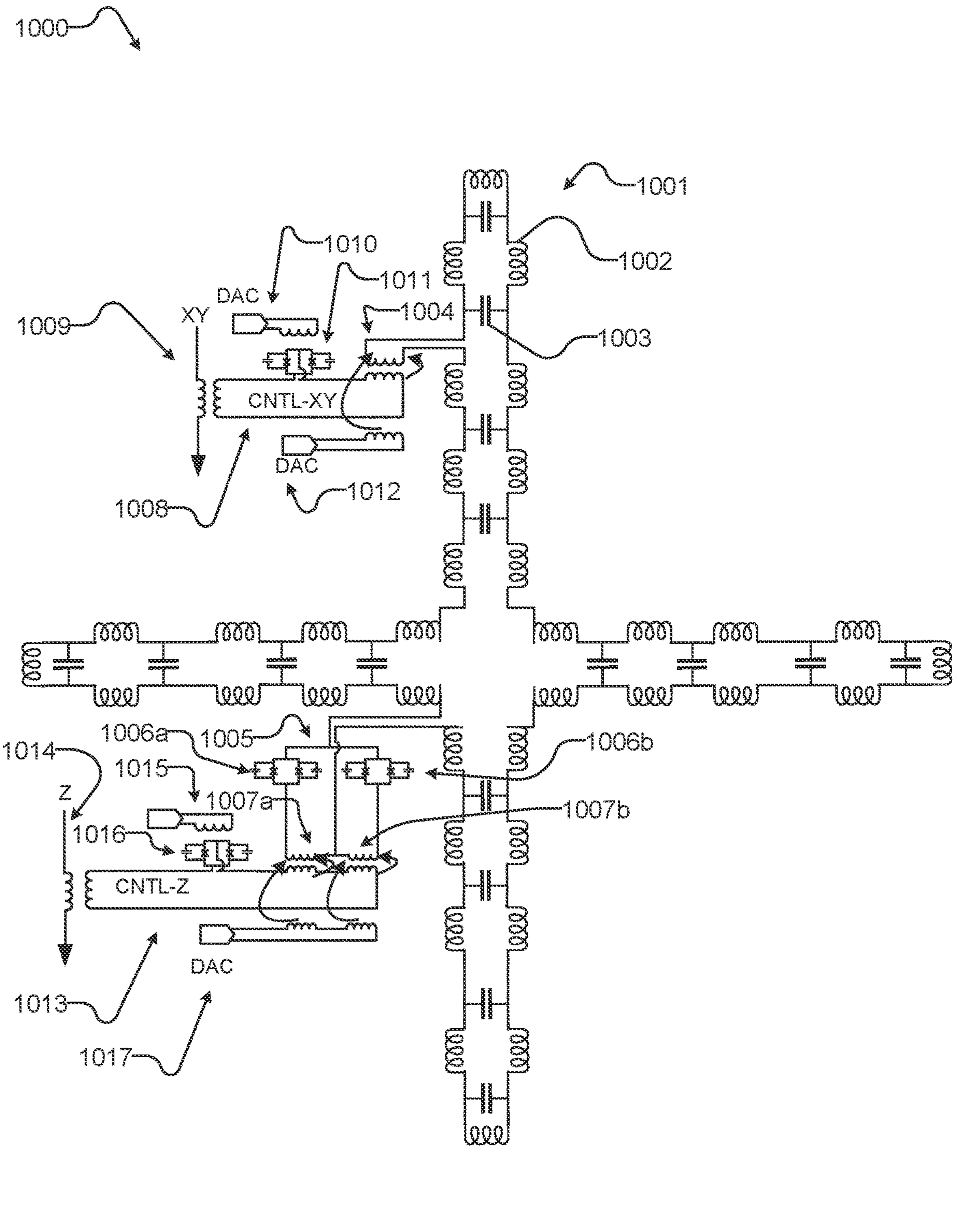
FIG. 10 is a schematic diagram of a qubit with response homogenization devices, in accordance with the present systems, devices, and methods.

FIG. 10 is a schematic diagram 1000 of an example qubit 1001 with homogenization structures 1008 and 1013. Qubit 1001 is a lumped element fluxonium qubit with high kinetic inductance material, similar to superconducting qubit 300 of FIG. 3. Qubit 1001 comprises a plurality of inductances 1002 (only one called out in FIG. 10 to reduce visual clutter) shunted by a plurality of capacitors 1003 (only one called out in FIG. 10 to reduce visual clutter). Qubit 1001 further comprises an inductance 1004, and a compound-compound Josephson junction (CCJJ) structure 1005. CCJJ structure 1005 comprises a first CJJ 1006*a* in parallel with a second CJJ 1006*b*. A first inductance 1007*a* is in series with first CJJ 1006*a* and a second inductance 1007*b* is in series with second CJJ 1006*b*.

A first control structure 1008 (CNTL-XY) is communicatively coupled via inductance 1004 of qubit 1001 and mediates signals from a shared VHF control line 1009 to inductance 1004 to facilitate rotations about the XY-plane of the Bloch sphere. State rotations about an axis in the XY-plane of the Bloch sphere are realized by applying VHF pulses to inductance 1004 via first control structure 1008 (CNTL-XY). The time-dependent control signal applied to shared VHF control line 1009 can be referred to as a template signal. Control structure 1008 facilitates custom per-qubit tuning of the magnitude of the VHF pulse seen by qubit 1001. In the presence of modest variations of device parameters of a few percent, custom tuning of the applied control signal amplitude can be sufficient to ensure high gate fidelity across an entire qubit sub-lattice. The custom tuning can be accomplished by setting a static flux bias using a first DAC 1010 that applies a static flux bias to a CJJ loop 1011 of control structure 1008.

In addition to control structure 1008, a second DAC 1012 is communicatively coupled to inductance 1004. The purpose of second DAC 1012 is to apply a static flux bias to the body of qubit 1001 to compensate for flux offset in the body of qubit 1001. DAC 1012 does not provide control to first control structure 1008.

A second control structure 1013 (CNTL-Z) is communicatively coupled to CCJJ structure 1005 to facilitate rotations about the Z-plane of the Bloch sphere. Rotations about the Z-axis of the Bloch sphere are realized by applying VHF pulses to CCJJ structure 1005 via second control structure 1013 (CNTL-Z). The time-dependent control signal applied to a shared VHF control line 1014 is referred to as a template signal. Control structure 1013 facilitates custom per-qubit tuning of the magnitude of the VHF pulse seen by qubit 1001. In the presence of modest variations of device parameters of a few percent, custom tuning of the applied control signal amplitude can be sufficient to ensure high gate fidelity across an entire qubit sub-lattice. The custom tuning can be accomplished by setting a static flux bias using a third DAC 1015 that applies a static flux bias to a CJJ loop 1016 of control structure 1013.

In addition to control structure 1013, a fourth DAC 1017 is communicatively coupled to CCJJ structure 1005. The purpose of fourth DAC 1017 is to apply a static bias to CCJJ structure 1005 of qubit 1001 to compensate offset in CCJJ structure 1005. DAC 1017 does not provide control to second control structure 1013.

Inter-Qubit Coupler Homogenization

The coupler operating point is pulsed during surface code execution to implement entangling gates, with coupler-generated nonlinear flux offsets in qubits being undesirable (Harris et al., 2009, Phys. Rev. B80, 052506). Such flux offsets may be a result of coupler inhomogeneity. CCJJ control heads can be used for inter-qubit couplers with static DAC biases on the minor lobes. Furthermore, a DAC that flux biases the coupler body may be used to nullify any static flux offset in the coupler body.

Time-dependent inter-qubit coupler control can be realized by mediating the coupling between a shared analog bias represented by $C_i$ ($i \in$[A, B, C, D, A', B', C', D']) and the CCJJ major loop of the inter-qubit coupler. The mediation is provided by a tunable inductive coupler. Additionally, a local DAC can provide a bias signal to the CCJJ major lobe of the inter-qubit coupler. The DAC is used to bias the inter-qubit coupler at its zero coupling energy (g=0) point. A state where zero signal is present on the analog bias control line $C_i$ can be considered a low operating level of the coupler. $C_i$ then biases the coupler at a high operating level. A modest variation in qubit persistent currents is acceptable, given that the inter-qubit coupler controls allow homogenization of the resultant two-qubit gate.

Figure 11:
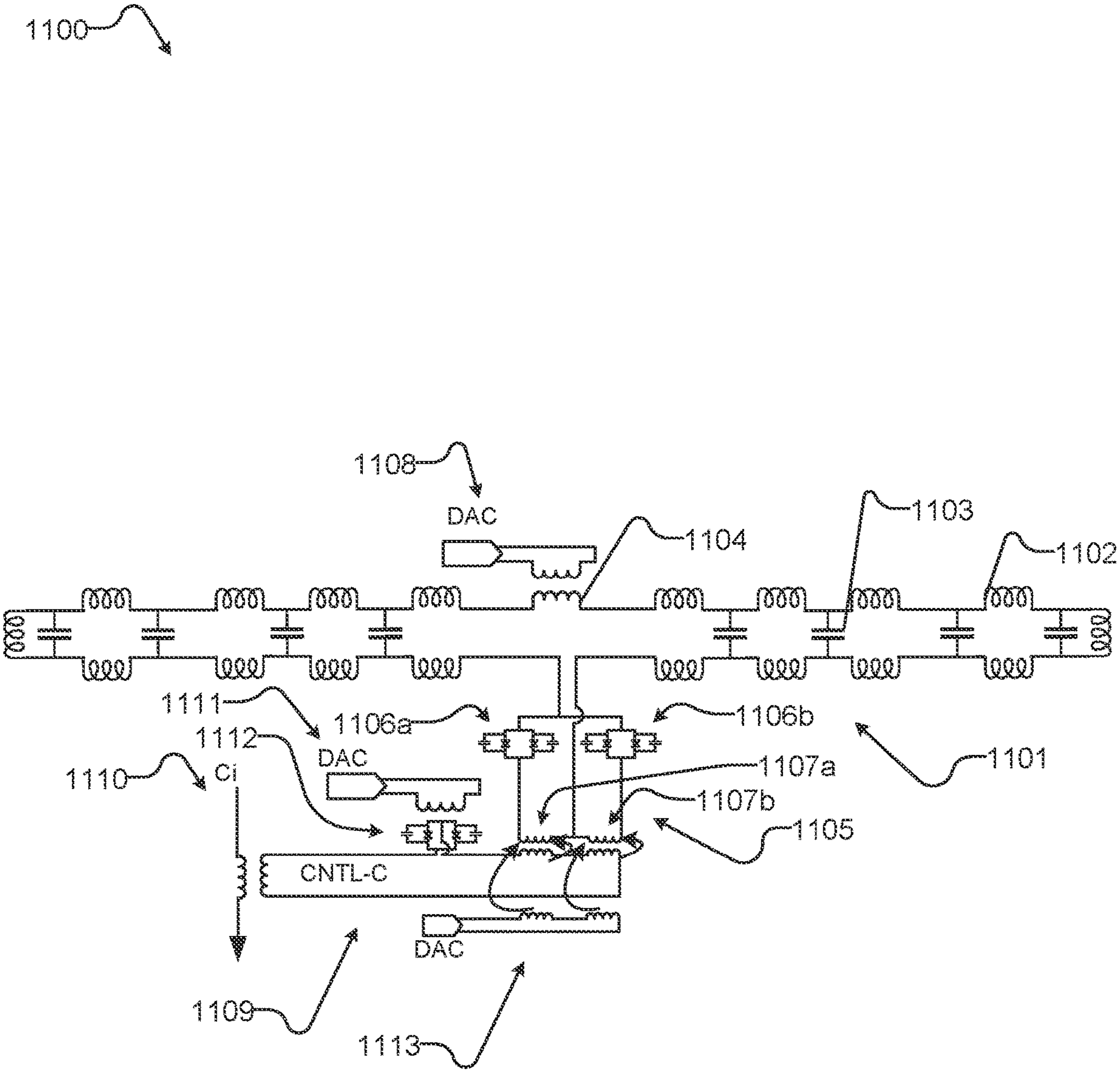
FIG. 11 is a schematic diagram of a coupler with response homogenization devices, in accordance with the present systems, devices, and methods.

FIG. 11 shows a schematic diagram 1100 of an inductive coupler 1101 with a first DAC 1108 and a homogenization structure 1109. Inductive coupler 1101 may be an inter-qubit coupler in the first or second plurality of couplers 405 and 406 of FIG. 4. Inductive coupler 1101 is a lumped element coupler comprising a plurality of inductances 1102 in series (only one called out in FIG. 11 to reduce visual clutter), shunted by a plurality of capacitors 1103 (only one called out in FIG. 11 to reduce visual clutter). Inductive coupler 1101 further comprises an inductance 1104 and a CCJJ structure 1105. CCJJ structure 1105 comprises a first CJJ 1106*a* arranged in parallel with a second CJJ 1106*b*. A first inductance 1107*a* is arranged in series with first CJJ 1106*a* and a second inductance 1107*b* is arranged in series with second CJJ 1106*b*.

First DAC 1108 is communicatively coupled to inductance 1104 and is operable to provide static bias to the loop of inductive coupler 1101 to compensate for flux offset in coupler 1101.

A control structure 1109 (CNTL-C) is communicatively coupled to CCJJ structure 1105 and is operable to provide a tunable flux to CCJJ structure 1105, mediating the DC analog control signal from line 1110 ($C_i$). The time-dependent control signal applied to shared VHF control line 1110 is referred to as a template signal. Control structure 1109 facilitates custom per-coupler tuning of the magnitude of the VHF pulse seen by coupler 1101. In the presence of modest variations of device parameters of a few percent, custom tuning of the applied control signal amplitude can be sufficient to ensure high gate fidelity across an entire coupler sublattice. The custom tuning can be accomplished by setting a static flux bias using a second DAC 1111 that applies a static flux bias to a CJJ loop 1112 of control structure 1109.

In addition to control structure 1109, a third DAC 1113 is communicatively coupled to CCJJ structure 1105. The purpose of third DAC 1113 is to apply a static bias to CCJJ structure 1105 of coupler 1101 to compensate for flux offset in CCJJ structure 1105.

Quantum Logic Unit

Figure 12:
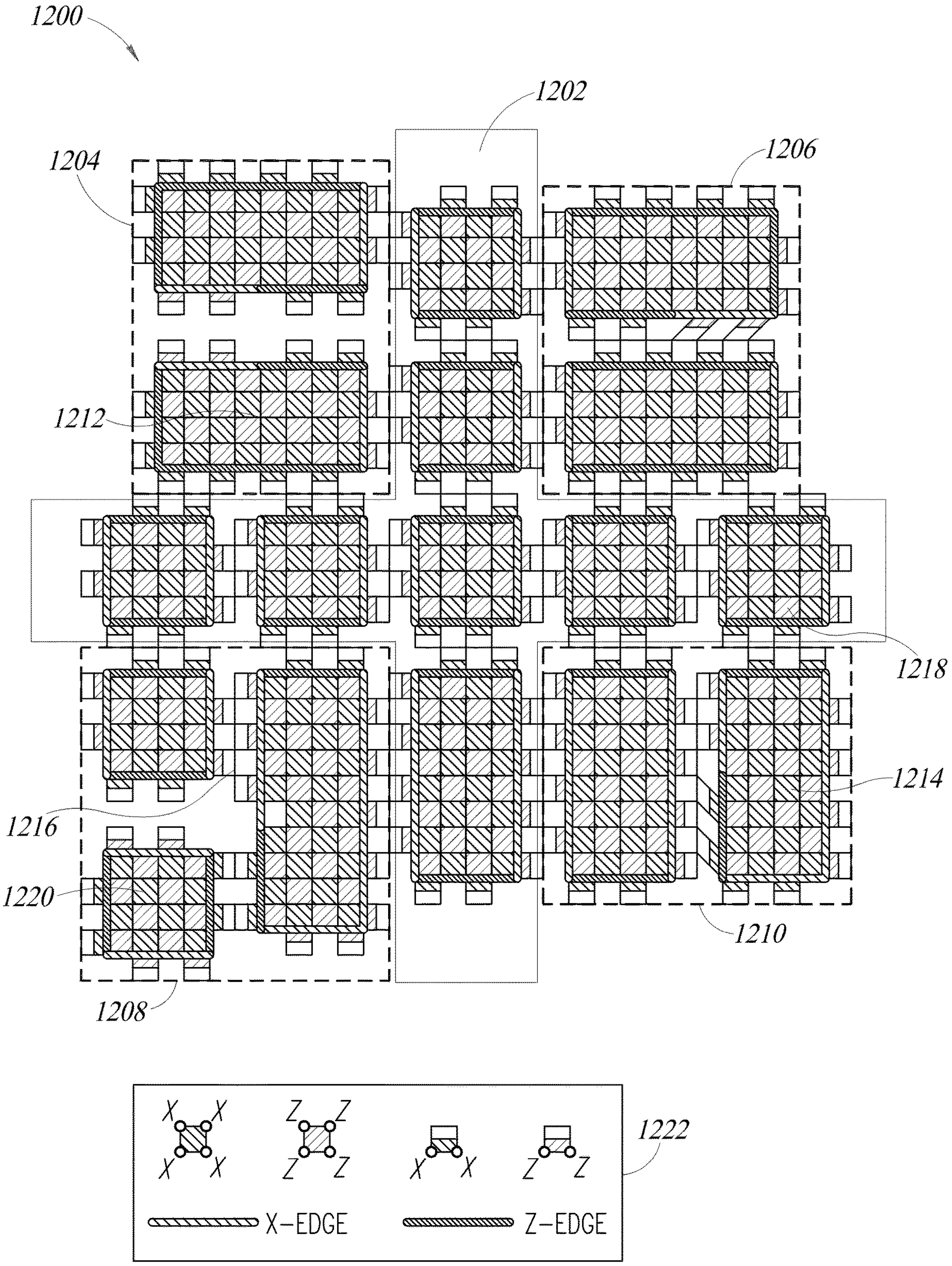
FIG. 12 is a schematic diagram of an example quantum logic unit that can be employed in accordance with the present systems, devices, and methods.

FIG. 12 is a schematic diagram of an example quantum logic unit (QLU) 1200 that can be employed in accordance with the present systems, devices, and methods. The quantum logic unit (QLU) 1200 can, for example, be part of a quantum processor, such as quantum processor 126 of FIG. 1. QLU 1200 has a plurality of physical qubits and a plurality of couplers, each coupler providing controllable coupling between a pair of physical qubits, as described with respect to FIG. 4. QLU 1200 shows qubits and couplers as provided in the portion of quantum processor 400 in an alternative representation. In FIG. 12, stabilizers are represented by filled squares or rectangles, with the shade of the filled square or rectangle representing the type of parity measurement qubit at the center of the face, as shown in legend 1222. See FIG. 4 and International Application No. PCT/US2021/024134 for a further discussion of parity stabilizers. Data qubits are located at the vertices of each square or rectangle. The edges of each lattice are colored (black or grey bold lines) based on the type of logical qubit operator that can be constructed from a string of Pauli operators taken along that edge. The physical qubit and coupler arrangement is similar to what is shown in FIG. 4 with both data qubits and error measurement qubits. QLU 1200 in FIG. 12 has distance d=5. In this context, distance d is defined as the smallest number of data qubits that must be simultaneously bit or phase flipped to realize either a logical X or a logical Z operation.

QLU 1200 contains logical qubits 1218 forming shift register stages (only one called out to reduce clutter) in a shaded cross region providing a shift register region 1202 and 2-local interaction regions (1204, 1206, 1208, 1210). Shift register region 1202 and 2-local interaction regions 1204, 1206, 1208, 1210 are made up of one or more logical qubits, each logical qubit comprising a subset of physical qubits of the plurality of physical qubits coupled to form a logical qubit, as discussed with respect to FIG. 4. Logical qubits in the interaction regions and shift registers may also be used as memory when not in use for computation and other interactions, such that data may reside on the logical qubits of the shift register or the local interaction regions. That is, where a particular region is not in use, its logical qubits are available as memory. In some implementations a bank of memory registers may also be provided. Region 1204 (bound by broken lines) is the YY interaction zone, region 1206 (bound by broken lines) is the YZ interaction zone, region 1208 (bound by broken lines) is the XZ interaction zone, and region 1210 (bound by broken lines) is the XY interaction zone. Each interaction zone is arranged to provide the indicated type of interaction, and in some implementations may be hard-wired to provide only the indicated type of interaction. QLU is made up of a plurality of logical qubits, including rectangular logical qubits at 1212 and 1214, and square logical qubits at 1218 and 1220. QLU 1200 includes blocks of surface code, as discussed with respect to FIG. 4, to form logical qubit blocks. For example, QLU 1200 has logical qubit 1212 and 1214. Each logical qubit block is made up of multiple physical qubits of the plurality of physical qubits coupled by the couplers to form a logical qubit as discussed above with respect to FIG. 4. Merge blocks such as merge block 1216 are formed between adjacent logical qubits. Merge blocks are made up of at least one line of physical data qubits (hereinafter also referred to as "merge block qubits") arranged between the two logical qubits. The merge block qubits are controlled independently of the logical qubit. In some implementations, one or more control lines are devoted to control of each merge block individually. A shift register logical qubit is provided in selective communication with at least two interaction logical qubits, such as shift register logical qubit 1218 in communication with interaction logical qubit 1214. In some implementations, shift register region 1202 is a plurality of logical qubits selectively coupled by a plurality of merge blocks. One or more 2-local interaction regions (1204, 1206, 1208, 1210) are provided in communication with and connecting shift register stages.

Each quantum logic block may have one or more independent control lines providing a shared control bias signal to at least a subset of the physical qubits in the respective logical qubit. See FIGS. 6 and 7 for a discussion of control line arrangements. In some implementations, the one or more independent control lines can be activated such that each respective logical qubit of a group is provided with a signal to perform a given action simultaneously. A group may be a particular 2-local interaction register, such as one of 2-local interaction regions 1204, 1206, 1208, 1210. Each region of the QLU may be hard-wired to perform a specific type of interaction, with activation of devoted control lines causing that specific interaction to occur.

Figure 13:
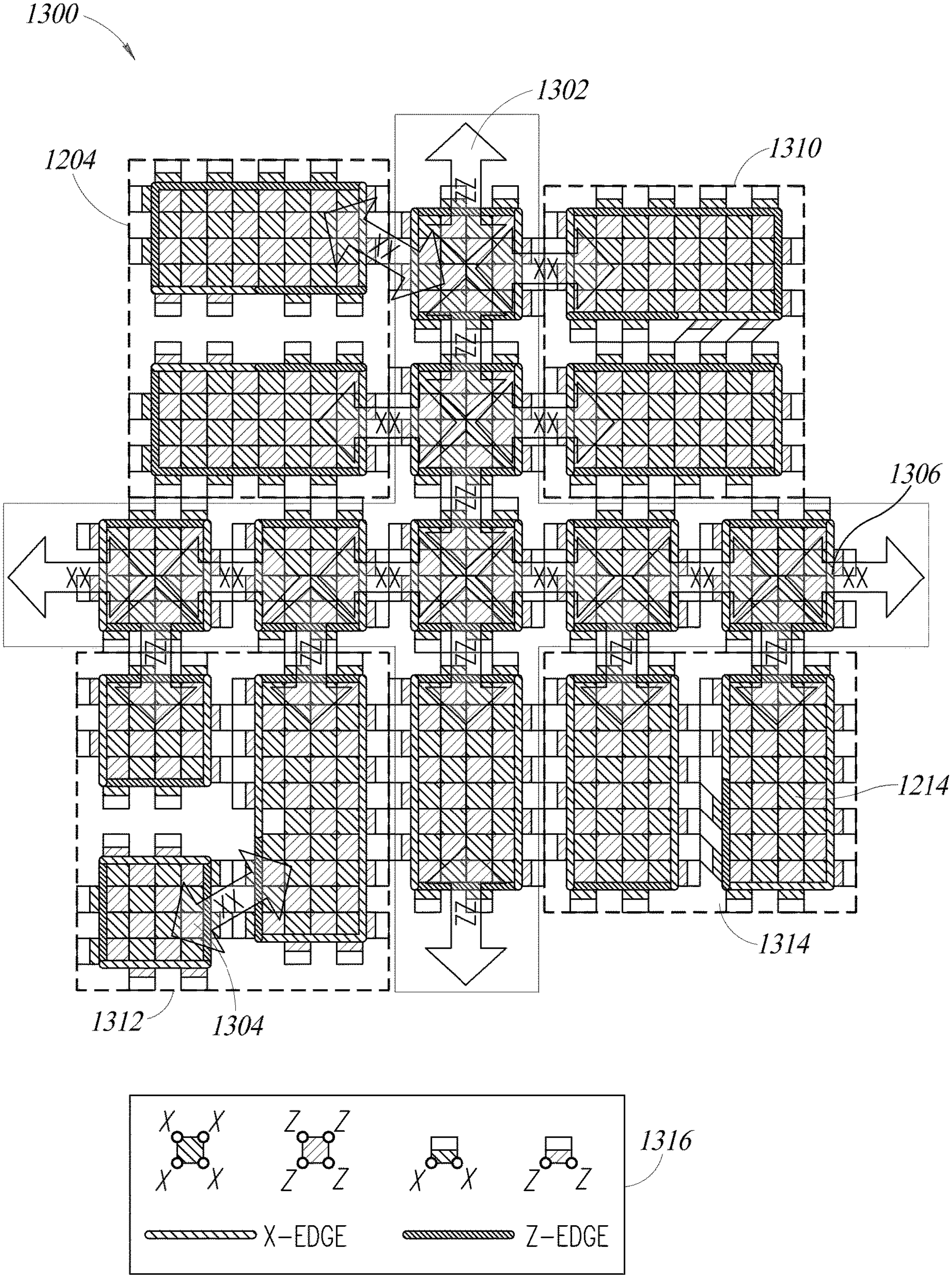
FIG. 13 is a schematic diagram of an example quantum logic unit with XX and ZZ interaction locations that can be employed in accordance with the present systems, devices, and methods.

FIG. 13 is a schematic diagram of an example implementation of a quantum logic unit (QLU) 1300 that can be employed in accordance with the present systems, devices, and methods. In particular, FIG. 13 illustrates possible directions of data movement within QLU 1300 along with a legend 1316. QLU 1300 is similar to QLU 1200, however FIG. 13 differs from FIG. 12 in that the QLU is annotated to indicate the directions of data movement during the performance of operations. Region 1308 is the YY interaction zone, region 1310 is the YZ interaction zone, region 1312 is the XZ interaction zone, and region 1314 is the XY interaction zone. Symmetric XX and ZZ interactions are found between horizontal and vertical movements, respectively. One exception occurs within the XZ interaction zone, where a ZZ interaction occurs diagonally at 1304. In order to move data across adjoining Z-edges, as shown by the vertical ZZ movements 1302 (only one called out to reduce clutter) and diagonal ZZ movement 1304 in QLU 1300, the target and merge blocks' data qubits are initialized in the $|+\rangle$ state, the merge operation corresponds to a ZZ measurement, and the source and merge blocks' data qubits are measured in the X-basis. For movement across adjoining X-edges, as shown by the horizontal XX movements 1306 (only one called out to reduce clutter) in QLU 1300, the target and merge blocks' data qubits are initialized in the $|0\rangle$ state, the merge operation corresponds to an XX measurement, and the source and merge blocks' data qubits are measured in the Z-basis. Excluding the ZZ diagonal movement in the XZ zone, the merge operations may be equivalent to turning on a patch of standard surface code between the source and target logical qubits. For the aforementioned exception, one column of mixed stabilizers is used to implement a dislocation in the surface code. XX and ZZ 2-local Pauli measurements can be used for qubit movement. In addition, the XX and ZZ merge blocks can also be used for computation if both of the adjacent logical qubits contain data.

Figure 14:
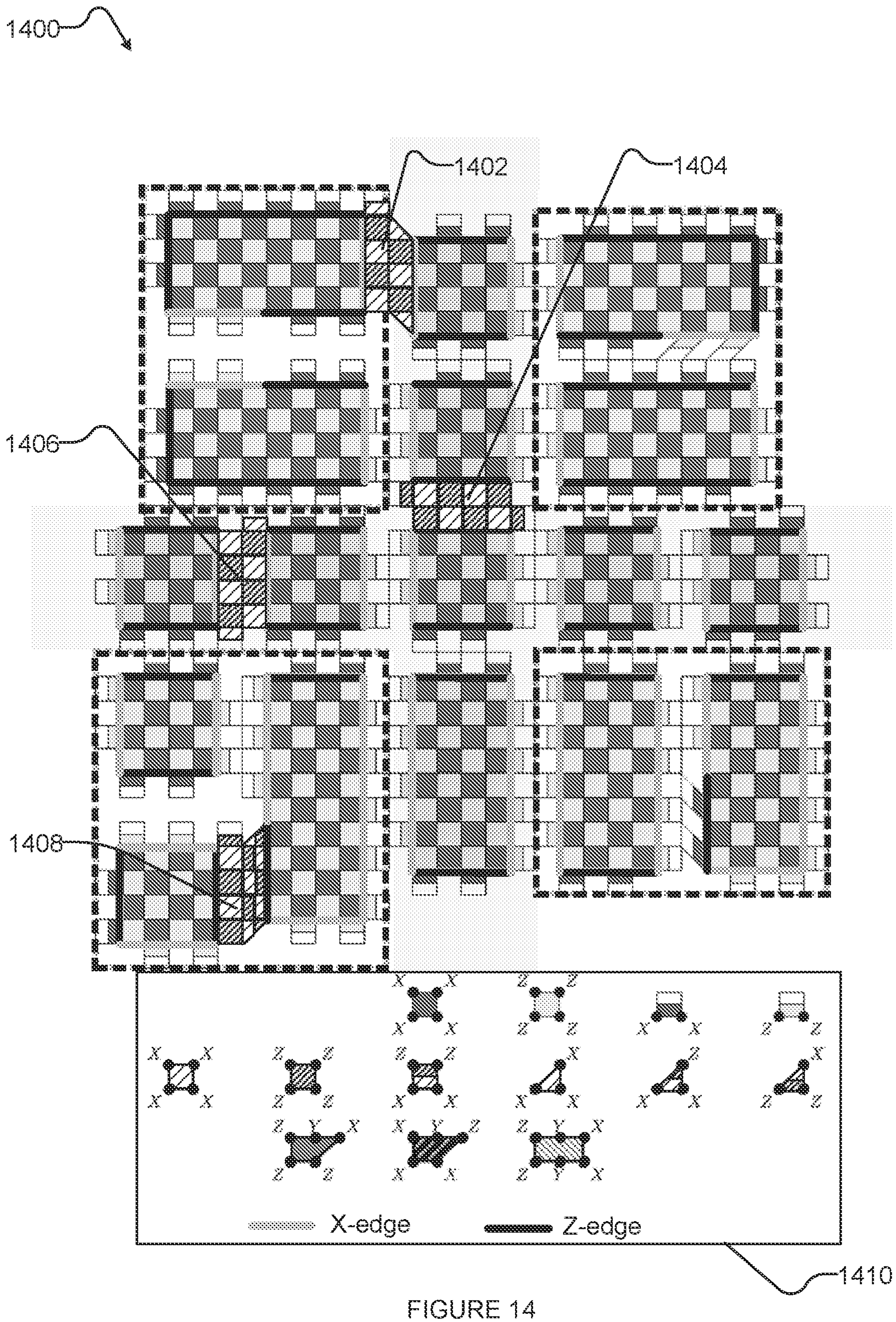
FIG. 14 is a schematic diagram of an example quantum logic unit with patterns of stabilizers within XX and ZZ merge blocks that can be employed in accordance with the present systems, devices, and methods.

FIG. 14 is a schematic diagram of an example quantum logic unit (QLU) 1400 that can be employed in accordance with the present systems, devices, and methods. In particular, FIG. 14 illustrates example patterns of stabilizers that are modified or turned ON by activating the physical data qubits within the XX and ZZ merge blocks, along with a legend 1410. QLU 1400 is similar to QLU 1200 and QLU 1300, and illustrates the QPU when specific merge blocks are activated. A first example activated merge block is shown at 1402, a second activated merge block at 1404, a third activated merge block at 1406, and a fourth activated merge block at 1408. It will be understood that the example activated merge blocks 1402, 1404, 1406, 1408 are representative of merge blocks that can occur between other similar locations on QLU 1400. Specialized portions, such as the triangular portions of 1402 and the split portions of fourth activated merge block 1408, may be operated on using the same schedule as the square stabilizer cells. Merge blocks having mixed types of stabilizers may have control sequences that differ from the standard surface code cycle to accommodate these specialized portions.

Figure 15:
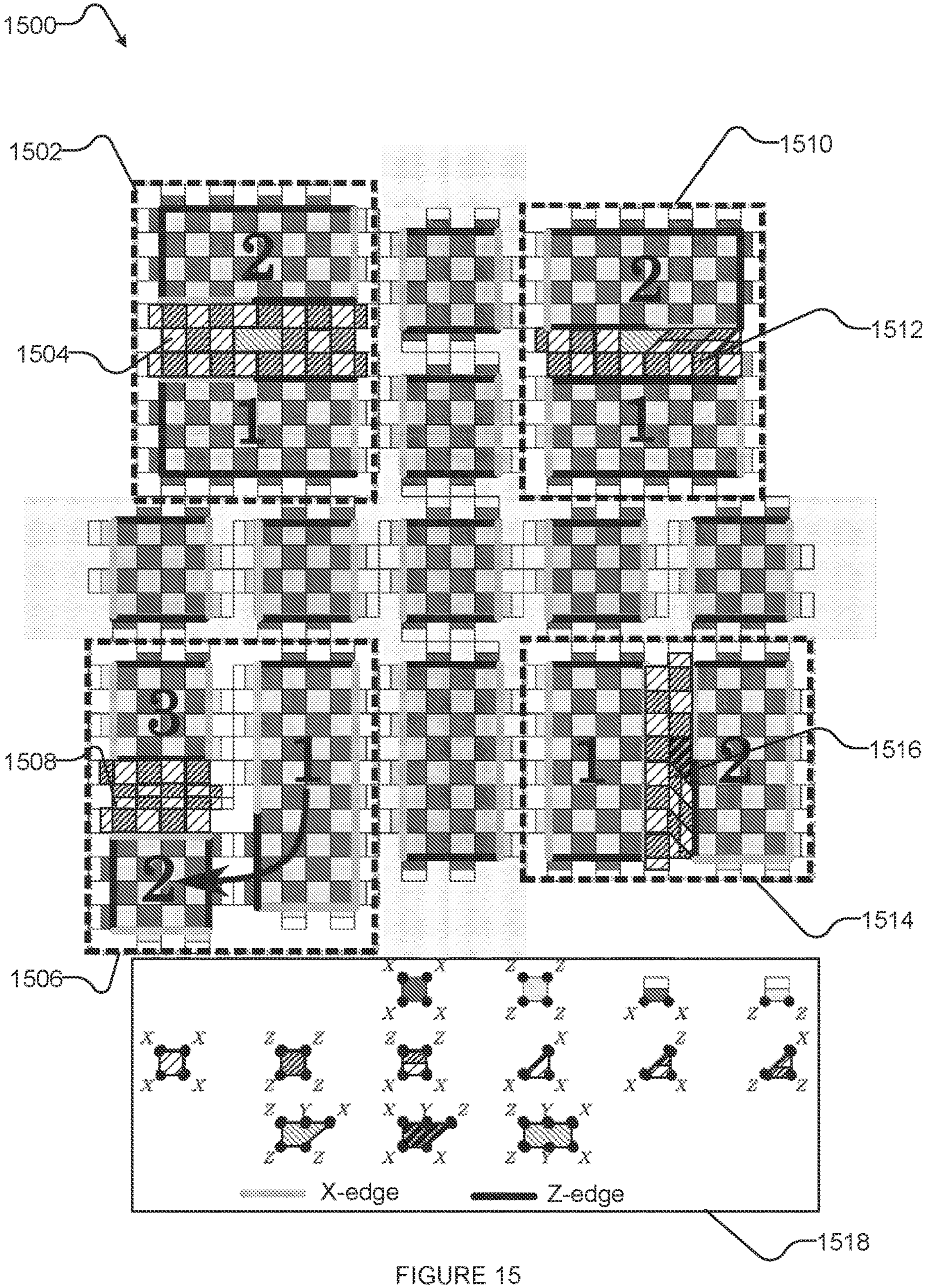
FIG. 15 is a schematic diagram of an example quantum logic unit with merge block stabilizer patterns for XY, XZ, YY, and YZ merges that can be employed in accordance with the present systems, devices, and methods.

FIG. 15 is a schematic diagram of an example quantum logic unit (QLU) 1500 that can be employed in accordance with the present systems, devices, and methods. In particular, FIG. 15 illustrates example merge block stabilizer patterns for XY, XZ, YY, and YZ merges, along with a legend 1518. QLU 1500 is similar to QLU 1200, QLU 1300, and QLU 1400, and illustrates the activation of different merge blocks from those in FIG. 14. The logical qubit blocks within each region are labeled with "1" and "2" (and "3" in the case of the XZ zone) indicating pairs of logical qubits [1,2] (and [2,3] in the case of the XZ zone) involved in a logical interaction. A zone 1502 is the YY zone with a merge block stabilizer pattern 1504 for YY merges. A zone 1506 is the XZ zone with a merge block stabilizer pattern 1508 for XZ merges. A zone 1510 is the YZ zone with a merge block stabilizer pattern 1512 for YZ merges. A zone 1514 is the XY zone with a merge block stabilizer pattern 1516 for XY merges.

A YY merge operation involves merging two mirrored mixed boundaries facing one another. An example merge block design is illustrated as merge block stabilizer pattern 1504 in FIG. 15. The example implementation uses two rows of physical data qubits and three rows of stabilizers. On either side of the merge block's center, the merge block looks like a patch of standard surface code that is toggled ON/OFF. However, at the center of the merge block there is a 6-local parity enforcer. Such local customization of the surface code control waveforms may involve introducing two additional time steps into the global surface code cycle in order to keep all operations synchronized across QLU 1500. The parity of the two data qubits along the vertical axis of symmetry within the special stabilizer are measured in the Y-basis, which is also a departure from the standard surface code cycle. Within the example implementation shown, the YY merge block may possess its own template waveforms and the Y-basis parity measurement control may be run solely to those two aforementioned physical data qubits.

Proposed merge block designs for the mixed 2-local Pauli measurements XY and Y Z are illustrated as merge block stabilizer patterns 1516 and 1512, respectively. One half of the merge block looks like a patch of standard surface code, as to be expected when a pair of X-edges or a pair of Z-edges are merged. In contrast, the other half of the merge zone employs mixed stabilizers, as indicated by the trapezoids and two patterned triangles in FIG. 15. This feature is referred to as a dislocation line. In the middle of the merge block is what may be referred to as a "twist defect". This feature is the 5-local mixed parity stabilizer that is shown touching the edge of logical qubit "2" in both zones 1510 and 1514. A twist involves the use of a Y-basis parity measurement inside the 5-local stabilizer, as one of the data qubits serves as part of both an X-parity and a Z-parity measurement. The result is XZ=iY, so this becomes a measurement in the Y basis.

A proposed data loading path and a proposed merge block for a 2-local XZ Pauli measurement are shown in zone 1506 of FIG. 15. In this case, the first task performed by QLU 1500 is to take a datum off the shift register and rotate its boundaries by $\pi/2$. This is done by moving data through logical qubit "1" and through a "special purpose" ZZ merge onto logical qubit "2", as shown by merge block 1408 in FIG. 14. "Special purpose" indicates that the mixed stabilizers inside merge block 1408 are not used in other ZZ merges as described herein. The second datum is to be loaded into logical qubit "3". The mixed XZ merge is situated between logical qubits "2" and "3". The merge block contains a dislocation line, as discussed above, across its entirety. The XZ block has a second mode of operation: it can be used to rotate logical qubits. The logical qubit to be rotated is first taken off the shift register and moved to position "2". The logical qubit in position "3" is then initialized in the [0]) state prior to turning ON the merge block between "2" and "3". Finally, the rotated logical qubit is taken from position "3" and placed back on the shift register.

It will be understood that quantum logic units 1200, 1300, 1400, and 1500 may form only part of a quantum processor. In some quantum processors, two or more quantum logic units may be communicatively coupled. In some implementations, other types of units may be included, such as units that are dedicated to template waveform distribution, clock synchronization, DAC programming infrastructure, and readout and error syndrome data compression/preprocessing. In addition, on chip structures may be provided to implement other operations. In some implementations, the quantum processor may include units that provide at least one error corrected single qubit operation block that is not in a Clifford group. The Clifford group defines a set of mathematical transformations which affect permutations of the Pauli operators. In some implementations, the at least one error-corrected single qubit operation block may be a magic state distillation module. For example, in some implementations, the "magic state" defined by $|m\rangle = 1/\sqrt{2}[e^{-i\pi/8}|0\rangle + e^{i\pi/8}|1\rangle]$ can be used to implement $\pi/8$ rotations. Multi-qubit Pauli product measurements in combination with $\pi/8$ rotations may be used to implement universal gate model quantum computing. Dedicated on chip structures that generate the states used to perform these $\pi/8$ rotations are referred to as magic state factories. A further discussion of magic state factories can be found in Litinski, A Game of Surface Codes: Large-Scale Quantum Computing with Lattice Surgery, arXiv: 1808.02892 [quant-ph], 2019, which includes a description of algorithms for running these circuits.

Figure 16:
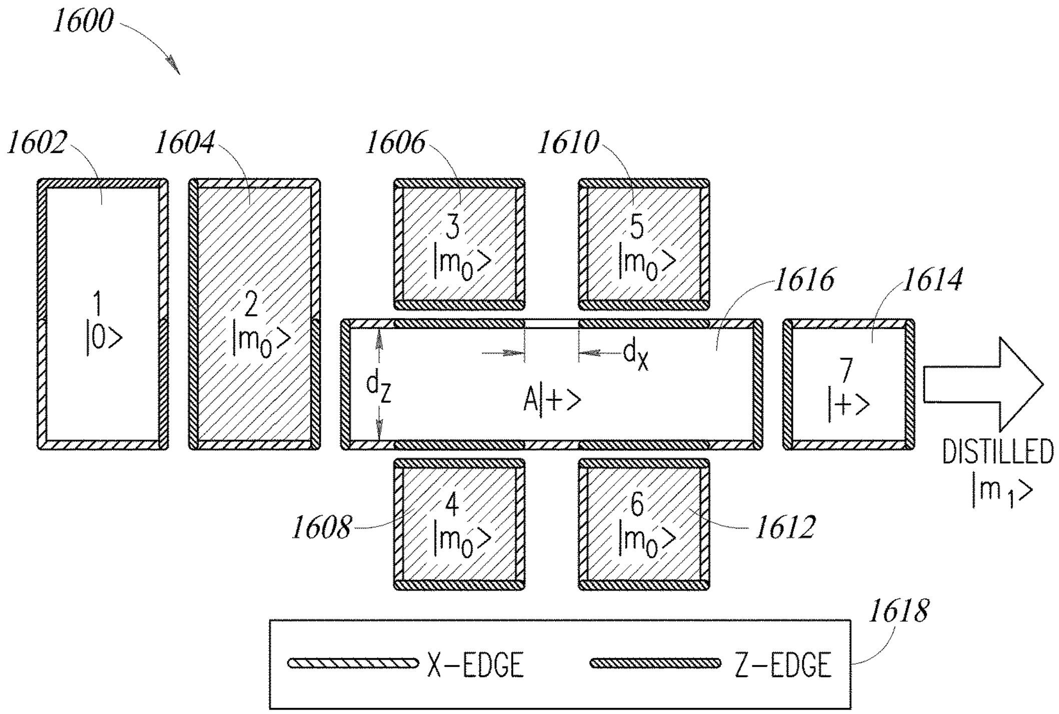
FIG. 16 is a schematic diagram of an example top level magic state distillation module that can be employed in accordance with the present systems, devices, and methods.

FIG. 16 is a schematic diagram of an example implementation of a floorplan for a single level of a magic state distillation module 1600, that can be employed in accordance with the present systems, devices, and methods. In particular, FIG. 16 illustrates a top level, along with a legend 1618. In this context, distillation refers to the act of starting with multiple faulty copies of a desired state and using them to extract one less faulty copy of that desired state. If such a distillation procedure works, the distillation procedure can be concatenated to further reduce the chance of error in a final copy. A magic state distillation module 1600 of FIG. 16 has seven logical qubits (1602, 1604, 1606, 1608, 1610, 1612, 1614) and one logical ancilla qubit 1616.

Figure 17:
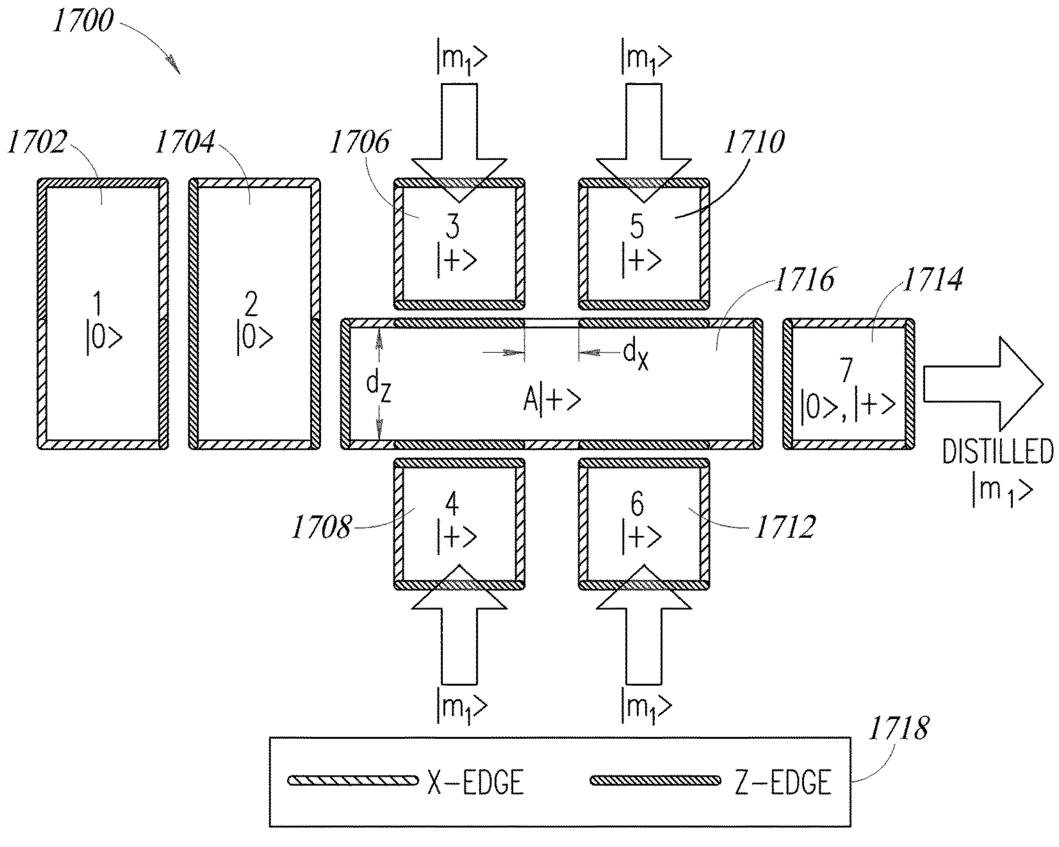
FIG. 17 is a schematic diagram of an example bottom level magic state distillation module that can be employed in accordance with the present systems, devices, and methods.

FIG. 17 is a schematic diagram of an alternative example implementation of a floorplan for a single level of a magic state distillation module 1700, that can be employed in accordance with the present systems, devices, and methods. In particular, FIG. 17 illustrates a bottom level, along with a legend 1718. A magic state distillation module 1700 of FIG. 17 has seven logical qubits (1702, 1704, 1706, 1708, 1710, 1712, 1714) and one logical ancilla qubit 1716.

The seven single logical qubits depicted in each of FIGS. 16 and 17 may be implemented as discussed above, with each logical qubit possessing a single pair of X-edges and a single pair of Z-edges. Each of FIGS. 16 and 17 also includes an eighth ancilla qubit that is a compound object of three logical qubits, and has three pairs of X-edges and three pairs of Z-edges. In FIGS. 16 and 17, the annotation inside each logical qubit denotes an identifier (1-7, A) and a logical state to which that qubit is to be initialized ($|0\rangle$, $|+)$, $|m_0\rangle$). State $|m_0\rangle$ indicates a zeroth-order error corrected $|m\rangle$ that is produced via state injection (logical qubits 1604, 1606, 1608, 1610, and 1612 in magic state distillation module 1600). The output state is a first-order error corrected $|m\rangle$ denoted as $|m_1\rangle$. Code distances $d_Z$ and $d_x$ denote code distances for the compound ancilla qubit "A" (logical qubit 1616 or 1716). Code distances $d_Z$ and $d_x$ may be asymmetric in some implementations. FIG. 17 is laid out similarly to FIG. 16, except that magic state distillation module 1700 of FIG. 17 receives first-order corrected $|m_1\rangle$ s. The output state is a second order error corrected $|m\rangle$ denoted as $|m_2\rangle$. In the depicted implementations, the state into which the logical qubit needs to be initialized differentiates the top and bottom levels. Magic state distillation module 1600 consumes zeroth order error corrected $|m\rangle$ s, denoted $|m_0\rangle$, that are produced by state injection (see Horsman et al., *Surface code quantum computing by lattice surgery*, New Journal of Physics, Volume 14, December 2012 for a detailed description of state injection). Logical qubits 1604, 1606, 1608, 1610, and 1612 are hard-wired to perform the state injection. Logical qubit 1604 is initialized in $|m_0\rangle$ 11 times, while the others are only initialized once per attempt at distillation. Magic state distillation module 1600 produces a single first-order error corrected copy of $|m\rangle$ denoted as $|m_1\rangle$. Magic state distillation module 1700 does not have the infrastructure for state injection, and instead consumes $15|m_1\rangle$ s that are produced by nearby L1 modules, which may be other magic state distillation modules such as magic state distillation module 1600 of FIG. 16, to distill one copy of a second order error corrected $|m\rangle$ denoted as $|m_2\rangle$. In some implementations, additional layers of distillation may be added to further reduce error in the final distilled output. Code distances $d_Z$ and $d_X$ correspond to the lengths of the Z- and X-edges, respectively, of ancilla qubits 1616 and 1716. The states in ancilla qubits 1616 and 1716 are repeatedly refreshed to $|m\rangle$ and then consumed during multi-qubit $\pi/8$ rotations. As this is a distillation circuit for which the output is verified before use, that is, if the result is deemed faulty that result is not used, the lifetime of ancilla qubits 1616 and 1716 need not be that of an entire quantum computation. Therefore, code distances $d_z$ and $d_x$ can be less than that used in the bulk of a surface code QPU. The distance may be shortened with a corresponding lower success probability for outputting a distilled copy of $|m\rangle$, which may beneficially allow for an entire magic state factory to have a smaller footprint, and in some cases, allow for an entire magic state factory to fit within a single die. The final state in logical qubit 1614 is then transferred to shift register stages 1804 of FIG. 18 and the final state in logical qubit 1714 is then transferred into logical qubit 1808 of FIG. 18.

Figure 18:
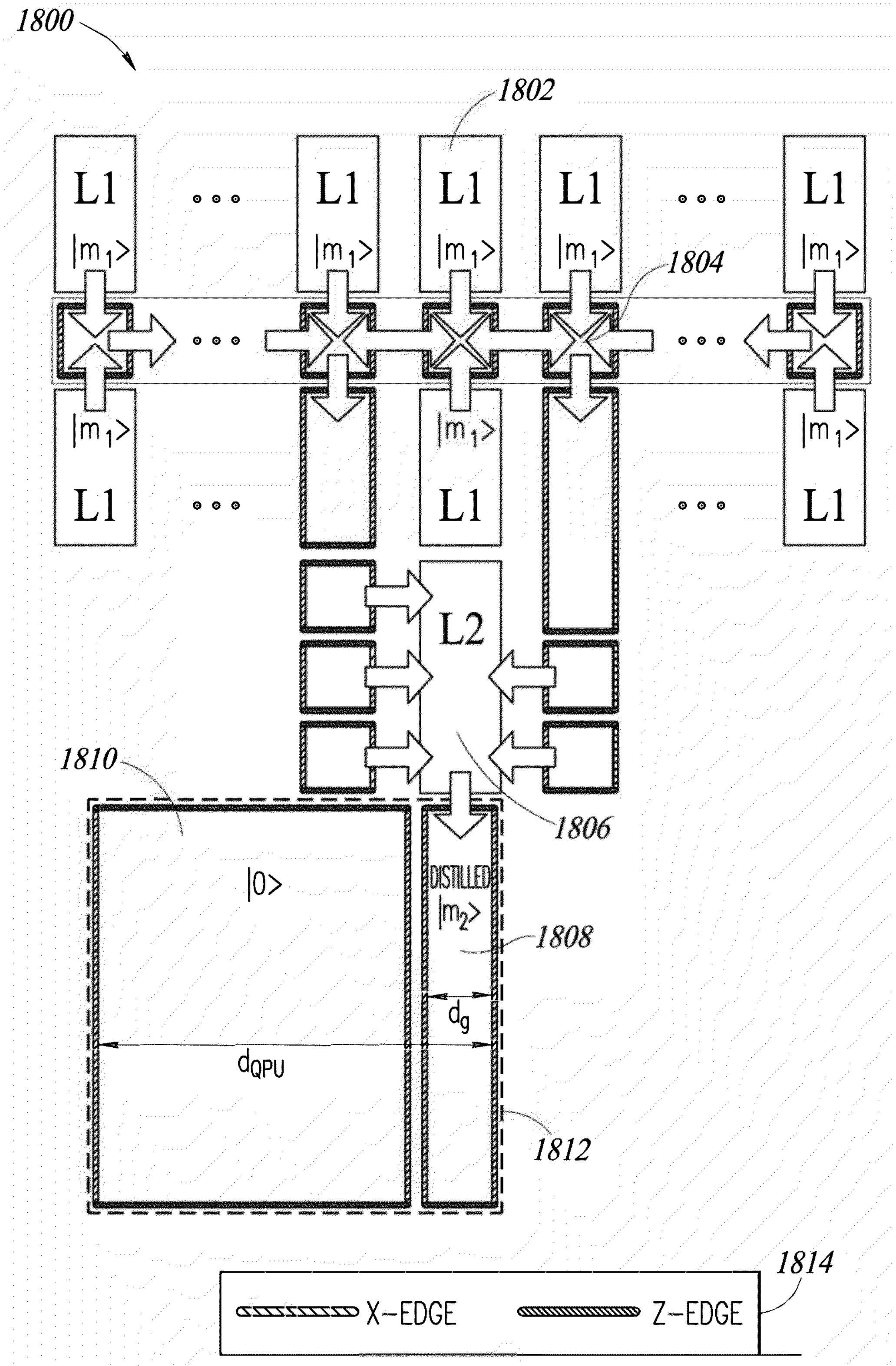
FIG. 18 is a schematic diagram of an example magic state factory floor plan that can be employed in accordance with the present systems, devices, and methods.

FIG. 18 is a schematic diagram of an example implementation of a floorplan for a magic state factory 1800 that can be employed in accordance with the present systems, devices, and methods. The floorplan for a magic state factory 1800 is based on magic state distillation modules 1600 and 1700 of FIGS. 16 and 17, and is illustrated along with a legend 1814. A shift register stage 1804 (only one called out) moves first order error corrected magic states $|m_1\rangle$ that are output by the L1 modules 1802 (only one called out) into the inputs of the L2 module 1806 (only one called out). Second order error corrected magic states $|m_2\rangle$ are moved to a special purpose memory register that inflates the code distance of the surface code from $d_Z$ to $d_{QPU}$. This special purpose memory register works in a similar manner to a move operation. Once a viable copy of $|m)$ is present in an elongated logical qubit 1808, elongated logical qubit 1808 is merged with a patch of surface code 1810. The resulting logical state occupies the entire patch that forms a logical qubit 1812. Many L1 modules 1802, which may be similar to magic state distillation module 1600 of FIG. 16, are connected to a shift register stage 1804 that feeds the inputs on two sides of an L2 module 1806. The number of L1 modules 1802 may be constrained by the projected success rate of L1 and L2 modules 1802 and 1806. While increasing the number of modules may be beneficial, the amount of physical space and the rate at which the $|m_1\rangle$ s are consumed by L2 module 1806 will constrain the optimum total number of modules. The output of L2 module 1806 is sent to elongated logical qubit 1808 of distance $d_Z$ that, in turn, is coupled to larger patch of surface code 1810 of distance $d_{QPU}$-$d_Z$, where $d_{QPU}$ is the distance used in the bulk of the surface code QPU as discussed above. With patch of surface code 1810 initialized in $|0\rangle$, merging the final two states yields logical qubit 1812 of distance $d_{QPU}$. Logical qubit 1812 may interface with the rest of the QPU through a shift register.

Figure 19:
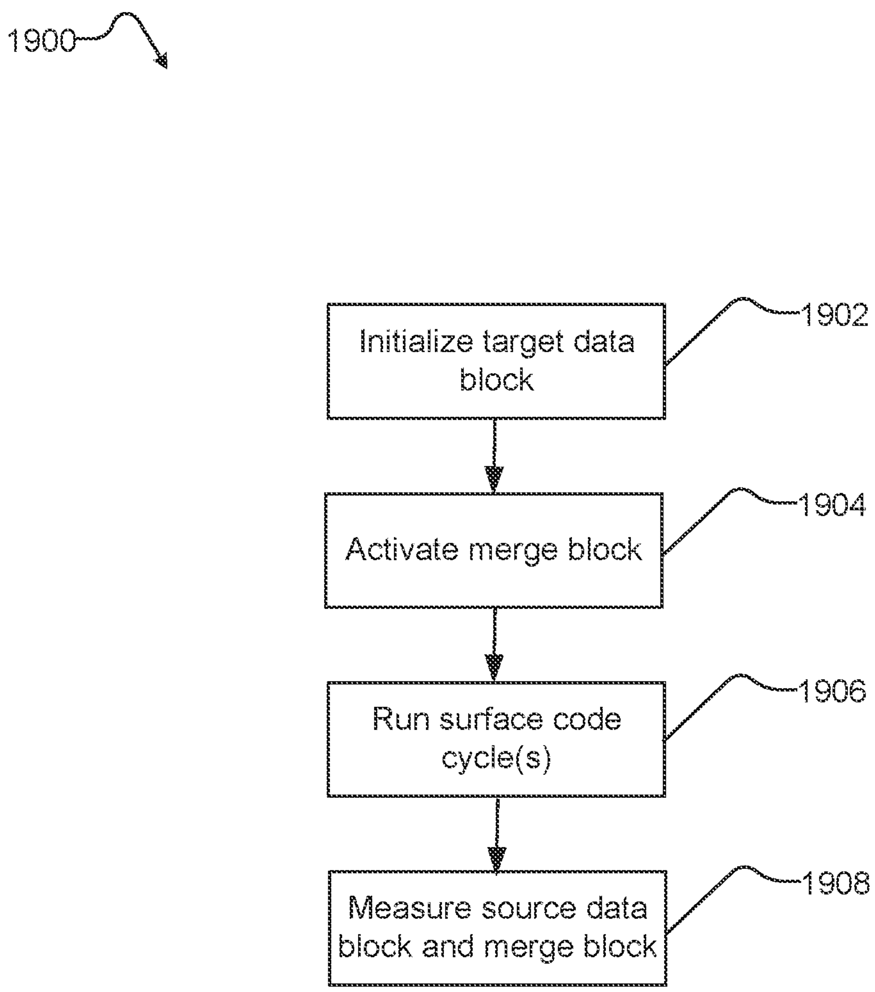
FIG. 19 is a flowchart of an example method of moving data within a quantum processor that can be employed in accordance with the present systems, devices, and methods.

FIG. 19 is a flow diagram of an example method 1900 for moving data within a quantum processor that can be employed in accordance with the present systems, devices, and methods. Method 1900 may, for example, be used to move data within a quantum logic unit such as the ones discussed with respect to FIGS. 12 through 18 above. In some implementations, method 1900 may be executed on a hybrid computing system comprising at least one digital or classical processor and at least one quantum processor. The digital or classical processor may provide control signals or instructions to the quantum processor to execute the method.

Method 1900 comprises acts 1902 to 1908; however, a person skilled in the art will understand that the number of acts illustrated is an example, and in some implementations, certain acts may be omitted, further acts may be added, and/or the order of the acts may be changed.

Method 1900 starts, for example in response to a call or invocation from another routine.

At 1902, a signal is induced in one or more target data block's control lines to initialize a target data block. The target data block can comprise a first set of one or more logical qubits (e.g., logical qubits 1212, 1214, 1218 of FIG. 12) and the target data block can be nominally empty. For movement across adjoining Z-edges, the first set of one or more logical qubits may be initialized in a $|+\rangle$ state. For movement across adjoining X-edges, the first set of one or more logical qubits may be initialized in a |0⟩ state (see movement directions shown in FIG. 13).

At 1904, a signal is induced in one or more merge block control lines to activate a merge block (e.g., activated merge blocks of FIG. 14 and FIG. 15). The merge block can comprise at least one line of physical qubits, and can connect the target data block to a source data block, which can comprise a second set of one or more logical qubits and contain data. For movement across adjoining Z-edges, the at least one line of physical qubits may be initialized in a |+⟩ state. For movement across adjoining X-edges, the at least one line of physical qubits may be initialized in a |0⟩ state.

At 1906, a plurality of surface code cycles are run over the target data block, the merge block, and the source data block. The data moves from the source data block to the target data block through the merge block. In some implementations, d surface code cycles can be run, where d is a minimum number of data qubits that must be simultaneously bit or phase flipped to realize either a logical X or a logical Z operation, as discussed above. In some implementations, the target data block may be a shift register or a 2-local interaction register. As discussed above, 2-local interaction registers may be one of a XX, XY, XZ, YY, YZ, and ZZ interaction register.

At 1908, the second set of logical qubits comprising the source data block and the at least one line of physical qubits comprising the merge block are measured. Where some of the target data block is unused, such as where the data is smaller than the entire target data block, unused logical qubits, that is those that have not received any data, of the target data block may also be measured. For movement across Z-edges, the second set of logical qubits comprising the source data block and the at least one line of physical qubits comprising the merge block are measured in the X basis, such that the merge operation corresponds to a ZZ measurement. For movement across X-edges, the second set of logical qubits comprising the source data block and the at least one line of physical qubits comprising the merge block are measured in the Z basis, such that the merge operation corresponds to a XX measurement.

After 1908, method 1900 terminates, until it is, for example, invoked again. Method 1900 may be repeated iteratively to move data across a quantum processor, with the target data block of a previous iteration becoming the source data block for a next iteration.

Robust Quantum Computing Architecture for Implementing 2D Surface Code

It is advantageous for a robust integrated circuit implementation of the two-dimensional surface code to function despite the presence of a small number of defective devices. Typically, such defects correspond to devices in which one or more Josephson junctions are modestly outside of specification, for example due to fabrication errors. Since these devices are still responsive to control signals, they can be excluded from the working graph of a quantum processor in a manner that minimizes the impact on neighboring devices. Herein, the term "working graph" denotes the set of qubits and couplers that are available for computation in a quantum processor. It would be advantageous to design a two-dimensional surface code quantum processing unit (QPU) that can function despite such imperfections.

There are parametric considerations that define an acceptable range of device parameters, depending on a specific QPU. However, there are also coherence specifications to be met. The presence of strongly coupled two-level systems (TLS) located at an inopportune frequency can render a parametrically on-target qubit incompatible with the multiplexed control scheme described herein with reference to FIGS. 4 through 11. Therefore, it is beneficial to design a two-dimensional surface code architecture with built-in protection against failed qubits.

Nagayama et al (Nagayama et al., 2017, New J. Phys. 19 023050) describes stabilizer structures that makes use of SWAP operations when a data qubit is defective and to redirect parity information to working stabilizer qubits when a stabilizer qubit is defective. However, insertion of SWAP operations into the surface code cycle at arbitrary locations within the QPU necessitates resource-intensive customized local control, leading to increased complexity. Therefore, the Nagayama structure is not desirable when implementing scalable control. Auger et al. (Auger et al., 2017, Phys. Rev. A 96, 042316) propose disabling a single data qubit when that qubit is either defective or associated with a defective CNOT operation, or disabling a ring of working data qubits surrounding a defective stabilizer qubit. The primary disadvantage of this approach is that one must alternate the measurement of partially-disabled Z-stabilizers and X-stabilizers in successive surface code cycles via local-scale customization of the surface code cycle. This approach would necessitate additional hardware, leading again to increased complexity. Therefore, the Auger approach may not be desirable when implementing scalable control. Both aforementioned references assume that the complexity of dealing with defective devices can be offloaded to control software that modifies the surface code cycle on a local scale. However, every new local-scale degree of freedom necessitates an additional layer of hardware to route and apply the requisite control signals. Eventually, the additional complexity in control might not be any more efficient than providing built-in redundancy.

Figure 20:
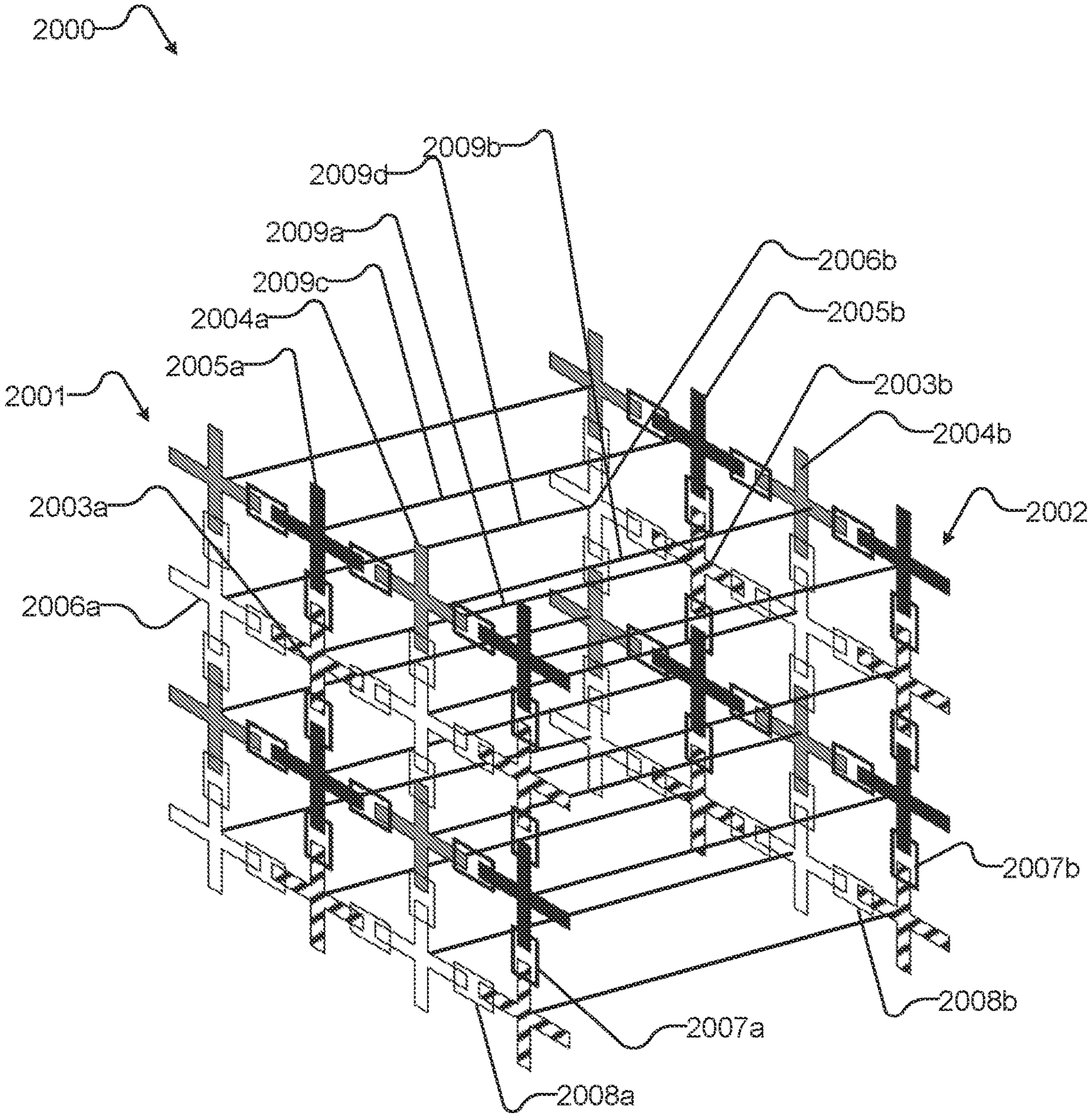
FIG. 20 is a schematic diagram of an example portion of a quantum processor implementing a robust surface code with two layers, in accordance with the present systems, devices, and methods.
Figure 21A:
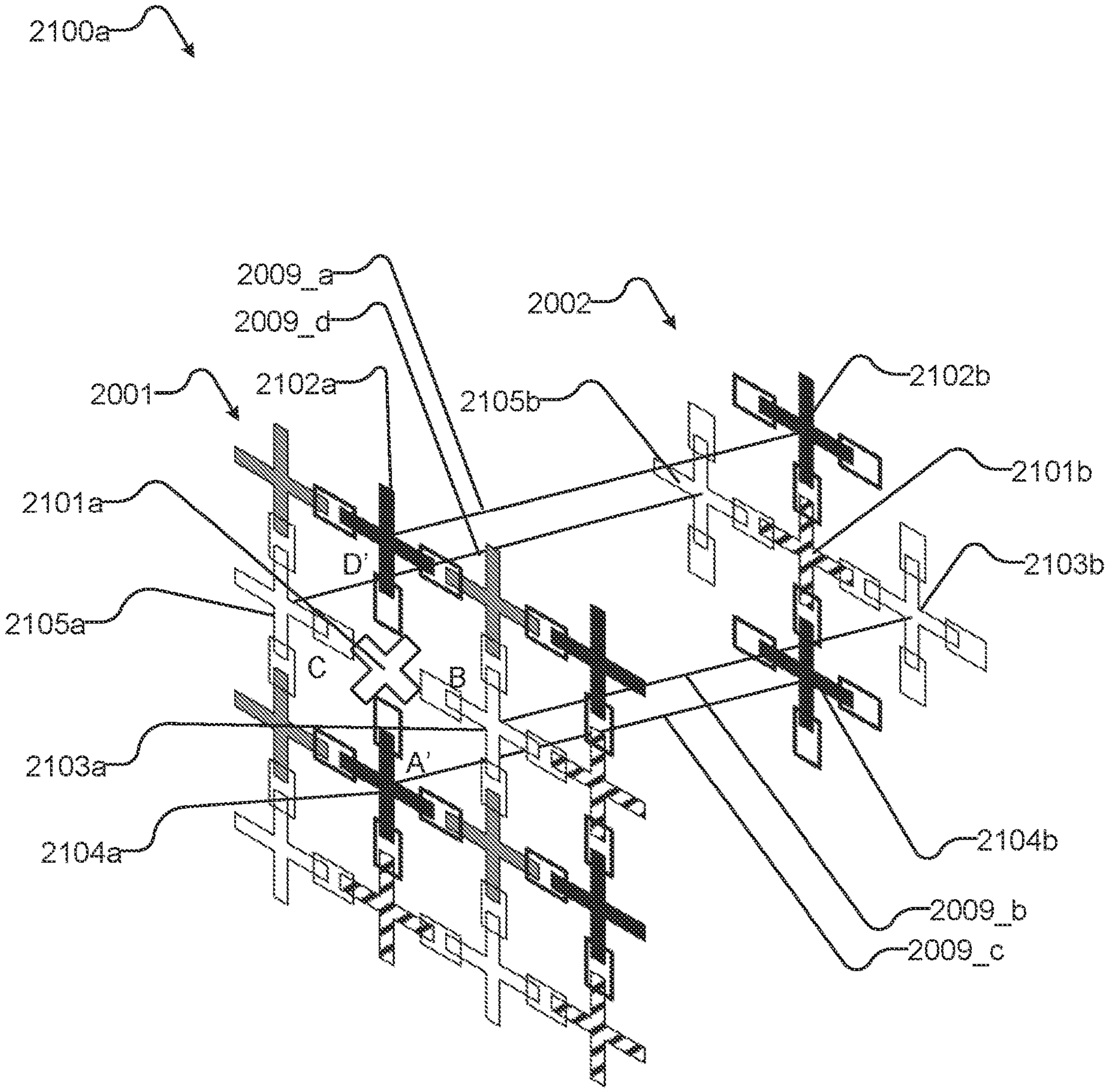
FIG. 21A is a schematic diagram of the example portion of the quantum processor of FIG. 20 with one defective data-A qubit in one layer, in accordance with the present systems, devices, and methods.
Figure 21B:
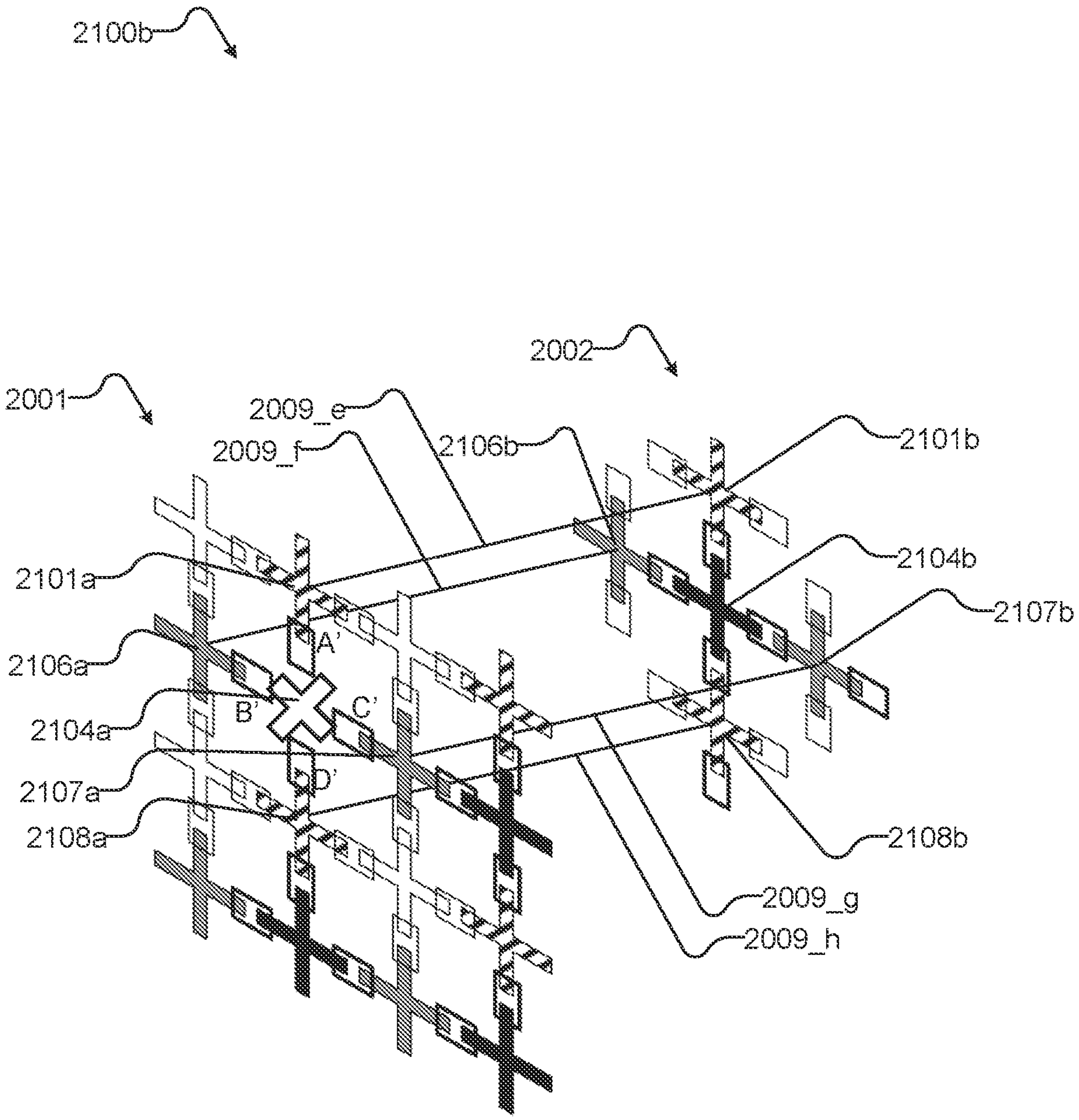
FIG. 21B is a schematic diagram of the example portion of the quantum processor of FIG. 20 with one defective measure-X qubit in one layer, in accordance with the present systems, devices, and methods.

Tang and Miao (Tang and Miao, 2016, Phys. Rev. A 93, 032322) propose implementing a nonplanar graph from which one can select a subset of working devices to form a fully yielded patch of two-dimensional surface code. The Tang and Miao approach introduces nonplanar connectivity which again increases complexity without providing full redundancy. In order to provide a scalable surface code implementation that is robust to defective devices, a logical qubit design with full redundancy, as depicted in FIG. 20 can be provided. Here, the circuit consists of two two-dimensional surface code sheets or layers with tunable couplers (also called inter-sheet couplers or inter-layer couplers herein) between each pair of homologous physical qubits; i.e., a tunable coupler between one data qubit in one layer and one data qubit in the other layer and a tunable coupler between one measure qubit in one layer and one measure qubit in the other layer. In the present disclosure and the appended claims, the term 'homologous' is used to indicate devices (e.g., qubits, couplers) performing the same role in the two-dimensional surface code, where the devices are on two or more different surface code layers. The inter-sheet couplers are meant to facilitate SWAP operations. As with the inter-qubit couplers discussed above in FIGS. 4 and 11, these couplers are to be designed such that they can be decoupled from their time-dependent control signals via locally programmable flux Digital to Analog Converters (DACs). If the top or main sheet of two-dimensional surface code has yielded perfectly, then there is no need to activate any of the inter-sheet couplers. Further, it might not be necessary to calibrate the devices in the lower sheet. When a device in one layer is defective, as depicted in FIGS. 21A and 21B, the inter-sheet couplers connected to the nearest-neighbors of the defective qubit are to be activated. A respective quintet of physical qubits are calibrated in the lower sheet for each single physical qubit defect in the top sheet. The addition of a second surface code layer of devices where only a minimal number of devices are to be calibrated adds full redundancy with minimal increased complexity of calibration.

FIG. 20 is a schematic diagram of an example portion of a quantum processor 2000 implementing a robust surface code with two surface code layers. Quantum processor 2000 has a first or main surface code layer 2001 and a second or lower surface code layer 2002. Each of first and second surface code layers 2001 and 2002 is a portion of a quantum processor arranged to realize a two-dimensional surface code, and may be part of a larger area of surface code such as in example quantum processor 400 of FIG. 4 and/or QLU 1200 of FIG. 12. In at least one implementation, quantum processor 2000 comprises a plurality of fluxonium qubits. In another implementation, quantum processor 2000 comprises a plurality of fluxonium qubits with high kinetic inductance material. In yet another implementation, quantum processor 2000 comprises a plurality of transmon qubits.

First surface code layer 2001 comprises four pluralities of qubits arranged in a two-dimensional lattice. First surface code layer 2001 comprises a first plurality of qubits 2003*a* (only one called out in FIG. 20 to reduce visual clutter), a second plurality of qubits 2004*a* (only one called out in FIG. 20 to reduce visual clutter), a third plurality of qubits 2005*a* (only one called out in FIG. 20 to reduce visual clutter) and a fourth plurality of qubits 20006*a* (only one called out in FIG. 20 to reduce visual clutter), similar to quantum processor 400 of FIG. 4. First surface code layer 2001 also includes a first plurality of couplers 2007*a* (only one shown in FIG. 20 to reduce visual clutter) and a second plurality of couplers 2008*a* (only one shown in FIG. 20 to reduce visual clutter) that provide communicative coupling between pairs of qubits in the two-dimensional lattice of first surface code layer 2001, similar to quantum processor 400 of FIG. 4. Though not illustrated, it is to be understood that first surface code layer 2001 comprises qubit control lines similar to those illustrated in FIG. 6 and coupler control lines similar to those illustrated in FIG. 7 and may be implemented on one or more layer of a substrate.

Second surface code layer 2002 comprises four pluralities of qubits arranged in a two-dimensional lattice. In the present disclosure and the appended claims, the qubits in second surface code layer 2002 are also refer to as 'replacement qubits'. Second surface code layer 2002 comprises a first plurality of qubits 2003*b* (only one called out in FIG. 20 to reduce visual clutter), a second plurality of qubits 2004*b* (only one called out in FIG. 20 to reduce visual clutter), a third plurality of qubits 2005*b* (only one called out in FIG. 20 to reduce visual clutter) and a fourth plurality of qubits 2006*b* (only one called out in FIG. 20 to reduce visual clutter), similar to quantum processor 400 of FIG. 4. Second surface code layer 2002 also includes a first plurality of couplers 2007*b* (only one shown in FIG. 20 to reduce visual clutter) and a second plurality of couplers 2008*b* (only one shown in FIG. 20 to reduce visual clutter) that provide communicative coupling between pairs of qubits in the two-dimensional lattice of second surface code layer 2002, similar to quantum processor 400 of FIG. 4. Though not illustrated, it is to be understood that second surface code layer 2002 comprises qubit control lines similar to those illustrated in FIG. 6 and coupler control lines similar to those illustrated in FIG. 7 and may be implemented on one or more layer of a substrate.

Quantum processor 2000 further comprises a plurality of inter-layer couplers (2009*a*, 2009*b*, 2009*c*, and 2009*d* are called out, and referred to collectively as 2009), providing tunable communicative coupling between pairs of homologous qubits from first surface code layer 2001 and second surface code layer 2002. For example, inter-layer coupler 2009*a* provides communicative coupling between one of the qubits from first plurality of qubits 2003*a* in first surface code layer 2001 and one of the qubits from first plurality of qubits 2003*b* in second surface code layer 2002. Inter-layer coupler 2009*b* provides communicative coupling between one of the qubits from second plurality of qubits 2004*a* in first surface code layer 2001 and one of the qubits from second plurality of qubits 2004*b* in second surface code layer 2002. Inter-layer coupler 2009*c* provides communicative coupling between one of the qubits from third plurality of qubits 2005*a* in first surface code layer 2001 and one of the qubits from third plurality of qubits 2005*b* in second surface code layer 2002. Inter-layer coupler 2009*d* provides communicative coupling between one of the qubits from fourth plurality of qubits 2006*a* in first surface code layer 2001 and one of the qubits from fourth plurality of qubits 2006*b* in second surface code layer 2002. Inter-layer couplers 2009 are controlled via inter-layer control lines as shown later herein in FIGS. 24A-24H.

FIG. 21A is a schematic diagram of an example portion 2100*a* of quantum processor 2000 of FIG. 20 with one defective data-A qubit in first surface code layer 2001. A person skilled in the art would understand that portion 2100*a* of quantum processor 2000, as illustrated in FIG. 21A, may have more than one defective or non-operational qubit. In the example portion 2100*a* of quantum processor 2000 illustrated in FIG. 21A, the defective qubit is a qubit 2101*a* in first plurality of qubits 2003*a*. Defective qubit 2101*a* is replaced with replacement qubit 2101*b* in second surface code layer 2002 (only a portion of second surface code layer 2002 is shown in FIG. 21A to reduce visual clutter). Defective qubit 2101*a* and replacement qubit 2101*b* are the same type of qubit or homologous qubits, i.e., data-A qubits in this example. When defective qubit 2101*a* is called upon for a parity measurement (e.g., a CNOT operation), the states of the coupled parity qubits (i.e., qubits 2102*a*, 2103*a*, 2104*a*, and 2105*a*) in first surface code layer 2001 are to be swapped with those of their respective partners (i.e., qubits 2102*b*, 2103*b*, 2104*b*, and 2105*b*) in second surface code layer 2002, by activating inter-layer couplers 2009 between pairs of qubits (e.g., coupler 2009_*a* between qubits 2102*a* and 2102*b*, coupler 2009_*b* between qubits 2103*a* and 2103*b*, coupler 2009_*c* between qubits 2104*a* and 2104*b*, and coupler 2009_*d* between qubits 2105*a* and 2105*b*). Once the CNOT operation has been completed (see also FIGS. 22A and 22B), then the state of each parity qubit is to be swapped back to first surface code layer 2001, according to the sequence A'-B-C-D' as illustrated in FIG. 21A, similar the position of A-B-C-D and A'-B'-C'-D' sequences described in FIG. 4. For a defective data-B qubit, the sequence of swapping neighboring qubits is A-B'-C'-D. The process of swapping qubits between layers in the presence of a defective data qubit is described in more details with reference to FIGS. 25A and 25B.

The same procedure can be used if a parity qubit (i.e., a qubit in third or fourth plurality of qubits 2005*a* or 2006*a* of FIG. 20) is defective, with the nearest-neighbor data qubit states (i.e., the state of a qubit in the first or second plurality of qubits 2003*a* or 2004*a*) being swapped between first surface code layer 2001 and second surface code layer 2002, as illustrated in FIG. 21B.

FIG. 21B is a schematic diagram of the example portion of the quantum processor of FIG. 20 with one defective measure-X qubit in one layer. A person skilled in the art would understand that portion 2100*b* of quantum processor 2000, as illustrated in FIG. 21B, may have more than one defective or non-operational qubit. In the example portion 2100*b* of quantum processor 2000 illustrated in FIG. 21B the defective qubit is a qubit 2104*a* in third plurality of qubits 2005*a*. Defective qubit 2104*a* is replaced with replacement qubit 2104*b* in second surface code layer 2002 (only a portion of second surface code layer 2002 is shown in FIG. 21B to reduce visual clutter). Defective qubit 2104*a* and replacement qubit 2104*b* are the same type of qubit or homologous qubits, i.e., measure-X qubits in this example. When defective qubit 2104*a* is called upon for a parity measurement (e.g., a CNOT operation), the states of the coupled data qubits (i.e., qubits 2101*a*, 2106*a*, 2107*a*, and 2108*a*) in first surface code layer 2001 are to be swapped with those of their respective partners (i.e., qubits 2101*b*, 2106*b*, 2107*b*, and 2108*b*) in second surface code layer 2002 by activating inter-layer couplers 2009 between pairs of qubits (e.g., coupler 2009_*e* between qubits 2101*a* and 2101*b*, coupler 2009_*f* between qubits 2106*a* and 2106*b*, coupler 2009_*g* between qubits 2107*a* and 2107*b*, and coupler 2009_*h* between qubits 2108*a* and 2108*b*). Once the CNOT operation has been completed (see also FIGS. 22A and 22B), then the state of each data qubit is to be swapped back to first surface code layer 2001, according to the sequence A'-B'-C'-D' as illustrated in FIG. 21B. For a defective measure-Z qubit, the sequence of swapping neighboring qubits is A-B-C-D. The process of swapping qubits between layers to perform parity measurement in the presence of a defective measure qubit is described in more details with reference to FIGS. 26A and 26B.

Figure 21C:
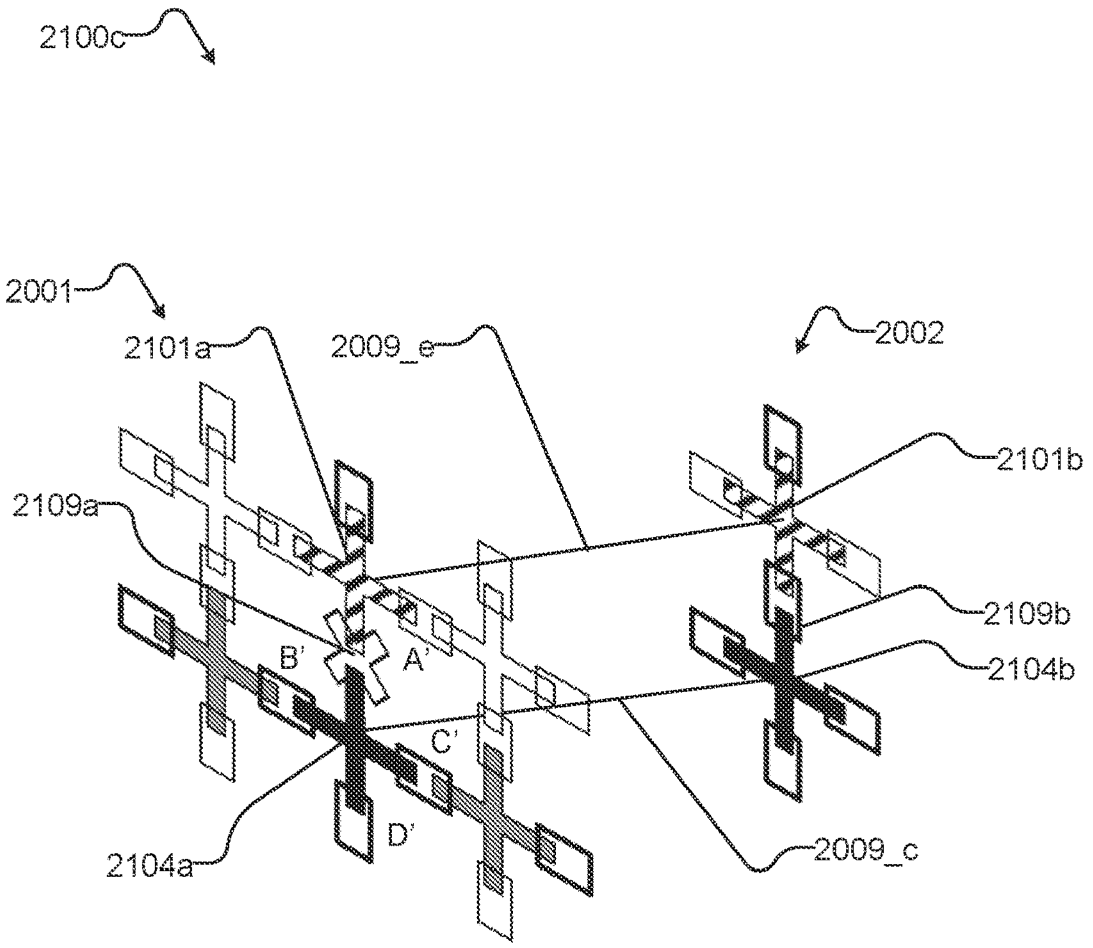
FIG. 21C is a schematic diagram of the example portion of the quantum processor of FIG. 20 with one defective coupler between qubits in one layer, in accordance with the present systems, devices, and methods.

FIG. 21C is a schematic diagram of an example portion of the quantum processor of FIG. 20 with one defective coupler between qubits in one layer. A person skilled in the art would understand that portion 2100*c* of quantum processor 2000, as illustrated in FIG. 21C, may have more than one defective or non-operational coupler. For example, if a coupler in first or second plurality of couplers 2007*a* or 2008*a* within first surface code layer 2001 is defective, then it can be circumvented by removing either of the attached qubits from the working graph and following a variation of the aforementioned procedure. In the example portion 2100*c* of quantum processor 2000 illustrated in FIG. 21C, the defective device is a coupler 2109*a* in first plurality of couplers 2007*a* in first surface code layer 2001. Defective coupler 2109*a* is replaced with replacement coupler 2109*b* in second surface code layer 2002 (only a portion of second surface code layer 2002 is shown in FIG. 21C to reduce visual clutter). Defective coupler 2109*a* and replacement coupler 2109*b* are the same type of couplers or homologous couplers, i.e., X-couplers in this example.

When defective coupler 2109*a* is called upon for a parity measurement (i.e., at A' in the sequence A'B'C'D'), the states of the qubits coupled to defective coupler 2109*a* (i.e., qubits 2101*a* and 2104*a*) in first surface code layer 2001 are to be swapped with those of their respective partners (i.e., qubits 2101*b* and 2104*b*) in second surface code layer 2002 by activating inter-layer couplers 2009_*c* and 2009_*e* between pairs of homologous qubits (e.g., inter-layer coupler 2009_*e* between qubits 2101*a* and 2101*b* and inter-layer coupler 2009_*c* between qubits 2104*a* and 2104*b*). Once the parity measurement operation has been completed, then the state of each qubit coupled to defective coupler 2109*a* is to be swapped back to first surface code layer 2001. The process of swapping qubits between layers to perform parity measurement in the presence of a defective coupler is described in more details with reference to FIGS. 27A and 27B.

Figure 22A:
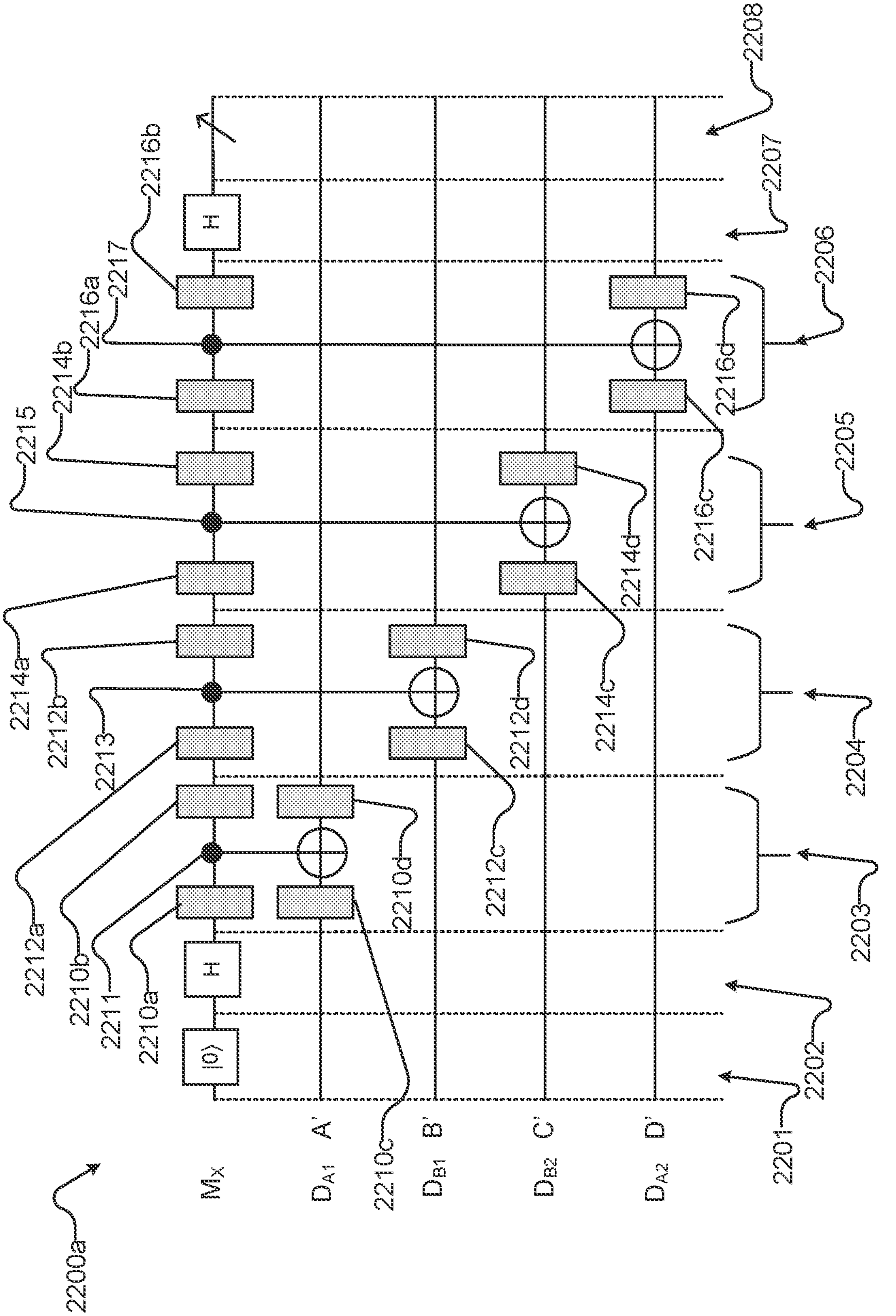
FIG. 22A is a diagram of an example gate sequence for measuring XXXX parity operators, in accordance with the present systems, devices, and methods.
Figure 22B:
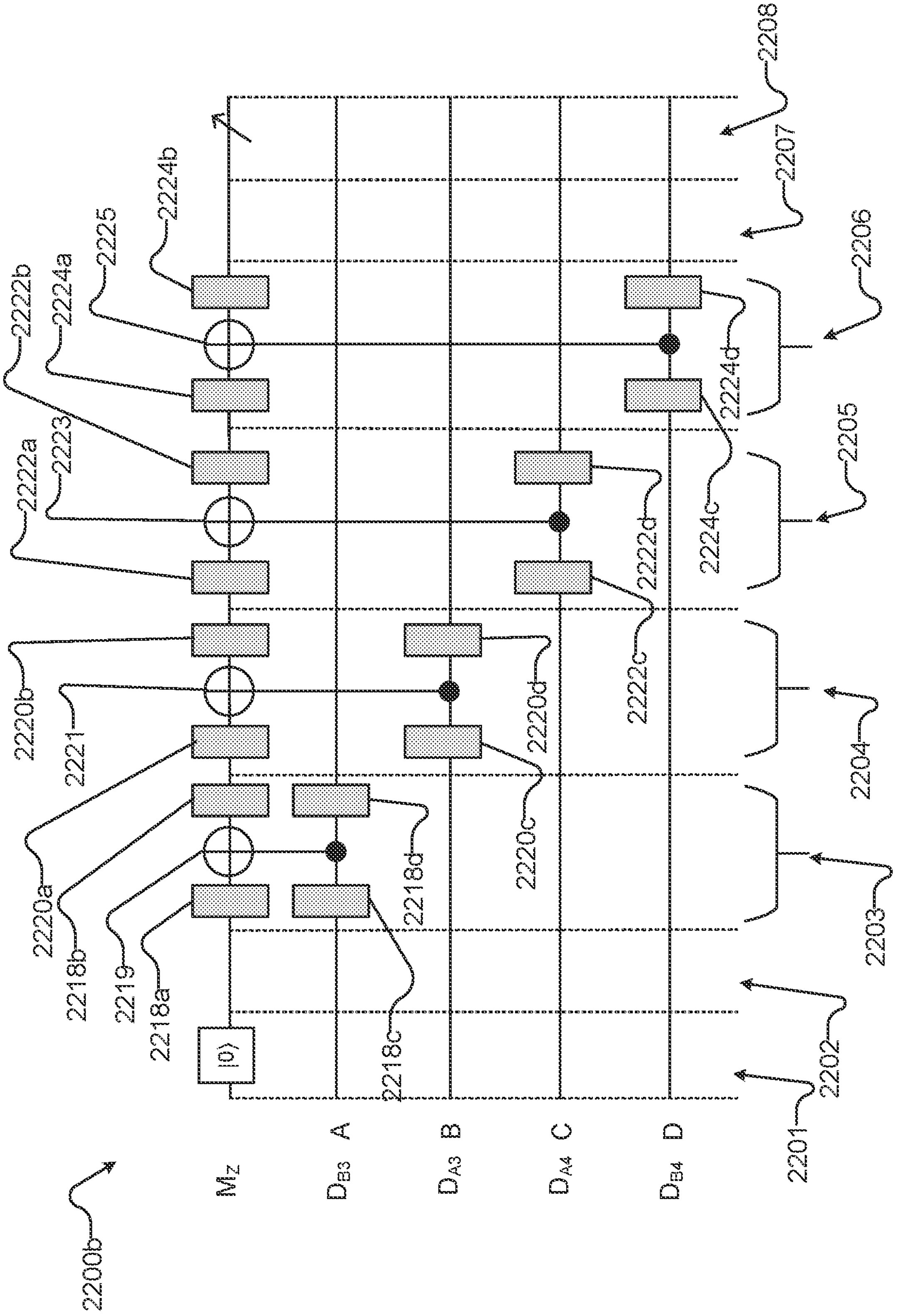
FIG. 22B is a diagram of an example gate sequence for measuring ZZZZ parity operators, in accordance with the present systems, devices, and methods.

A modified surface code cycle is depicted in FIGS. 22A and 22B, in which time is allocated for SWAP gates before and after every CNOT operation on each physical qubit. However, it should be noted that a SWAP operation will only be performed within any given time slot and to any particular qubit if the inter-layer coupler connected to that qubit is rendered active. The proposed architecture obviates the need for any local-scale modification to the surface code cycle, albeit at the expense of doubling the device count and uniformly lengthening the cycle time.

Measuring Parity Operators

FIG. 22A is a diagram of an example gate sequence 2200*a* for measuring XXXX parity operators. In at least one implementation, measuring XXXX parity operators includes measuring the state of qubits in third plurality of qubits 2005*a* of quantum processor 2000.

FIG. 22B is a diagram of an example gate sequence 2200*b* for measuring ZZZZ parity operators. In at least one implementation, measuring ZZZZ parity operators includes measuring the state of qubits in fourth plurality of qubits 2006*a* of quantum processor 2000. Similar or identical structures are indicated with the same reference numbers in FIGS. 22A and 22B.

SWAP gates can be optionally applied before and after every CNOT operation to account for defective qubits.

Gate sequence 2200*a* illustrates sequential operations performed on: one measure-X qubit ($M_X$) in third plurality of qubits 2005*a*; a first data qubit ($DA_1$) in first plurality of qubits 2003*a*; a first data qubit ($DB_1$) in second plurality of qubits 2004*a*; a second data qubit ($DB_2$) in second plurality of qubits 2004*a*; and a second data qubit ($DA_2$) in first plurality of qubits 2003*a*. Gate sequence 2200*a* follows sequence A'B'C'D'.

Gate sequence 2200*b* illustrates sequential operations performed on: one measure-Z qubit ($M_Z$) in fourth plurality of qubits 2006*a*; a third data qubit ($DB_3$) in second plurality of qubits 2004*a*; a third data qubit ($DA_3$) in first plurality of qubits 2003*a*; a fourth data qubit ($DA_4$) in first plurality of qubits 2003*a*; and a fourth data qubit ($DB_4$) in second plurality of qubits 2004*a*. Gate sequence 2200*a* follows sequence ABCD.

Gate sequences 2200*a* and 2200*b* can be executed simultaneously or in parallel. Individual data qubits (qubits in first and second plurality of qubits 2003*a* and 2004*a*) engage with only one measure-X or measure-Z qubit at any given time.

At 2201, parity qubits $M_X$ and $M_Z$ are initialized in their ground states $|0\rangle$ in gate sequences 2200*a* and 2200*b*, respectively. See act 2505*a* and 2505*b* of method 2500 described below for more details.

At 2202, an H-gate (Hadamard gate) is applied to $M_X$ in gate sequence 2200*a*.

At 2203, optionally, if $DA_1$ is defective, a first SWAP gate 2210*a* (illustrated by a shaded box in FIG. 22A) is applied as part of gate sequence 2200*a* between the functioning $M_X$ in first surface code layer 2001 and the corresponding $M_X$ in second surface code layer 2002. On the other hand, if $M_X$ is defective, then an optional first SWAP gate 2210*c* is applied as part of gate sequence 2200*a* between the functioning $DA_1$ in first surface code layer 2001 and the corresponding $DA_1$ in second surface code layer 2002. A first two-qubit gate 2211 operation (e.g., a CNOT gate) is then applied to first data qubit ($DA_1$) and $M_X$. If neither $DA_1$ or $M_X$ are defective, two-qubit gate 2211 is applied as part of gate sequence 2200*a* between qubits in pluralities 2003*a* and 2005*a*. If one of $DA_1$ or $M_X$ are defective, two-qubit gate 2211 is applied as part of gate sequence 2200*a* between qubits in pluralities 2003*b* and 2005*b*. After the two-qubit interaction, if optional first SWAP gate 2210*a* (or 2210*c*) had been applied, a second SWAP gate 2210*b* (or 2210*d*) is applied to the same qubit, as indicated by the second shaded box in act 2203 in FIG. 22A. A similar sequence occurs simultaneously at 2203 in FIG. 22B, in which the two qubits in question are a data qubit $DB_3$ and a measure-Z qubit $M_Z$. If one of these qubits is defective, then gate sequence 2200*b* includes: transfer of the state of the functioning qubit via a SWAP operation 2218*a* (or 2218*c*) from first surface code layer 2001 to second surface code layer 2002, application of a two-qubit interaction 2219, and then return of the state of the functioning qubit to layer 2001 via a SWAP operation 2218*b* (or 2218*d*).

At 2204, optionally, if $DB_1$ is defective, a third SWAP gate 2212*a* (illustrated by a shaded box in FIG. 22A) is applied as part of gate sequence 2200*a* between $M_X$ in first surface code layer 2001 and the corresponding $M_X$ in second surface code layer 2002. On the other hand, if $M_X$ is defective, then an optional SWAP gate 2212*c* is applied as part of gate sequence 2200*a* between the functioning $DB_1$ in first surface code layer 2001 and the corresponding $DB_1$ in second surface code layer 2002. A second two-qubit gate 2213 operation (e.g., a CNOT gate) is then applied to first data qubit ($DB_1$) and to $M_X$. If neither $DB_1$ or $M_X$ are defective, as part of gate sequence 2200*a* includes the application of two-qubit gate 2213 between qubits in second and third pluralities of qubits 2004*a* and 2005*a*. If one of $DB_1$ or $M_X$ are defective, two-qubit gate 2213 is applied between qubits in second and third pluralities of qubits 2004*b* and 2005*b*. After the two-qubit interaction, optionally, if third SWAP gate 2212*a* (or 2212*c*) had been applied, a fourth SWAP gate 2212*b* (or 2212*d*) is applied to the same qubit as indicated by the second shaded box in act 2204 in FIG. 22A. A similar sequence occurs simultaneously at 2204 in FIG. 22B, in which the two qubits in question are a data qubit $DA_3$ and a measure-Z qubit $M_Z$. If one of these qubits is defective, then gate sequence 2200*b* includes: transfer of the state of the functioning qubit via a SWAP operation 2220*a* (or 2200*c*) from first surface code layer 2001 to second surface code layer 2002, application of a two-qubit interaction 2221, and then return of the state of the functioning qubit to layer 2001 via a SWAP operation 2220*b* (or 2220*d*).

At 2205, optionally, if $DB_2$ is defective, a fifth SWAP gate 2214*a* is applied as part of gate sequence 2200*a* between $M_X$ in first surface code layer 2001 and the corresponding $M_X$ in second surface code layer 2002. On the other hand, if $M_X$ is defective, then an optional SWAP gate 2214*c* is applied as part of gate sequence 2200*a* between the functioning $DB_2$ in first surface code layer 2001 and the corresponding $DB_2$ in second surface code layer 2002. A third two-qubit gate 2215 operation (e.g., a CNOT gate) is applied to second data qubit ($DB_2$) and to $M_X$. If neither $DB_2$ or $M_X$ are defective, gate sequence 2200*a* includes application of two-qubit gate 2215 between qubits in second and third pluralities of qubits 2004*a* and 2005*a*. If one of $DB_2$ or $M_X$ are defective, two-qubit gate 2215 is applied between qubits in second and third pluralities of qubits 2004*b* and 2005*b*. Optionally, if SWAP gate 2214*a* (or 2214*c*) had been applied, a SWAP gate 2214*b* (or 2214*d*) is applied to the same qubit as indicated by the second shaded box in act 2205 in FIG. 22A. A similar sequence occurs simultaneously at 2205 in FIG. 22B, in which the two qubits in question are a data qubit $DA_4$ and a measure-Z qubit $M_Z$. If one of these qubits is defective, then gate sequence 2200*b* includes: transfer of the state of the functioning qubit via a SWAP operation 2222*a* (or 2222*c*) from first surface code layer 2001 to second surface code layer 2002, application of a two-qubit interaction 2223, and then return of the state of the functioning qubit to layer 2001 via a SWAP operation 2222*b* (or 2222*d*).

At 2206, optionally, if $DA_2$ is defective, a seventh SWAP gate 2216*a* is applied as part of gate sequence 2200*a* between $M_X$ in first surface code layer 2001 and the corresponding $M_X$ in second surface code layer 2002. On the other hand, if $M_X$ is defective, then an optional SWAP gate 2216*c* is applied as part of gate sequence 2200*a* between the functioning $DA_2$ in first surface code layer 2001 and the corresponding $DA_2$ in second surface code layer 2002. A fourth two-qubit gate 2217 operation (e.g., a CNOT gate) is applied to second data qubit ($DA_2$) and to $M_X$. If neither $DA_2$ or $M_X$ are defective, gate sequence 2200*a* application of two-qubit gate 2217 between qubits in pluralities 2003*a* and 2005*a*. If one of $DA_2$ or $M_X$ are defective, two-qubit gate 2217 is applied between qubits in pluralities 2003*b* and 2005*b*. Optionally, if SWAP gate 2216*a* (or 2216*c*) had been applied, an eighth SWAP gate 2216*b* (or 2216*d*) is applied to the same qubit as indicated by the second shaded box in act 2206 in FIG. 22A. A similar sequence occurs simultaneously at 2206 in FIG. 22B, in which the two qubits in question are a data qubit $DB_4$ and a measure-Z qubit $M_Z$. If one of these qubits is defective, gate sequence 2200*b* includes: transfer of the state of the functioning qubit via a SWAP operation 2224*a* (or 2224*c*) from first surface code layer 2001 to second surface code layer 2002, applying a two-qubit interaction 2225, and then return of the state of the functioning qubit to layer 2001 via a SWAP operation 2224*b* (or 2224*d*).

At 2207, an H-gate is applied to $M_X$ as part of gate sequence 2200*a*.

At 2208, the states of $M_X$ and $M_Z$ are read out in the Z-basis as part of gate sequence 2200*a* and gate sequence 2200*b*, respectively, each yielding either 0 or 1. In at least one implementation, a frequency multiplexing resonant readout (FMRR) is employed, as explained in U.S. Pat. No. 10,938,346. Further readout techniques that may be employed are described in U.S. Patent Application No. 63/448,537.

Inter-Layer Coupler Control

It is desirable to perform pairs of SWAP operations only on those qubits that need them, and to apply them only in specific time blocks within the surface code cycle. Spatial and temporal control over the SWAP operations involves additional control signals. Part of the scalable SWAP control scheme described in the present disclosure is depicted in FIG. 23.

Figure 23:
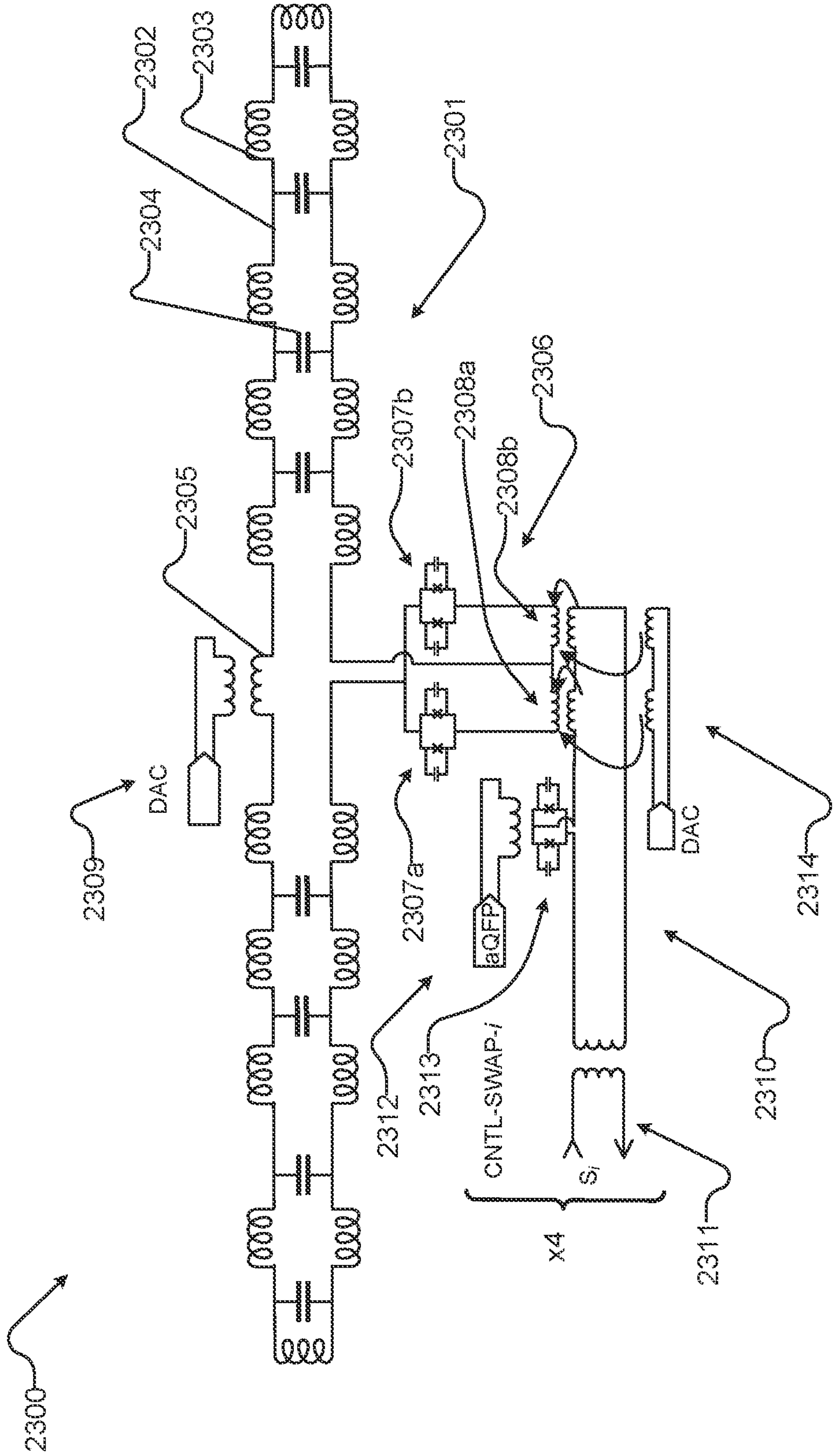
FIG. 23 is a schematic diagram of an example SWAP control circuit, in accordance with the present systems, devices, and methods.

FIG. 23 is a schematic diagram of an example circuit 2300 comprising four time-dependent VHF lines biasing an inductive coupler 2301. In some implementations, inductive coupler 2301 is an inter-layer coupler 2009 providing communicative tunable coupling between qubits in the first and second surface code layer 2001 and 2002, respectively, of FIG. 20. Inductive coupler 2301 can be a distributed or lumped element circuit comprising a superconducting loop 2302, a plurality of inductances 2303 arranged in series (only one called out in FIG. 23 to reduce visual clutter), shunted by a plurality of capacitances 2304 (only one called out in FIG. 23 to reduce visual clutter). Inductive coupler 2301 further comprises an inductor 2305 and a CCJJ structure 2306. CCJJ structure 2306 comprises a first CJJ 2307*a* arranged in parallel with a second CJJ 2307*b*. A first inductive transformer 2308*a* is arranged in series with first CJJ 2307*a*, and a second inductive transformer 2308*b* is arranged in series with second CJJ 2307*b*.

A first DAC 2309 is communicatively coupled to inductive transformer 2305 and is operable to provide static bias to the superconducting loop of inductive coupler 2301.

Four control structures 2310 (CNTL-SWAP-i, only one shown in FIG. 23 to reduce clutter) are communicatively coupled to CCJJ structure 2306 and are operable to provide a tunable flux to CCJJ structure 2306, mediating an analog control signal from one of four time-dependent control lines 2311 $S_i$, (only one shown in FIG. 23 to reduce clutter), where: i∈[A,B,C,D] for a SWAP coupler associated with a measure-Z qubit (fourth plurality of qubits 2006 of FIG. 20); i∈[A',B',C',D'] for a SWAP coupler associated with a measure-X qubit (third plurality of qubits 2005 of FIG. 20); i∈[A,B,C,D'] for a SWAP coupler associated with a data-A qubit (first plurality of qubits 2003 of FIG. 20); and i∈[A, B',C',D] for a SWAP coupler associated with a data-B qubit (second plurality of qubits 2004 of FIG. 20). Each one of control structures 2310 acts as a static switch that will either block or transmit a time-dependent signal on one of the control lines $S_i$ that causes a pair of SWAP operations to occur in acts 2203, 2204, 2205, or 2206 of FIGS. 22A and 22B.

A layout for control lines similar to control line 2311 is shown in FIGS. 24A-24H. In each case, control lines similar to control line 2311 of FIG. 23 traverse a similar path as the corresponding inter-qubit coupler control lines (analog lines 701-708 depicted in FIG. 7). However, unlike control lines (analog lines 701-708), control lines 2401 through 2408 from FIGS. 24A through 24H converge in groups of four onto inter-layer couplers (e.g., inter-layer couplers 2009) associated with each physical qubit on both sides of each inter-qubit coupler. There are then four pairs of appropriately timed SWAP control pulses arriving at each inter-sheet coupler via four control lines 2311 (each control line 2311 carrying two swap pulses), but whether any one of those controls results in a SWAP gate depends on the state of four adiabatic quantum-flux-parametrons (aQFP) switches 2312 (only one shown in FIG. 23 to reduce visual clutter). Examples of QFPs can be found, for example, in U.S. Pat. Nos. 7,843,209 and 8,169,231. aQFP switches 2312 apply a flux bias to a CJJ loop 2313 of control structures 2310. Since each of the four aQFP switches 2312 can be independently programmed, control circuit 2300 provides both spatial- and temporal-control over the individual SWAP operations. In addition to four control structures 2310, a third DAC 2314 is communicatively coupled to CCJJ structure 2306. The purpose of third DAC 2314 is to apply a static bias to CCJJ structure 2306 of coupler 2301 to compensate for flux offset in CCJJ structure 2306.

Circuit 2300 and the architecture of quantum processor 2000 are arranged such that local-scale modification to the surface code cycle is not used, at the expense of doubling the device count, the introduction of eight additional VHF lines (lines 2401, 2402, 2403, 2404, 2405, 2406, 2407, and 2408 in FIGS. 24A, 24B, 24C, 24D, 24E, 24F, 24G, and 24H below), and uniformly lengthening the cycle time.

Figure 24A:
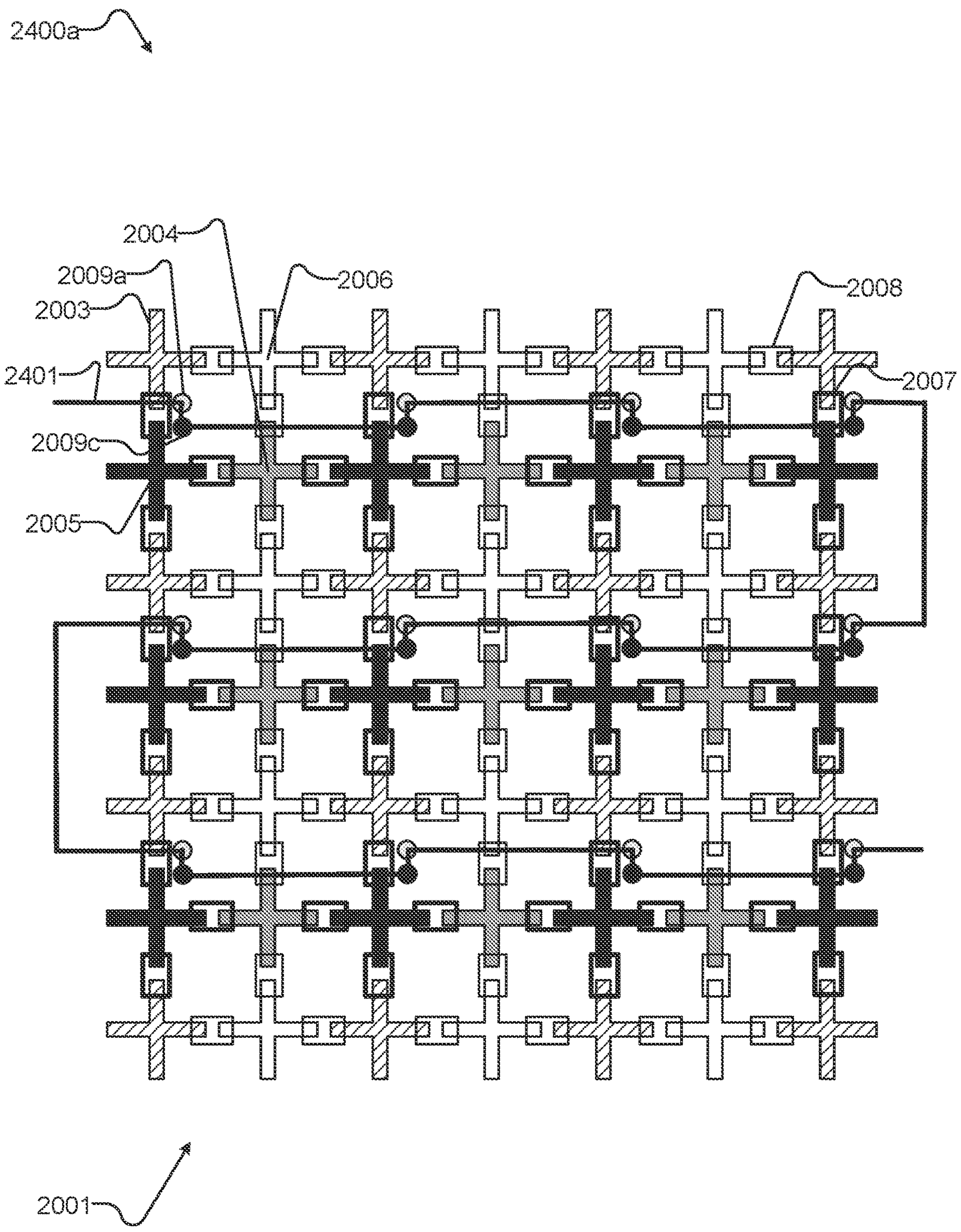
FIG. 24A is a schematic diagram of a first coupler control line for inter-sheet couplers coupling qubits in the first plurality of qubits and the third plurality of qubits between the first and the second surface code layer of qubits, in accordance with the present systems, devices, and methods.

FIG. 24A is a schematic diagram 2400*a* including a first inter-layer coupler control line 2401 for coupling qubits in first plurality of qubits 2003 and third plurality of qubits 2005 between the first and the second surface code layer of qubits of a quantum processor implementing the robust architecture described above with references to FIGS. 20, 21A, 21B, 21C, and 23.

Diagram 2400*a* shows first surface code layer 2001 of qubits of quantum processor 2000 from FIG. 20 comprising first, second, third, and fourth plurality of qubits 2003, 2004, 2005, and 2006 respectively (only one qubit in each plurality of qubits called out in FIG. 24A to reduce visual clutter), and first and second plurality of couplers 2007 and 2008, respectively (only one coupler in each plurality of couplers called out in FIG. 24A to reduce visual clutter). First coupler control line 2401 provides analog signals to inter-layer couplers 2009*a* (only one called out to reduce visual clutter) and to inter-layer couplers 2009*c* (only one called out to reduce visual clutter). A person skilled in the art will understand that quantum processor 2000 comprises as many inter-layer couplers 2009*a* as the number of qubits in first plurality of qubits 2003 and as many inter-layer couplers 2009*c* as the number of qubits in third plurality of qubits 2005. As described above with reference to FIG. 20, inter-layer couplers 2009*a* provide communicative coupling between qubits in first plurality of qubits 2003 in first surface code layer 2001 and qubits in first plurality of qubits 2003 in second surface code layer 2002. Inter-layer couplers 2009*c* provide communicative coupling between qubits in third plurality of qubits 2005 in first surface code layer 2001 and qubits in third plurality of qubits 2005 in second surface code layer 2002. First coupler control line 2401 traverses a path similar to the path of inter-qubit coupler control line (analog lines 705 depicted in FIG. 7), but provides analog signals to inter-layer couplers 2009*a* and 2009*c* rather than inter-qubit couplers.

Figure 24B:
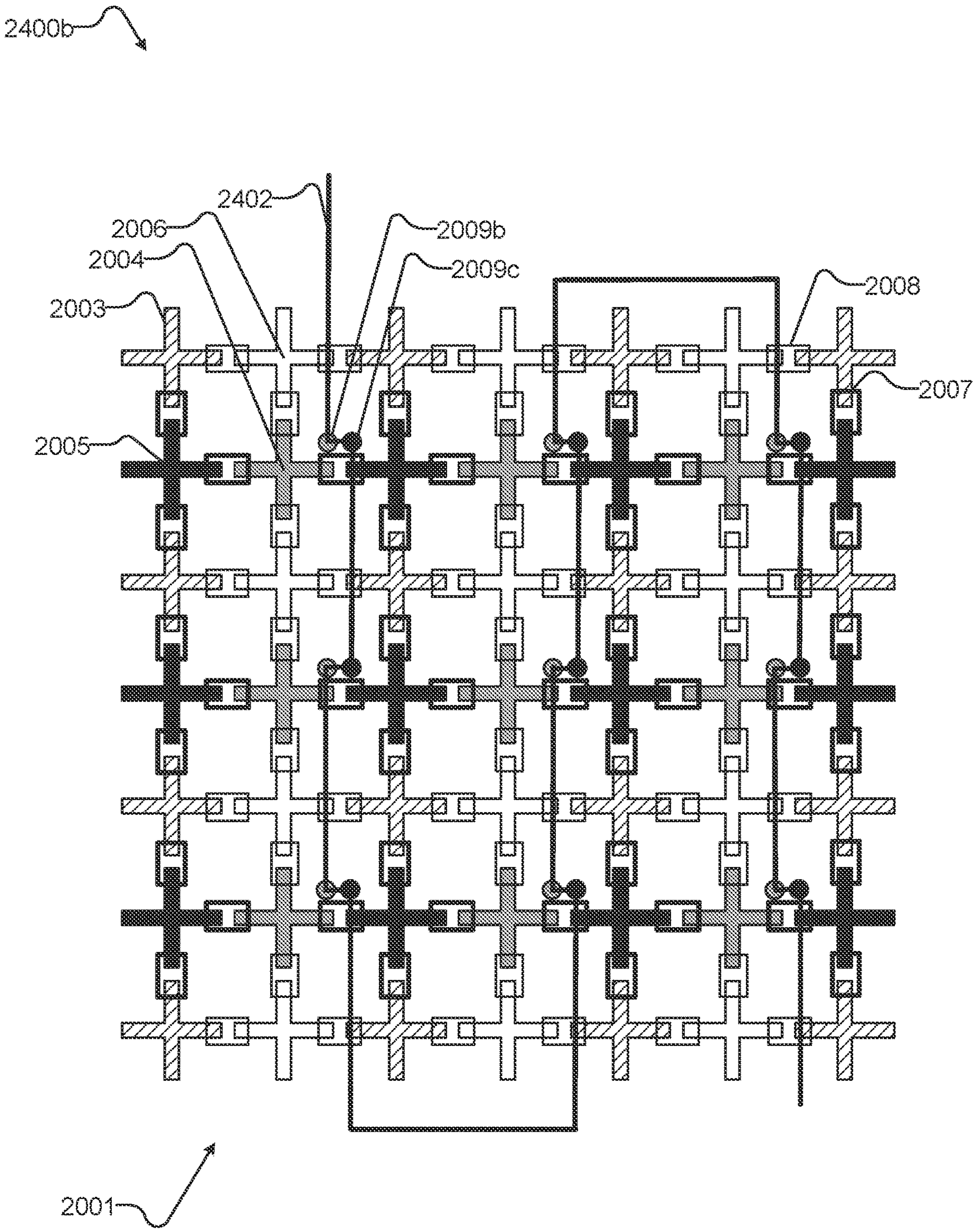
FIG. 24B is a schematic diagram of a second coupler control line for inter-sheet couplers coupling qubits in the second plurality of qubits and qubits in the third plurality of qubits between the first and the second surface code layer of qubits, in accordance with the present systems, devices, and methods.

FIG. 24B is a schematic diagram 2400*b* including a second coupler control line 2402 for inter-layer couplers coupling qubits in second plurality of qubits 2004 and qubits in third plurality of qubits 2005 between the first and the second surface code layer of qubits of a quantum processor implementing the robust architecture described above with references to FIGS. 20, 21A, 21B, 21C and 23.

Diagram 2400*b* shows first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24B to reduce visual clutter), and first and second plurality of couplers 2007 and 2008, respectively (only one coupler in each plurality of couplers called out in FIG. 24B to reduce visual clutter). Second coupler control line 2402 provides analog signals to inter-layer couplers 2009*b* (only one called out to reduce visual clutter) and to inter-layer couplers 2009*c* (only one called out to reduce visual clutter). A person skilled in the art will understand that quantum processor 2000 comprises as many inter-layer couplers 2009*b* as the number of qubits in second plurality of qubits 2004 and as many inter-layer couplers 2009*c* as the number of qubits in third plurality of qubits 2005. As described above with reference to FIG. 20, inter-layer couplers 2009*b* provide communicative coupling between qubits in second plurality of qubits 2004 in first surface code layer 2001 and qubits in second plurality of qubits 2004 in second surface code layer 2002. Inter-layer couplers 2009*c* provide communicative coupling between qubits in third plurality of qubits 2005 in first surface code layer 2001 and qubits in third plurality of qubits 2005 in second surface code layer 2002. Second coupler control line 2402 traverses a path similar to the path of inter-qubit coupler control line (analog lines 706 depicted in FIG. 7), but provides analog signals to inter-layer couplers 2009*b* and 2009*c* rather than inter-qubit couplers.

Figure 24C:
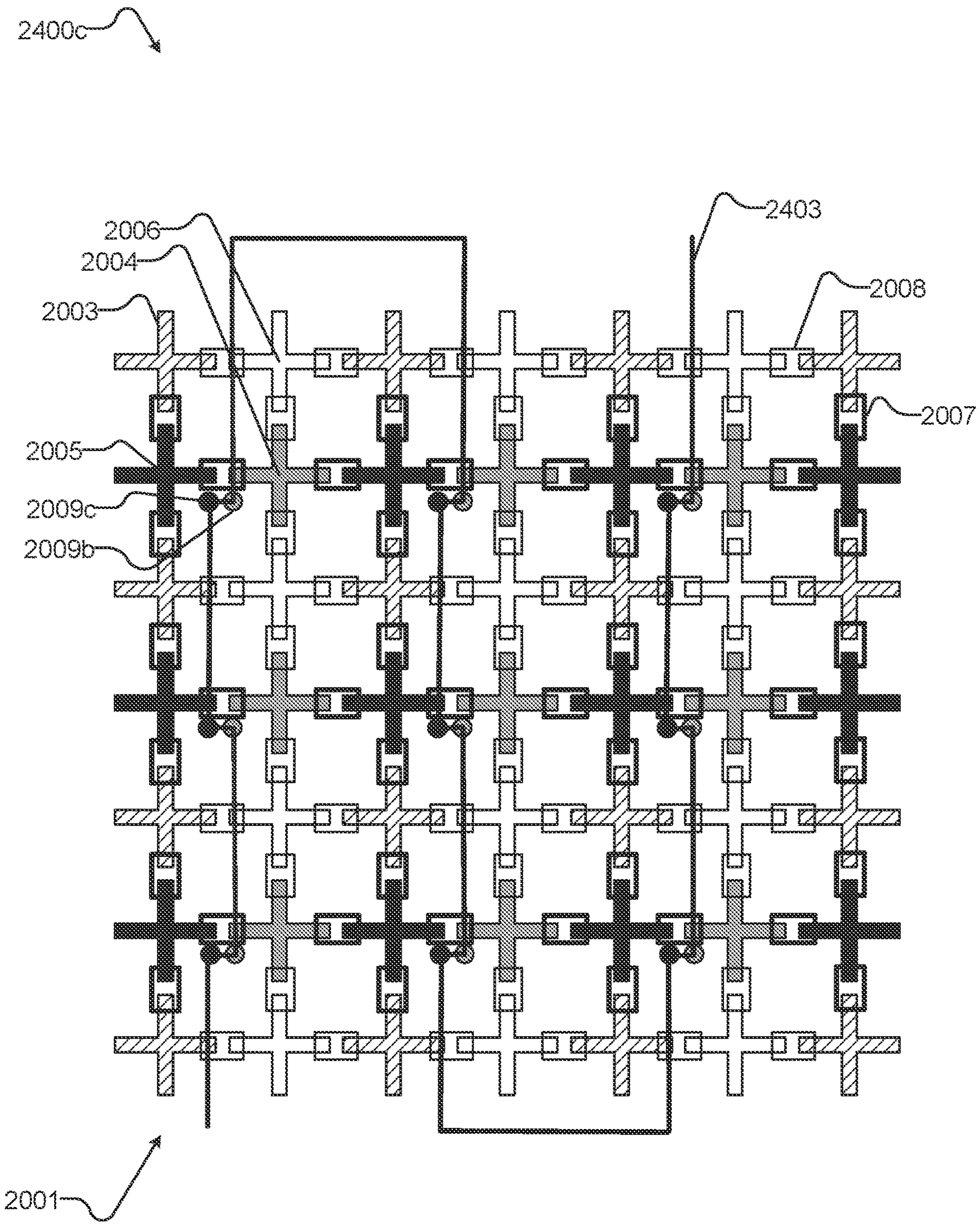
FIG. 24C is a schematic diagram of a third coupler control line for inter-sheet couplers coupling qubits in the second plurality of qubits and qubits in the third plurality of qubits between the first and the second surface code layer of qubits, in accordance with the present systems, devices, and methods.

FIG. 24C is a schematic diagram 2400*c* including a third coupler control line 2403 for inter-layer couplers coupling qubits in second plurality of qubits 2004 and qubits in third plurality of qubits 2005 between the first and the second surface code layer of qubits of a quantum processor implementing the robust architecture described above with references to FIGS. 20, 21A, 21B, 21C and 23.

Diagram 2400*c* shows first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24C to reduce visual clutter) and first and second plurality of couplers 2007 and 2008, respectively (only one coupler in each plurality of couplers called out in FIG. 24C to reduce visual clutter). Third coupler control line 2403 provides analog signals to inter-layer couplers 2009*b* (only one called out to reduce visual clutter) and to inter-layer couplers 2009*c* (only one called out to reduce visual clutter). A person skilled in the art will understand that quantum processor 2000 comprises as many inter-layer couplers 2009*b* as the number of qubits in second plurality of qubits 2004 and as many inter-layer couplers 2009*c* as the number of qubits in third plurality of qubits 2005. As described above with reference to FIG. 20, inter-layer couplers 2009*b* provide communicative coupling between qubits in second plurality of qubits 2004 in first surface code layer 2001 and qubits in second plurality of qubits 2004 in second surface code layer 2002. Inter-layer couplers 2009*c* provide communicative coupling between qubits in third plurality of qubits 2005 in first surface code layer 2001 and qubits in third plurality of qubits 2005 in second surface code layer 2002. Third coupler control line 2403 traverses a path similar to the path of inter-qubit coupler control line (analog lines 707 depicted in FIG. 7), but provides analog signals to inter-layer couplers 2009*b* and 2009*c* rather than inter-qubit couplers.

Figure 24D:
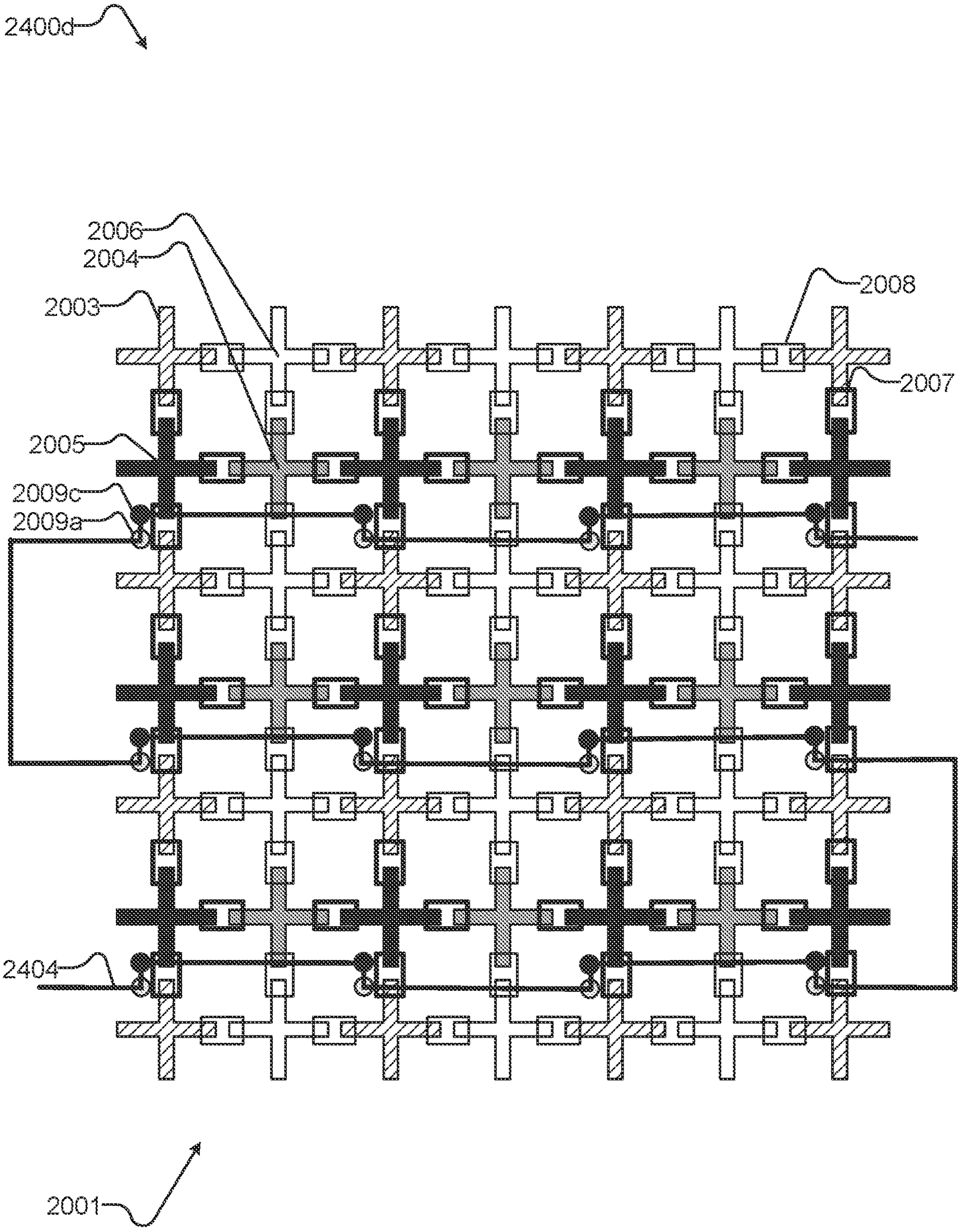
FIG. 24D is a schematic diagram of a fourth coupler control line for inter-sheet couplers coupling qubits in the first plurality of qubits and qubits in the third plurality of qubits between the first and the second surface code layer of qubits, in accordance with the present systems, devices, and methods.

FIG. 24D is a schematic diagram 2400*d* including a fourth coupler control line 2404 for inter-layer couplers coupling qubits in first plurality of qubits 2003 and qubits in third plurality of qubits 2005 between the first and the second surface code layer of qubits of a quantum processor implementing the robust architecture described above with references to FIGS. 20, 21A, 21B, 21C and 23.

Diagram 2400*d* shows first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24D to reduce visual clutter) and first and second plurality of couplers 2007 and 2008, respectively (only one coupler in each plurality of couplers called out in FIG. 24D to reduce visual clutter). Fourth coupler control line 2404 provides analog signals to inter-layer couplers 2009*a* (only one called out to reduce visual clutter) and to inter-layer couplers 2009*c* (only one called out to reduce visual clutter). A person skilled in the art will understand that quantum processor 2000 comprises as many inter-layer couplers 2009*a* as the number of qubits in first plurality of qubits 2003 and as many inter-layer couplers 2009*c* as the number of qubits in third plurality of qubits 2005. As described above with reference to FIG. 20, inter-layer couplers 2009*a* provide communicative coupling between qubits in first plurality of qubits 2003 in first surface code layer 2001 and qubits in first plurality of qubits 2003 in second surface code layer 2002. Inter-layer couplers 2009*c* provide communicative coupling between qubits in third plurality of qubits 2005 in first surface code layer 2001 and qubits in third plurality of qubits 2005 in second surface code layer 2002. Fourth coupler control line 2404 traverses a path similar to the path of inter-qubit coupler control line (analog lines 708 depicted in FIG. 7), but provides analog signals to inter-layer couplers 2009*a* and 2009*c* rather than inter-qubit couplers.

Figure 24E:
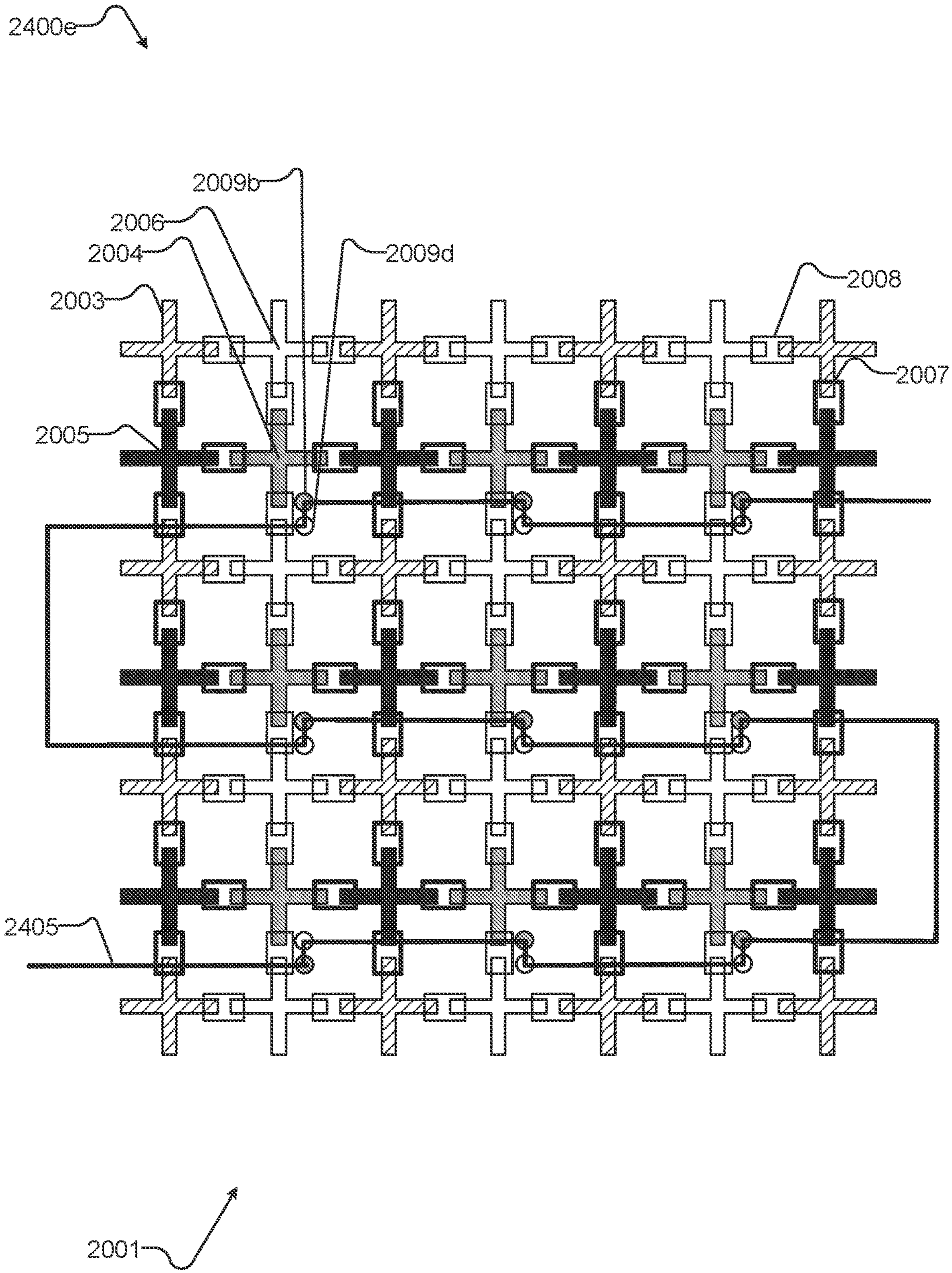
FIG. 24E is a schematic diagram of a fifth coupler control line for inter-sheet couplers coupling qubits in the third plurality of qubits and qubits in the fourth plurality of qubits between the first and second surface code layer of qubits, in accordance with the present systems, devices, and methods.

FIG. 24E is a schematic diagram 2400*e* including a fifth coupler control line 2405 for inter-layer couplers coupling qubits in second plurality of qubits 2004 and qubits in fourth plurality of qubits 2006 between the first and the second surface code layer of qubits of a quantum processor implementing the robust architecture described above with references to FIGS. 20, 21A, 21B, 21C and 23.

Diagram 2400*e* shows first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24E to reduce visual clutter) and first and second plurality of couplers 2007 and 2008, respectively (only one coupler in each plurality of couplers called out in FIG. 24E to reduce visual clutter). Fifth coupler control line 2405 provides analog signals to inter-layer couplers 2009*b* (only one called out to reduce visual clutter) and to inter-layer couplers 2009*d* (only one called out to reduce visual clutter). A person skilled in the art will understand that quantum processor 2000 comprises as many inter-layer couplers 2009*b* as the number of qubits in second plurality of qubits 2004 and as many inter-layer couplers 2009*d* as the number of qubits in fourth plurality of qubits 2006. As described above with reference to FIG. 20, inter-layer couplers 2009*b* provide communicative coupling between qubits in second plurality of qubits 2004 in first surface code layer 2001 and qubits in second plurality of qubits 2004 in second surface code layer 2002. Inter-layer couplers 2009*d* provide communicative coupling between qubits in fourth plurality of qubits 2006 in first surface code layer 2001 and qubits in fourth plurality of qubits 2006 in second surface code layer 2002. Fifth coupler control line 2405 traverses a path similar to the path of inter-qubit coupler control line (analog lines 701 depicted in FIG. 7), but provides analog signals to inter-layer couplers 2009*b* and 2009*d* rather than inter-qubit couplers.

Figure 24F:
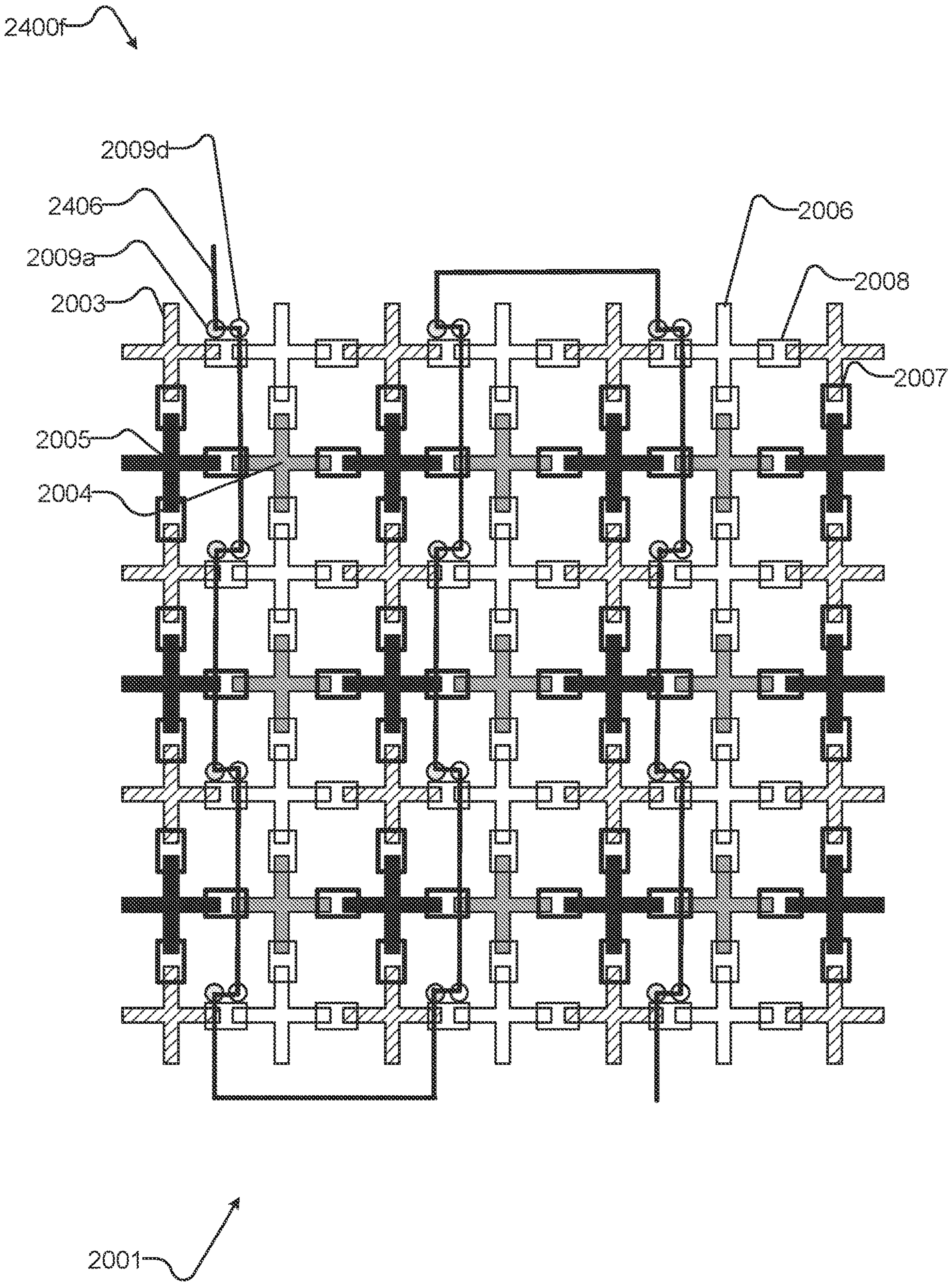
FIG. 24F is a schematic diagram of a sixth coupler control line for inter-sheet couplers coupling qubits in the first plurality of qubits and qubits in the fourth plurality of qubits between the first and second surface code layer of qubits, in accordance with the present systems, devices, and methods.

FIG. 24F is a schematic diagram 2400*f* including a sixth coupler control line 2406 for inter-layer couplers coupling qubits in first plurality of qubits 2003 and qubits in fourth plurality of qubits 2006 between the first and the second surface code layer of qubits of a quantum processor implementing the robust architecture described above with references to FIGS. 20, 21A, 21B, 21C and 23.

Diagram 2400*f* shows a first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24F to reduce visual clutter) and first and second plurality of couplers 2007 and 2008, respectively (only one coupler in each plurality of couplers called out in FIG. 24F to reduce visual clutter). Sixth coupler control line 2406 provides analog signals to inter-layer couplers 2009*a* (only one called out to reduce visual clutter) and to inter-layer couplers 2009*d* (only one called out to reduce visual clutter). A person skilled in the art will understand that quantum processor 2000 comprises as many inter-layer couplers 2009*a* as the number of qubits in first plurality of qubits 2003 and as many inter-layer couplers 2009*d* as the number of qubits in fourth plurality of qubits 2006. As described above with reference to FIG. 20, inter-layer couplers 2009*a* provide communicative coupling between qubits in first plurality of qubits 2003 in first surface code layer 2001 and qubits in first plurality of qubits 2003 in second surface code layer 2002. Inter-layer couplers 2009*d* provide communicative coupling between qubits in fourth plurality of qubits 2006 in first surface code layer 2001 and qubits in fourth plurality of qubits 2006 in second surface code layer 2002. Sixth coupler control line 2406 traverses a path similar to the path of inter-qubit coupler control line (analog lines 702 depicted in FIG. 7), but provides analog signals to inter-layer couplers 2009*a* and 2009*d* rather than inter-qubit couplers.

Figure 24G:
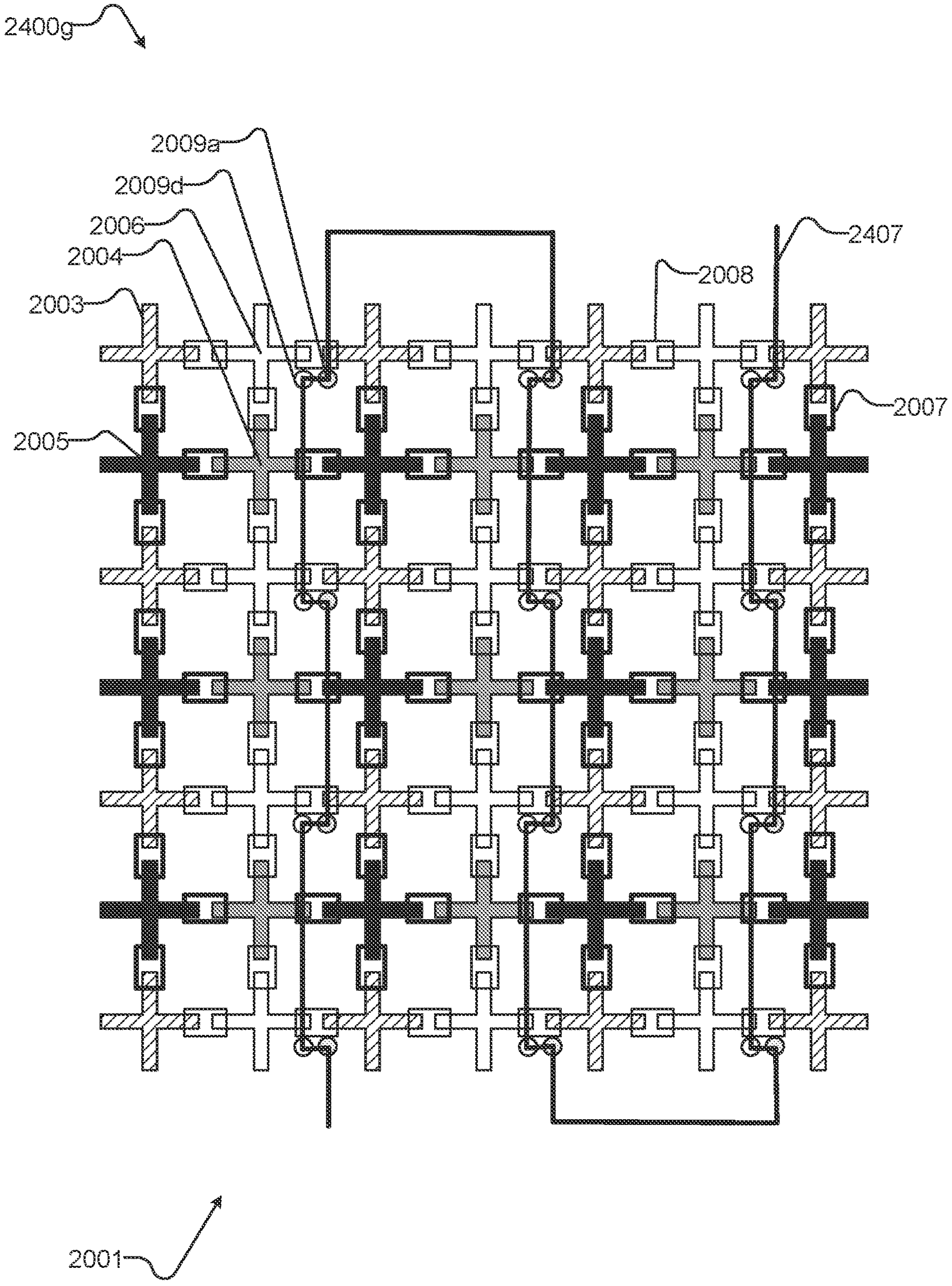
FIG. 24G is a schematic diagram of a seventh coupler control line for inter-sheet couplers coupling qubits in the first plurality of qubits and qubits in the fourth plurality of qubits between the first and second surface code layer of qubits, in accordance with the present systems, devices, and methods.

FIG. 24G is a schematic diagram 2400*g* including a seventh coupler control line 2407 for inter-layer couplers coupling qubits in first plurality of qubits 2003 and qubits in fourth plurality of qubits 2006 between the first and the second surface code layer of qubits of a quantum processor implementing the robust architecture described above with references to FIGS. 20, 21A, 21B, 21C and 23.

Diagram 2400*g* shows a first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24G to reduce visual clutter) and first and second plurality of couplers 2007 and 2008, respectively (only one coupler in each plurality of couplers called out in FIG. 24G to reduce visual clutter). Seventh coupler control line 2407 provides analog signals to inter-layer couplers 2009*a* (only one called out to reduce visual clutter) and to inter-layer couplers 2009*d* (only one called out to reduce visual clutter). A person skilled in the art will understand that quantum processor 2000 comprises as many inter-layer couplers 2009*a* as the number of qubits in first plurality of qubits 2003 and as many inter-layer couplers 2009*d* as the number of qubits in fourth plurality of qubits 2006. As described above with reference to FIG. 20, inter-layer couplers 2009*a* provide communicative coupling between qubits in first plurality of qubits 2003 in first surface code layer 2001 and qubits in first plurality of qubits 2003 in second surface code layer 2002. Inter-layer couplers 2009*d* provide communicative coupling between qubits in fourth plurality of qubits 2006 in first surface code layer 2001 and qubits in fourth plurality of qubits 2006 in second surface code layer 2002. Seventh coupler control line 2407 traverses a path similar to the path of inter-qubit coupler control line (analog lines 703 depicted in FIG. 7), but provides analog signals to inter-layer couplers 2009*a* and 2009*d* rather than inter-qubit couplers.

Figure 24H:
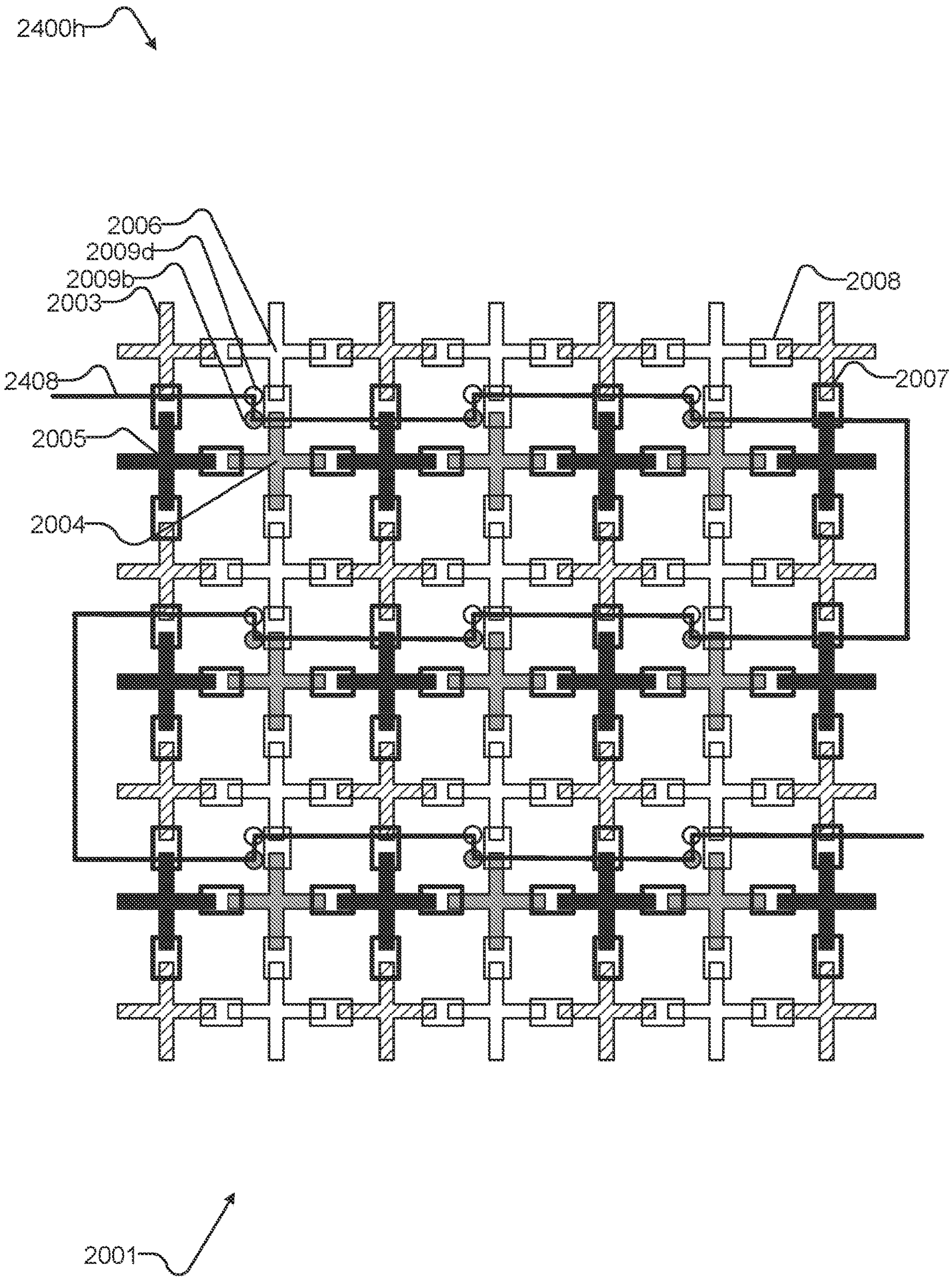
FIG. 24H is a schematic diagram of an eighth coupler control line for inter-sheet couplers coupling qubits in the second plurality of qubits and qubits in the fourth plurality of qubits between the first and second surface code layer of qubits, in accordance with the present systems, devices, and methods.

FIG. 24H is a schematic diagram 2400*h* including an eighth coupler control line 2408 for inter-layer couplers coupling qubits in second plurality of qubits 2004 and qubits in fourth plurality of qubits 2006 between the first and the second surface code layer of qubits of a quantum processor implementing the robust architecture described above with references to FIGS. 20, 21A, 21B, 21C and 23.

Diagram 2400*h* shows a first surface code layer 2001 of qubits of quantum processor 2000 from FIG. 20 comprising first, second, third, and fourth plurality of qubits 2003, 2004, 2005, and 2006, respectively (only one qubit in each plurality of qubits called out in FIG. 24H to reduce visual clutter) and first and second plurality of couplers 2007 and 2008, respectively (only one coupler in each plurality of couplers called out in FIG. 24H to reduce visual clutter). Eighth coupler control line 2408 provides analog signals to inter-layer couplers 2009*b* (only one called out to reduce visual clutter) and to inter-layer couplers 2009*d* (only one called out to reduce visual clutter). A person skilled in the art will understand that quantum processor 2000 comprises as many inter-layer couplers 2009*b* as the number of qubits in second plurality of qubits 2004 and as many inter-layer couplers 2009*d* as the number of qubits in fourth plurality of qubits 2006. As described above with reference to FIG. 20, inter-layer couplers 2009*b* provide communicative coupling between qubits in second plurality of qubits 2004 in first surface code layer 2001 and qubits in second plurality of qubits 2004 in second surface code layer 2002. Inter-layer couplers 2009*d* provide communicative coupling between qubits in fourth plurality of qubits 2006 in first surface code layer 2001 and qubits in fourth plurality of qubits 2006 in second surface code layer 2002. Eighth coupler control line 2408 traverses a path similar to the path of inter-qubit coupler control line analog lines 704 depicted in FIG. 7), but provides analog signals to inter-layer couplers 2009*b* and 2009*d* rather than inter-qubit couplers.

Figure 25A:
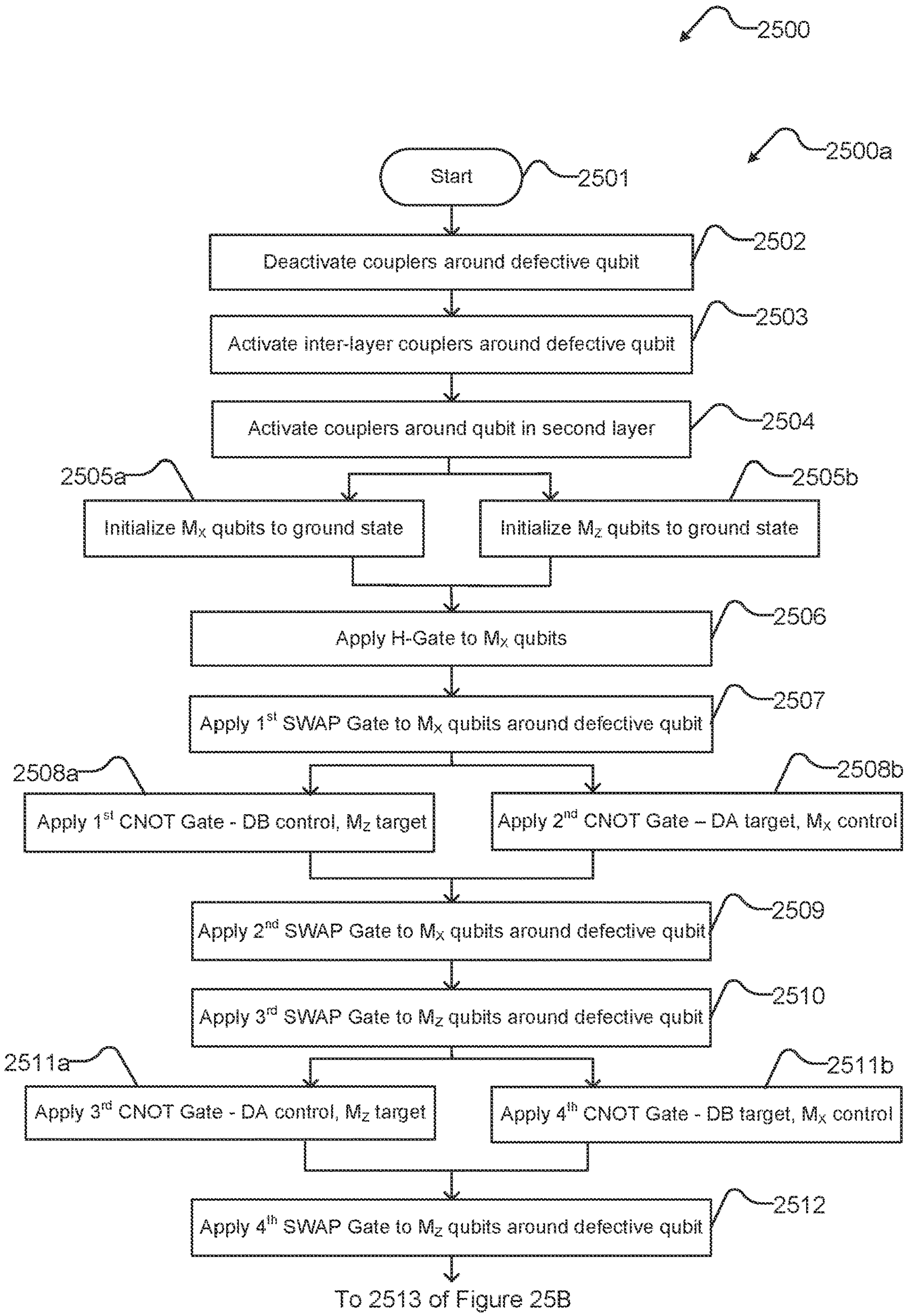
FIGS. 25A and 25B are flow diagrams illustrating an example surface code method in the quantum processor of FIG. 20 with one defective data-A qubit, in accordance with the present systems, devices, and methods.
Figure 25B:
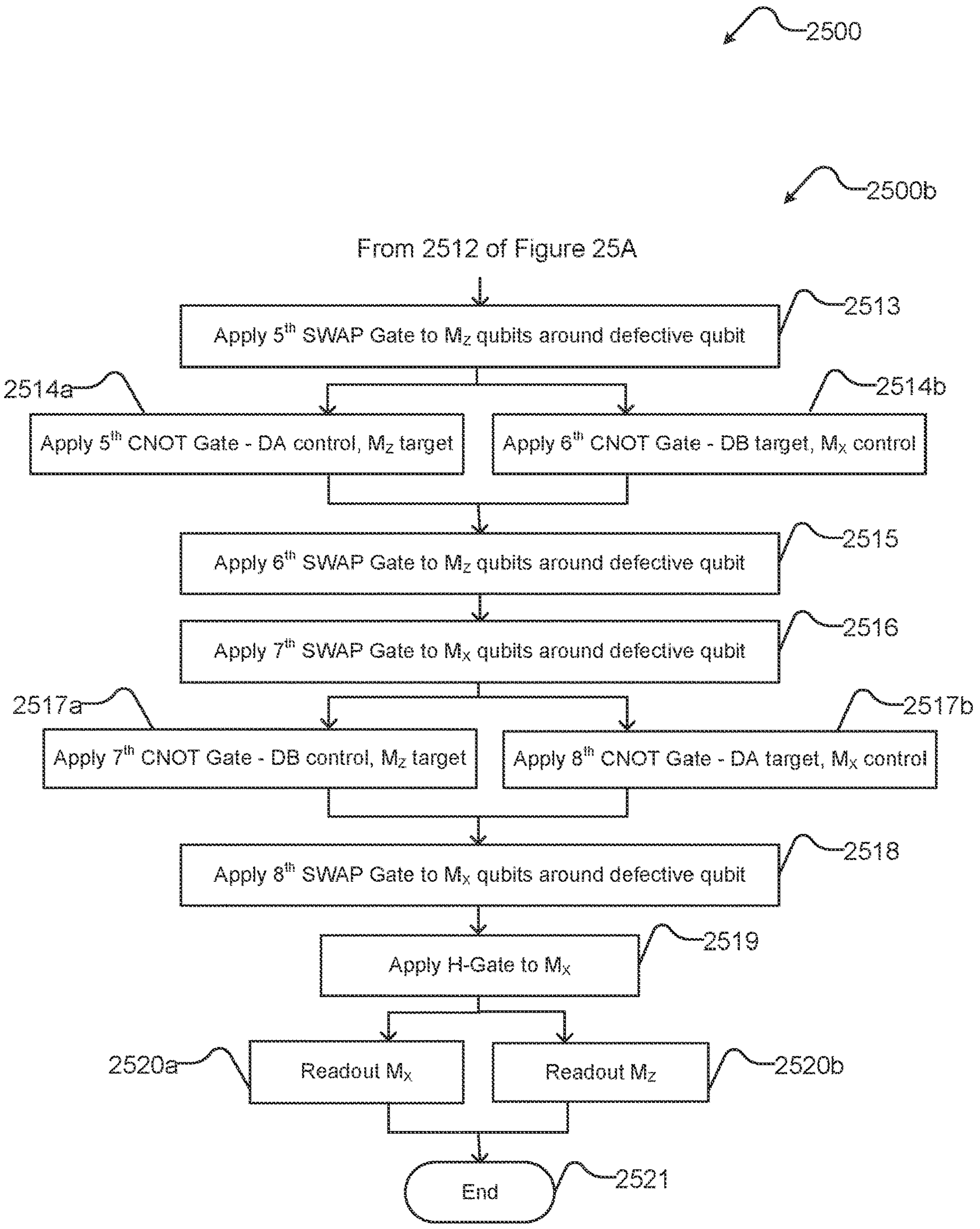

FIGS. 25A and 25B are flow diagrams illustrating an example surface code implementation method 2500 in the quantum processor 2000 of FIG. 20. Quantum processor 2000 may have one or more defective qubits, as described above with respect to FIG. 21A. FIG. 25A is a flow diagram illustrating a first part 2500*a* of method 2500 and FIG. 25B is a flow diagram illustrating a second part 2500*b* of method 2500. Control of method 2500 can move from first part 2500*a* to second part 2500*b*, and vice-versa.

Method 2500 may be executed by a classical computer, for example digital computer 102 of FIG. 1, in communication with a quantum processor, for example quantum processor 126 of FIG. 1 and/or quantum processor 2000 of FIG. 20. Method 2500 comprises acts 2501, 2502, 2503, 2504, 2505*a*, 2505*b*, 506, 2507, 2508*a*, 2508*b*, 2509, 2510, 2511*a*, 2511*b*, 2512, 2513, 2514*a*, 2514*b*, 2515, 2516, 2517*a*, 25176, 2518, 2519, 2520*a*, 2502*b*, 2521; however, a person skilled in the art will understand that the number of acts is an example, and in some implementations, certain acts may be omitted, further acts may be added, and/or the order of the acts may be changed. Method 2500 will be described with one defective qubit 2101*a* in first plurality of qubits 2003*a*, however, a person skilled in the art will understand that a modification of method 2500 may be applied when one or more qubits in second plurality of qubits 2004*a*, third plurality of qubits 2005*a*, and/or fourth plurality of qubits 2006*a* are defective. Such modification will be described with reference to method 2600 of FIGS. 26A and 26B.

First part 2500*a* of method 2500 starts at 2501, for example, in response to a call from another routine.

At 2502, digital computer 102 deactivates the four couplers that directly couple the defective qubit (e.g., qubit 2101*a*) in first surface code layer 2001 to its neighboring qubits (e.g., qubits 2102*a*, 2103*a*, 2104*a* and 2105*a*) in first surface code layer 2001. The four couplers may belong to first plurality of couplers 2007*a* and/or second plurality of couplers 2008*a*. The couplers may be deactivated by decoupling them from control lines (analog lines 701 through 707).

At 2503, digital computer 102 activates the inter-layer couplers (e.g., inter-layer couplers **2009_*a*2009_*b*, 2009_*c*, and 2009_*d*) between the neighbors of the defective qubit (e.g., qubits 2102***a*, 2103*a*, 2104*a*, and 2105*a*) in first surface code layer 2001 and the homologous qubits (e.g., qubits 2102*b*, 2103*b*, 2104*b*, and 2105*b*) in second surface code layer 2002. Inter-layer couplers 2009 are activated via coupler control lines 2401-2408 and aQFP switches 2312, as described above with reference to FIGS. 23 and 24A-24H.

At 2504, digital computer 102 activates the four couplers that directly couple qubits 2102*b*, 2103*b*, 2104*b* and 2105*b* to qubit 2101*b* in second surface code layer 2002, where qubit 2101*b* is the homologous qubit in second surface code layer 2002 of the defective qubit 2101*a* in first surface code layer 2001. The four couplers that directly couple qubits in second surface code layer 2002 may belong to first plurality of couplers 2007*b* and/or second plurality of couplers 2008*b*. A person skilled in the art will understand that the order of acts 2502, 2503, and 2504 is interchangeable, and in some implementations, acts 2502, 2503 and 2504 may be executed parallel or concurrently, or even simultaneously.

Acts 2505*a* and 2505*b* are executed by digital computer 102 in parallel or concurrently, or even simultaneously.

At 2505*a*, digital computer 102 initializes qubits ($M_X$) in third plurality of qubits 2005*a* to their ground state. Further description can be found at act 902*a* of FIG. 9.

At 2505*b*, digital computer 102 initializes qubits ($M_Z$) in fourth plurality of qubits 2006*a* to their ground state. Further description can be found at act 902*b* of FIG. 9. At 2506, digital computer 102 causes a Hadamard gate (H-gate) to be applied to qubits $M_X$. Further description can be found at act 903 of FIG. 9.

At 2507, digital computer 102 causes a first SWAP gate to be applied between neighboring qubit 2104*a* ($M_X$) coupled to defective qubit 2101*a* in first surface code layer 2001 and homologous qubit 2104*b* ($M_X$) in second surface code layer 2002.

Acts 2508*a* and 2508*b* are executed by digital computer 102 in parallel or concurrently, or even simultaneously.

At 2508*a*, digital computer 102 causes a first CNOT gate to be applied to data qubits (DB) in second plurality of qubits 2004*a* as control qubits and to qubits $M_Z$ in fourth plurality of qubits 2006*a* as target qubits. Further description can be found at act 904*a* of FIG. 9.

At 2508*b*, digital computer 102 causes a second CNOT gate to be applied to data qubits (DA) in first plurality of qubits 2003*a* as target qubits and to qubits $M_X$ in third plurality of qubits 2005*a* as control qubits. Further description can be found at act 904*b* of FIG. 9. Given that defective qubit 2101*a* is in first plurality of qubits 2003*a* in first surface code layer 2001, the second CNOT gate uses qubit 2101*b* in second surface code layer 2002 as the target qubit and qubit 2104*b* as the control qubit, instead of qubits 2101*a* and 2104*a*.

At 2509, digital computer 102 causes a second SWAP gate to be applied between neighboring qubit 2104*b* ($M_X$) coupled to qubit 2101*b* in second surface code layer 2002 and the homologous qubit 2104*a* ($M_X$) in first surface code layer 2001.

At 2510, digital computer 102 causes a third SWAP gate to be applied between neighboring qubit 2103*a* ($M_Z$) coupled to defective qubit 2101*a* in first surface code layer 2001 and homologous qubit 2103*b* ($M_Z$) in second surface code layer 2002.

Acts 2511*a* and 2511*b* are executed by digital computer 102 in parallel or concurrently, or even simultaneously.

At 2511*a*, digital computer 102 causes a third CNOT gate to be applied to data qubits (DA) in first plurality of qubits 2003*a* as control qubits and to qubits $M_Z$ as target qubits. Further description can be found at act 905*a* of FIG. 9. Given that defective qubit 2101*a* is in first plurality of qubits 2003*a* in first surface code layer 2001, the third CNOT gate uses qubit 2101*b* in second layer 2002 as control and qubit 2103*b* in second surface code layer 2002 as target, instead of qubits 2101*a* and 2103*a*.

At 2511*b*, digital computer 102 causes a fourth CNOT gate to be applied to data qubits DB in second plurality of qubits 2004*a* as target qubits and to qubits $M_X$ as control qubits. Further description can be found at act 905*b* of FIG. 9.

At 2512, digital computer 102 causes a fourth SWAP gate to be applied between the neighboring qubit 2103*b* ($M_Z$) coupled to qubit 2101*b* in second surface code layer 2002 and homologous qubit 2103*a* ($M_Z$) in first surface code layer 2001. Control of method 2500 then proceeds to second part 2500*b* of method 2500, illustrated in FIG. 25B.

At 2513, digital computer 102 causes a fifth SWAP gate to be applied between neighboring qubit 2105*a* ($M_Z$) coupled to defective qubit 2101*a* in first surface code layer 2001 and homologous qubit 2105*b* ($M_Z$) in second surface code layer 2002.

Acts 2514*a* and 2514*b* are executed by digital computer 102 in parallel or concurrently, or even simultaneously.

At 2514*a*, digital computer 102 causes a fifth CNOT gate to be applied to data qubits DA in first plurality of qubits 2003*a* as control qubits and to qubits $M_Z$ as target qubits. Further description can be found at act 906*a* of FIG. 9. Given that defective qubit 2101*a* is in first plurality of qubits 2003*a* in first surface code layer 2001, the fifth CNOT gate uses qubit 2101*b* in second surface code layer 2002 as the control qubit and qubit 2105*b* in second surface code layer 2002 as the target qubit, instead of qubits 2101*a* and 2105*a*.

At 2514*b*, digital computer 102 causes a sixth CNOT gate to be applied to data qubits DB in second plurality of qubits 2004*a* as target qubits and to qubits $M_X$ as control qubits. Further description can be found at act 906*b* of FIG. 9.

At 2515, digital computer 102 causes a sixth SWAP gate to be applied between neighboring qubit 2105*b* ($M_Z$) coupled to qubit 2101*b* in second surface code layer 2002 and homologous qubit 2105*a* ($M_Z$) in first surface code layer 2001.

At 2516, digital computer 102 causes a seventh SWAP gate to be applied between neighboring qubit 2102*a* ($M_X$) coupled to defective qubit 2101*a* in first surface code layer 2001 and homologous qubit 2102*b* ($M_X$) in second surface code layer 2002.

Acts 2517*a* and 2517*b* are executed by digital computer 102 in parallel or concurrently, or even simultaneously.

At 2517*a*, digital computer 102 causes a seventh CNOT gate to be applied to data qubits DB in second plurality of qubits 2004*a* as control qubits and to qubits $M_Z$ as target qubits. Further description can be found at act 907*a* of FIG. 9.

At 2517*b*, digital computer 102 causes an eighth CNOT gate to be applied to data qubits DA in first plurality of qubits 2003*a* as target qubits and to qubits $M_X$ as control qubits. Further description can be found at act 907*b* of FIG. 9. Given that defective qubit 2101*a* is in first plurality of qubits 2003*a* in first surface code layer 2001, the eighth CNOT gate uses qubit 2101*b* in second surface code layer 2002 as the target qubit and qubit 2102*b* in second surface code layer 2002 as the control qubit, instead of qubits 2101*a* and 2102*a*.

At 2518, digital computer 102 causes an eighth SWAP gate to be applied between neighboring qubit 2102 ($M_X$) coupled to qubit 2101*b* in second surface code layer 2002 and homologous qubit 2102*a* ($M_X$) in first surface code layer 2001.

At 2519, digital computer 102 causes an H-gate to be applied to qubits $M_X$. Further description can be found at act 908 of FIG. 9.

Acts 2520*a* and 2520*b* are executed by digital computer 102 in parallel or concurrently, or even simultaneously.

At 2520*a*, digital computer 102 causes states of qubits $M_X$ to be read out. Further description can be found at act 909*a* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2520*b*, digital computer 102 causes states of qubits $M_Z$ to be read out. Further description can be found at act 909*b* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2521, method 2500 ends, until it is, for example, invoked again.

Method 2500 was described with one defective qubit 2101*a* in first plurality of qubits 2003*a*, however, a person skilled in the art will understand that a modification of method 2500 may be applied when one or more qubits in second plurality of qubits 2004*a*, third plurality of qubits 2005*a* and/or fourth plurality of qubits 2006*a* are defective.

Figure 26A:
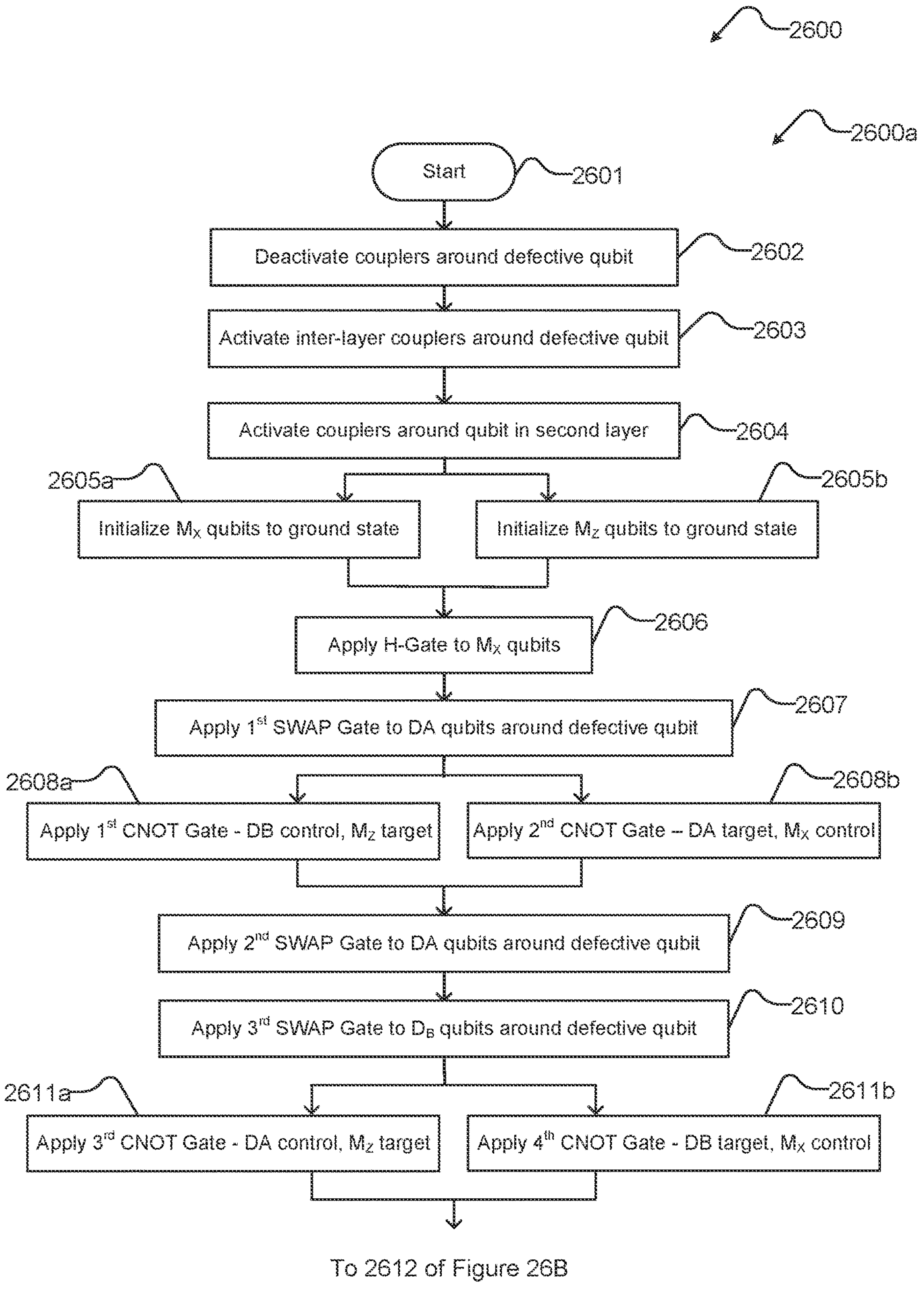
FIGS. 26A and 26B are flow diagrams illustrating an example surface code method in the quantum processor of FIG. 20 with one defective measure-X qubit, in accordance with the present systems, devices, and methods.
Figure 26B:
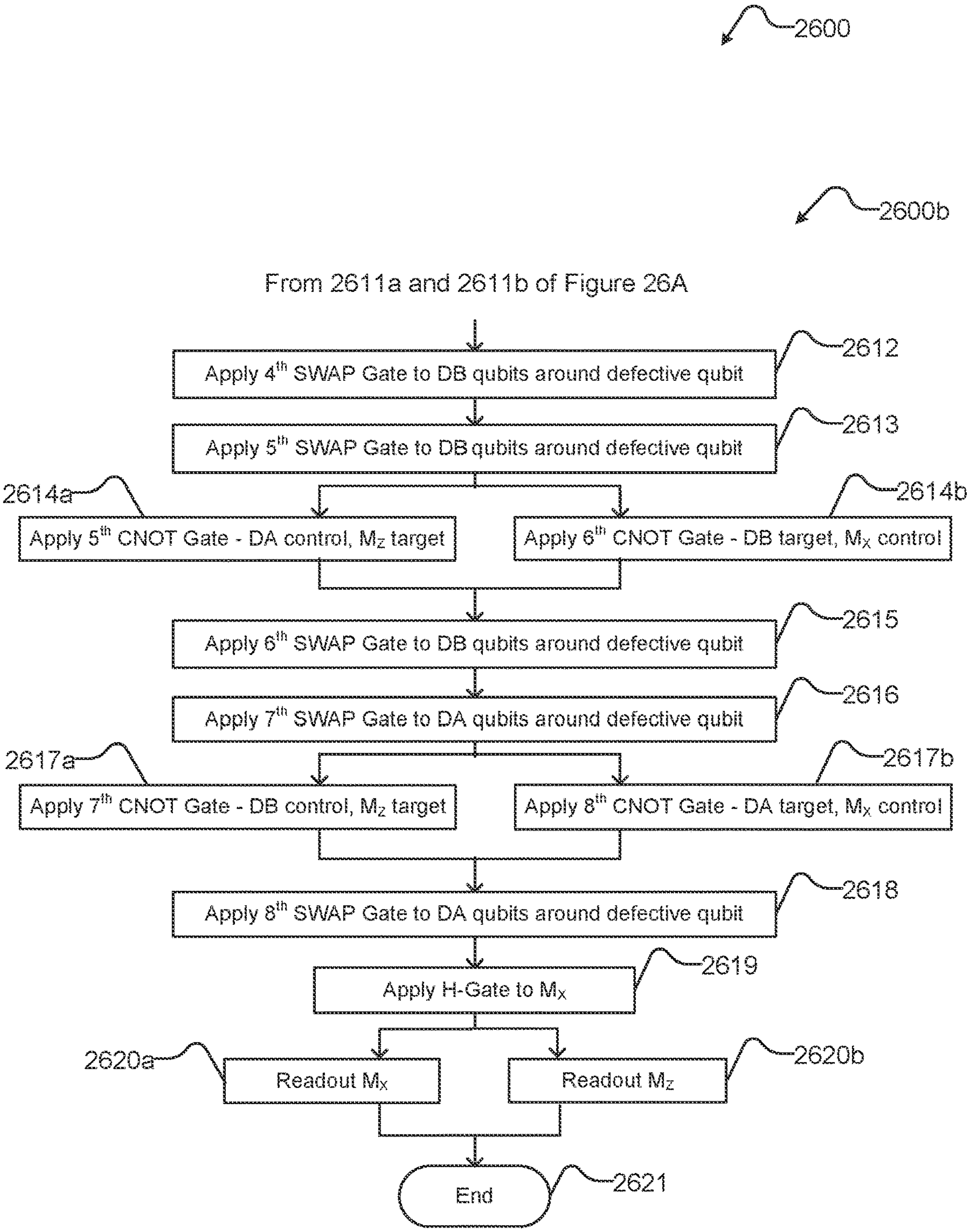

FIGS. 26A and 26B are flow diagrams illustrating an example surface code implementation method 2600 in the quantum processor 2000 of FIG. 20, having qubit control lines and coupler control lines of FIGS. 3 and 4, respectively. Quantum processor 2000 may have one or more defective $M_X$ qubits, as illustrated in FIG. 21B. FIG. 26A is a flow diagram illustrating a first part 2600*a* of method 2600 and FIG. 26B is a flow diagram illustrating a second part 2600*b* of method 2600. Control of method 2600 can move from first part 2600*a* to second part 2600*b*, and vice-versa. Method 2600 may be executed by a classical computer, for example digital computer 102 of FIG. 1, in communication with a quantum processor, for example quantum processor 126 of FIG. 1 and/or quantum processor 2000 of FIG. 20. Method 2600 comprises acts 2601, 2602, 2603, 2604, 2605*a*, 2605*b*, 2606, 2607, 2608*a*, 2608*b*, 2609, 2610, 2611*a*, 2611*b*, 2612, 2613, 2614*a*, 2614*b*, 2615, 266, 2617*a*, 2671*b*, 2618, 2619, 2620*a*, 2620*b* and 2621; however, a person skilled in the art will understand that the number of acts is an example, and in some implementations, certain acts may be omitted, further acts may be added, and/or the order of the acts may be changed. Method 2600 will be described with one defective qubit 2104*a* ($M_X$) in third plurality of qubits 2005*a*.

First part 2600*a* of method 2600 starts at 2601, for example, in response to a call from another routine.

At 2602, digital computer 102 deactivates the four couplers that directly couple the defective qubit (e.g., qubit 2104*a*) to its neighboring qubits (e.g., qubits 2101*a*, 2106*a*, 2107*a* and 2106*a*) in first surface code layer 2001. The four couplers may belong to first plurality of couplers 2007*a* and/or second plurality of couplers 2008*a*. The couplers may be deactivated by decoupling them from control lines (analog lines 701 through 707 of FIG. 7).

At 2603, digital computer 102 activates the inter-layer couplers (e.g., inter-layer couplers 2009_*e*, 2009_*f*, 2009_*g*, and 2009_*h*) between the neighbors of the defective qubit (e.g., qubits 2101*a*, 2106*a*, 2107*a*, and 2108*a*) in first surface code layer 2001 and the homologous qubits (e.g., qubits 2101*b*, 2106*b*, 2107*b*, and 2108*b*) in second surface code layer 2002. Inter-layer couplers 2009 are activated via coupler control lines 2401-2408 and aQFP switches 2312, as described above with reference to FIGS. 23 and 24A-24H.

At 2604, digital computer 102 activates the four couplers that directly couple qubits 2101*b*, 2106*b*, 2107*b* and 2108*b* to qubit 2104*b* in second surface code layer 2002, where qubit 2104*b* is the homologous qubit in second surface code layer 2002 of the defective qubit 2104*b* in first surface code layer 2001. The four couplers may belong to first plurality of couplers 2007*b* and/or second plurality of couplers 2008*b*. A person skilled in the art will understand that the order of acts 2602, 2603, and 2604 is interchangeable, and in some implementations, acts 2602, 2603, and 2604 may be executed parallel or concurrently, or even simultaneously.

Acts 2605*a* and 2605*b* are executed by digital computer 102 in parallel or concurrently, or even simultaneously.

At 2605*a*, digital computer 102 initializes qubits ($M_X$) in third plurality of qubits 2005*a* to their ground state. Further description can be found at act 902*a* of FIG. 9. Given that one qubit in the third layer of qubits 2005*a* in first surface code layer 2001 is defective qubit 2104*a*, the homologous qubit 2104*b* in second surface code layer 2002 is initialized to the ground state.

At 2605*b*, digital computer 102 initializes qubits ($M_Z$) in fourth plurality of qubits 2006*a* to their ground state. Further description can be found at act 902*b* of FIG. 9.

At 2606, digital computer 102 causes a Hadamard gate (H-gate) to be applied to qubits $M_X$. Further description can be found at act 903 of FIG. 9. Given that one qubit in the third layer of qubits 2005*a* in first surface code layer 2001 is defective qubit 2104*a*, digital computer 102 causes the Hadamard gate (H-gate) to be applied to the homologous qubit 2104*b* in second surface code layer 2002.

At 2607, digital computer 102 causes a first SWAP gate to be applied between neighboring qubit 2101*a* (DA) coupled to defective qubit 2104*a* in first surface code layer 2001 and homologous qubit 2101*b* (DA) in second surface code layer 2002.

Acts 2608*a* and 2608*b* are executed by digital computer 102 in parallel or concurrently, or even simultaneously.

At 2608*a*, digital computer 102 causes a first CNOT gate to be applied to data qubits (DB) in second plurality of qubits 2004*a* as control qubits and to qubits $M_Z$ in fourth plurality of qubits 2006*a* as target qubits. Further description can be found at act 904*a* of FIG. 9.

At 2608*b*, digital computer 102 causes a second CNOT gate to be applied to data qubits (DA) in first plurality of qubits 2003*a* as target qubits and to qubits $M_X$ in third plurality of qubits 2005*a* as control qubits. Further description can be found at act 904*b* of FIG. 9. Given that defective qubit 2104*a* is in third plurality of qubits 2005*a* in first surface code layer 2001, the first CNOT gate uses qubit 2104*b* in second surface code layer 2002 as control and qubit 2101*b* in second surface code layer 2002 as target, instead of qubits 2104*a* and 2101*a*.

At 2609, digital computer 102 causes a second SWAP gate to be applied between neighboring qubit 2101*b* (DA) coupled to qubit 2104*b* in second surface code layer 2002 and the homologous qubit 2101*a* (DA) in first surface code layer 2001.

At 2610, digital computer 102 causes a third SWAP gate to be applied between neighboring qubit 2106*a* (DB) coupled to defective qubit 2104*a* in first surface code layer 2001 and homologous qubit 2106*b* (DB) in second surface code layer 2002.

Acts 2611*a* and 2611*b* are executed by digital computer 102 in parallel or concurrently, or even simultaneously.

At 2611*a*, digital computer 102 causes a third CNOT gate to be applied to data qubits DA in first plurality of qubits 2003*a* as control qubits and to qubits $M_Z$ as target qubits. Further description can be found at act 905*a* of FIG. 9.

At 2611*b*, digital computer 102 causes a fourth CNOT gate to be applied to data qubits DB in second plurality of qubits 2004*a* as target qubits and to qubits $M_X$ as control qubits. Further description can be found at act 905*b* of FIG. 9. Given that defective qubit 2104*a* is in third plurality of qubits 2005*a* in first surface code layer 2001, the fourth CNOT gate uses qubit 2104*b* in second surface code layer 2002 as the control qubit and qubit 2106*b* in second surface code layer 2002 as the target qubit, instead of qubits 2104*a* and 2106*a*.

Control of method 2600 then proceeds to second part 2600*b* of method 2600, illustrated in FIG. 26B.

At 2612, digital computer 102 causes a fourth SWAP gate to be applied between the neighboring qubit 2106*b* (DB) coupled to qubit 2104*b* in second surface code layer 2002 and homologous qubit 2106*a* (DB) in first surface code layer 2001.

At 2613, digital computer 102 causes a fifth SWAP gate to be applied between neighboring qubit 2107*a* (DB) coupled to defective qubit 2104*a* in first surface code layer 2001 and homologous qubit 2107*b* (DB) in second surface code layer 2002.

Acts 2614*a* and 2614*b* are executed by digital computer 102 in parallel or concurrently, or even simultaneously.

At 2614*a*, digital computer 102 causes a fifth CNOT gate to be applied to data qubits DA in first plurality of qubits 2003*a* as control qubits and to qubits $M_Z$ as target qubits. Further description can be found at act 906*a* of FIG. 9.

At 2614*b*, digital computer 102 causes a sixth CNOT gate to be applied to data qubits DB in second plurality of qubits 2004*a* as target qubits and to qubits $M_X$ as control qubits. Further description can be found at act 906*b* of FIG. 9. Given that defective qubit 2104*a* is in third plurality of qubits 2005*a* in first surface code layer 2001, the sixth CNOT gate uses qubit 2104*b* in second surface code layer 2002 as the control qubit and qubit 2107*b* in second surface code layer 2002 as the target qubit, instead of qubits 2104*a* and 2107*a*.

At 2615, digital computer 102 causes a sixth SWAP gate to be applied between neighboring qubit 2107*b* (DB) coupled to qubit 2104*b* in second surface code layer 2002 and homologous qubit 2107*a* (DB) in first surface code layer 2001.

At 2616, digital computer 102 causes a seventh SWAP gate to be applied between neighboring qubit 2108*a* (DA) coupled to defective qubit 2104*a* in first surface code layer 2001 and homologous qubit 2108*b* (DA) in second surface code layer 2002.

Acts 2617*a* and 2617*b* are executed by digital computer 102 in parallel or concurrently, or even simultaneously.

At 2617*a*, digital computer 102 cause a seventh CNOT gate to be applied to data qubits DB in second plurality of qubits 2004*a* as control qubits and to qubits $M_Z$ as target qubits. Further description can be found at act 907*a* of FIG. 9.

At 2617*b*, digital computer 102 causes an eighth CNOT gate to be applied to data qubits DA in first plurality of qubits 2003*a* as target qubits and to qubits $M_X$ as control qubits. Further description can be found at act 907*b* of FIG. 9. Given that defective qubit 2104*a* is in third plurality of qubits 2005*a* in first surface code layer 2001, the eighth CNOT gate uses qubit 2104*b* in second surface code layer 2002 as control and qubit 2108*b* in second surface code layer 2002 as target, instead of qubits 2104*a* and 2108*a*.

At 2618, digital computer 102 causes an eighth SWAP gate to be applied between neighboring qubit 2108 (DA) coupled to qubit 2104*b* in second surface code layer 2002 and homologous qubit 2108*a* (DA) in first surface code layer 2001.

At 2619, digital computer 102 causes an H-gate to be applied to qubits $M_X$. Further description can be found at act 908 of FIG. 9.

Acts 2620*a* and 2620*b* are executed by digital computer 102 in parallel or concurrently, or even simultaneously.

At 2620*a*, digital computer 102 causes states of qubits $M_X$ to be read out. Further description can be found at act 909*a* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2620*b*, digital computer 102 causes states of qubits $M_Z$ to be read out. Further description can be found at act 909*b* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2621, method 2600 ends, until it is, for example, invoked again.

Figure 27A:
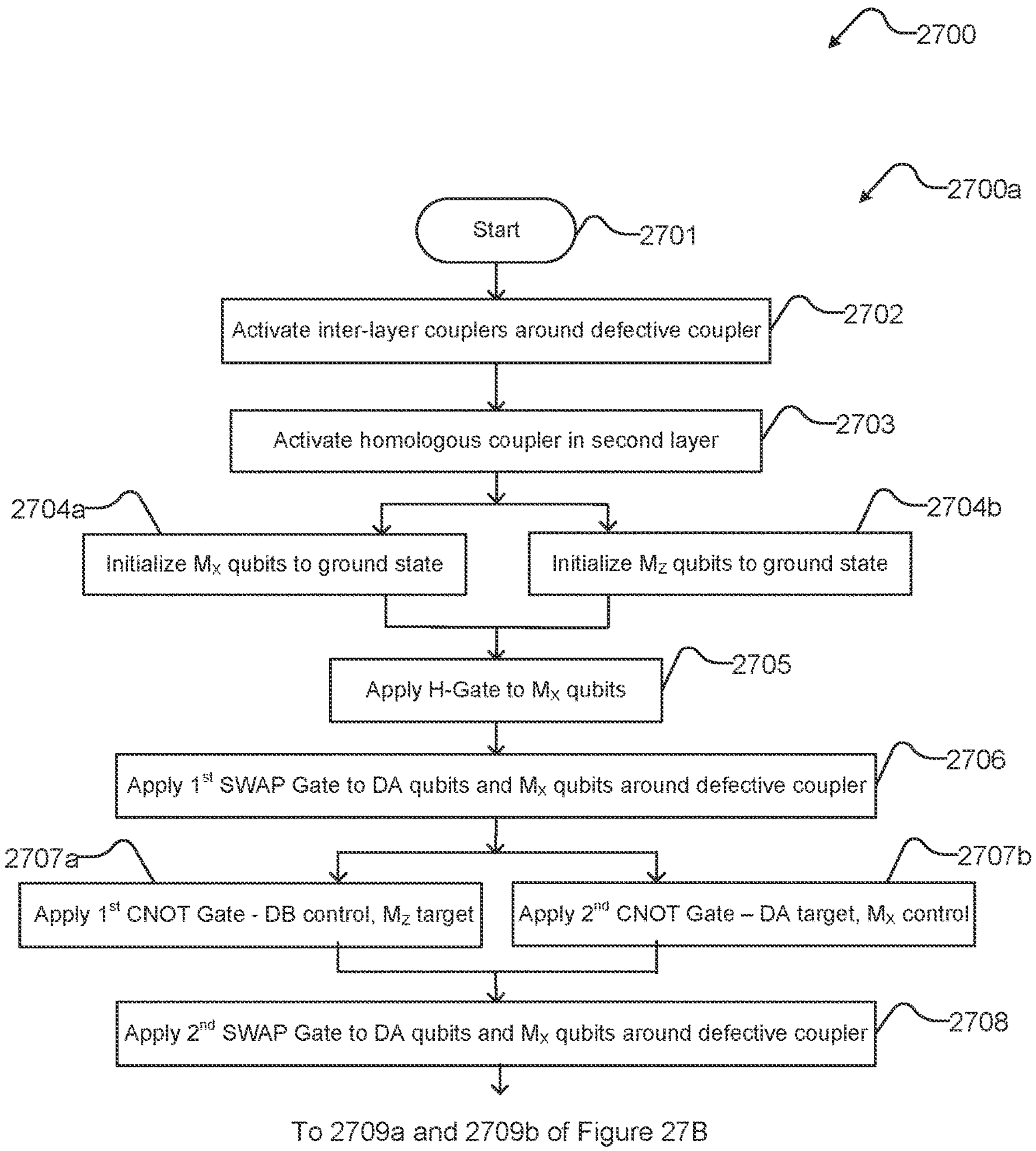
FIGS. 27A and 27B are flow diagrams illustrating an example surface code method in the quantum processor of FIG. 20 with one defective X-coupler in one layer, in accordance with the present systems, devices, and methods.
Figure 27B:
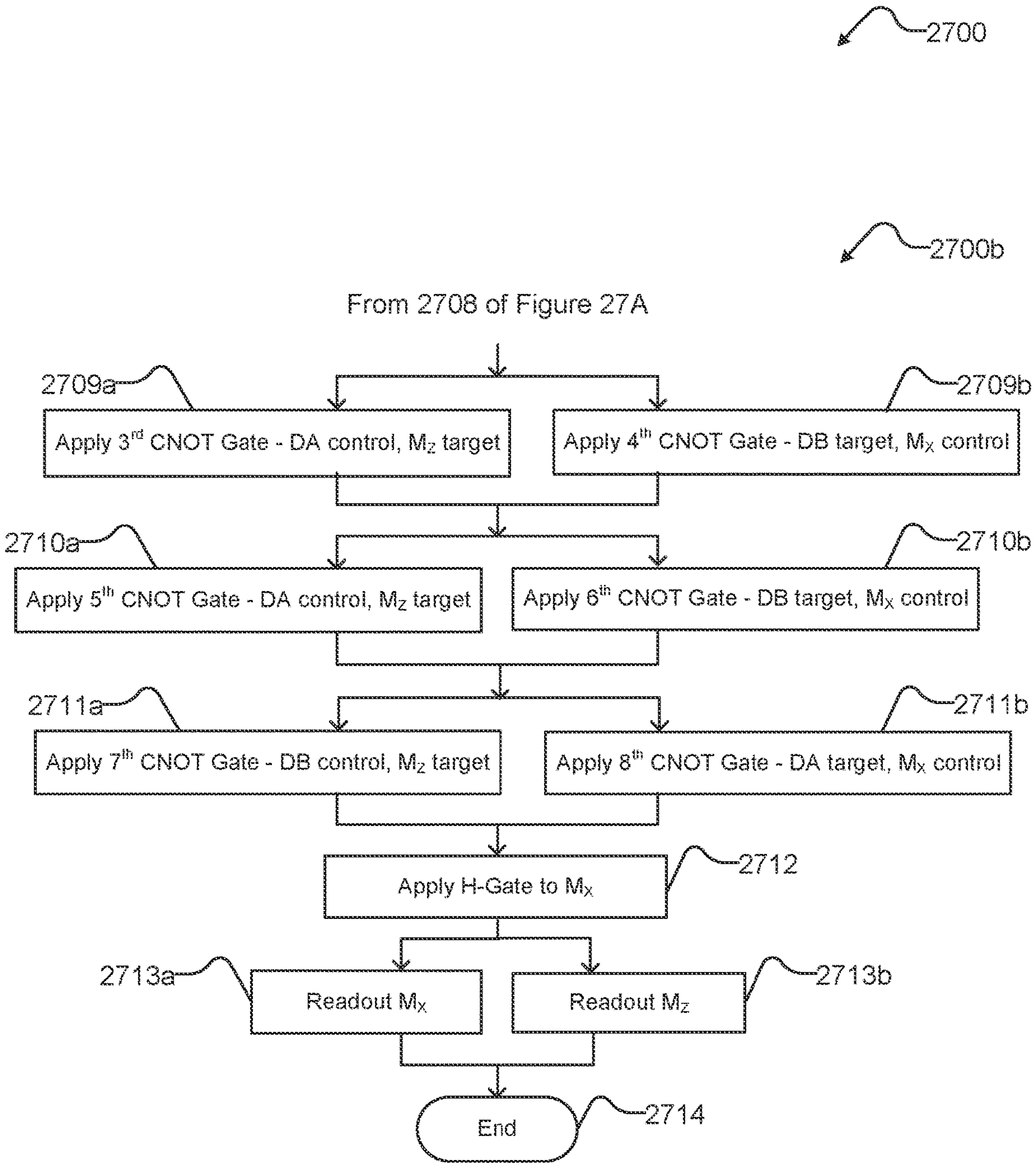

FIGS. 27A and 27B are flow diagrams illustrating an example surface code method 2700 in the quantum processor of FIG. 20 with one defective X-coupler in one layer. Quantum processor 2000 may have one or more defective couplers, as illustrated in FIG. 21C. FIG. 27A is a flow diagram illustrating a first part 2700*a* of method 2700 and FIG. 27B is a flow diagram illustrating a second part 2700*b* of method 2700. Control of method 2700 can move from first part 2700*a* to second part 2700*b*, and vice-versa. Method 2700 may be executed by a classical computer, for example digital computer 102 of FIG. 1, in communication with a quantum processor, for example quantum processor 126 of FIG. 1 and/or quantum processor 2000 of FIG. 20. Method 2700 comprises acts 2701, 2702, 2703, 2704*a*, 2704*b*, 2705, 2706, 2707*a*, 2707*b*, 2708, 2709*a*, 2709*b*, 2710*a*, 2710*b*, 2711*a*, 2711*b*, 2712, 2713*a*, 2713*b* and 2714; however, a person skilled in the art will understand that the number of acts is an example, and in some implementations, certain acts may be omitted, further acts may be added, and/or the order of the acts may be changed. Method 2700 will be described with one defective coupler 2109*a* (X-coupler) in first plurality of couplers 2007*a*.

First part 2700*a* of method 2700 starts at 2701, for example, in response to a call from another routine.

At 2702, digital computer 102 activates the inter-layer couplers (e.g., inter-layer couplers 2009_*e* and 2009_*c*) between the qubits (e.g., qubits 2101*a* and 2104*a*) coupled by the defective coupler (e.g., coupler 2109*a*) in first surface code layer 2001 and the homologous qubits (e.g., qubits 2101*b*, and 2104*b*) in second surface code layer 2002. Inter-layer couplers 2009 are activated via coupler control lines 2401-2408 and aQFP switches 2312, as described above with reference to FIGS. 23 and 24A-24H.

At 2703, digital computer 102 activates coupler 2109*b* that directly couple qubits 2101*b* and 2104*b* in second surface code layer 2002, where coupler 2109*b* is the homologous coupler in second surface code layer 2002 of the defective coupler 2109*a* in first surface code layer 2001. A person skilled in the art will understand that the order of acts 2702 and 2703 is interchangeable, and in some implementations, acts 2702 and 2703 may be executed parallel or concurrently, or even simultaneously.

Acts 2704*a* and 2704*b* are executed by digital computer 102 in parallel or concurrently, or even simultaneously.

At 2704*a*, digital computer 102 initializes qubits ($M_X$) in third plurality of qubits 2005*a* to their ground state. Further description can be found at act 902*a* of FIG. 9.

At 2704*b*, digital computer 102 initializes qubits ($M_Z$) in fourth plurality of qubits 2006*a* to their ground state. Further description can be found at act 902*b* of FIG. 9. At 2705, digital computer 102 causes a Hadamard gate (H-gate) to be applied to qubits $M_X$. Further description can be found at act 903 of FIG. 9.

At 2706, digital computer 102 causes a first SWAP gate to be applied between neighboring qubit 2101*a* (DA) and 2104*a* ($M_X$) coupled to defective coupler 2109*a* in first surface code layer 2001 and homologous qubits 2101*b* (DA) and 2104*b* ($M_X$) in second surface code layer 2002.

Acts 2707*a* and 2707*b* are executed by digital computer 102 in parallel or concurrently, or even simultaneously.

At 2707*a*, digital computer 102 causes a first CNOT gate to be applied to data qubits (DB) in second plurality of qubits 2004*a* as control qubits and to qubits $M_Z$ in fourth plurality of qubits 2006*a* as target qubits. Further description can be found at act 904*a* of FIG. 9.

At 2707*b*, digital computer 102 causes a second CNOT gate to be applied to data qubits (DA) in first plurality of qubits 2003*a* as target qubits and to qubits $M_X$ in third plurality of qubits 2005*a* as control qubits. Further description can be found at act 904*b* of FIG. 9. Given that defective coupler 2109*a* is in first plurality of couplers 2007*a* in first surface code layer 2001, the second CNOT gate uses qubit 2101*b* in second surface code layer 2002 as the target qubit and qubit 2104*b* in second surface code layer 2002 as the control qubit, instead of qubits 2101*a* and 2104*a*.

At 2708, digital computer 102 causes a second SWAP gate to be applied between qubit 2101*b* (DA) and 2104*b* ($M_X$) in second surface code layer 2002 and homologous qubits 2101*a* (DA) and 2104*a* ($M_X$) in first surface code layer 2002. Control of method 2700 then proceeds to second part 2700*b* of method 2700, illustrated in FIG. 27B.

Acts 2709*a* and 2709*b* are executed by digital computer 102 in parallel or concurrently, or even simultaneously.

At 2709*a*, digital computer 102 causes a third CNOT gate to be applied to data qubits DA in first plurality of qubits 2003*a* as control qubits and to qubits $M_Z$ as target qubits. Further description can be found at act 905*a* of FIG. 9.

At 2709*b*, digital computer 102 causes a fourth CNOT gate to be applied to data qubits DB in second plurality of qubits 2004*a* as target qubits and to qubits $M_X$ as control qubits. Further description can be found at act 905*b* of FIG. 9.

Acts 2710*a* and 2710*b* are executed by digital computer 102 in parallel or concurrently, or even simultaneously.

At 2710*a*, digital computer 102 causes a fifth CNOT gate to be applied to data qubits DA in first plurality of qubits 2003*a* as control qubits and to qubits $M_Z$ as target qubits. Further description can be found at act 906*a* of FIG. 9.

At 2710*b*, digital computer 102 causes a sixth CNOT gate to be applied to data qubits DB in second plurality of qubits 2004*a* as target qubits and to qubits $M_X$ as control qubits. Further description can be found at act 906*b* of FIG. 9.

Acts 2711*a* and 2711*b* are executed by digital computer 102 in parallel or concurrently, or even simultaneously.

At 2711*a*, digital computer 102 cause a seventh CNOT gate to be applied to data qubits DB in second plurality of qubits 2004*a* as control qubits and to qubits $M_Z$ as target qubits. Further description can be found at act 907*a* of FIG. 9.

At 2711*b*, digital computer 102 causes an eighth CNOT gate to be applied to data qubits DA in first plurality of qubits 2003*a* as target qubits and to qubits $M_X$ as control qubits. Further description can be found at act 907*b* of FIG. 9.

At 2712, digital computer 102 causes an H-gate to be applied to qubits $M_X$. Further description can be found at act 908 of FIG. 9.

Acts 2713*a* and 2713*b* are executed by digital computer 102 in parallel or concurrently, or even simultaneously.

At 2713*a*, digital computer 102 causes states of qubits $M_X$ to be read out. Further description can be found at act 909*a* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2713*b*, digital computer 102 causes states of qubits $M_Z$ to be read out. Further description can be found at act 909*b* of FIG. 9. In at least one implementation, a frequency multiplexing resonant readout (FMRR) is employed, as explained in U.S. Pat. No. 10,938,346. Further readout techniques that may be employed are described in U.S. Patent Application No. 63/448,537.

At 2714, method 2700 ends, until it is, for example, invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an quantum computer. The above described method(s), process (es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Patent Application No. 63/223,686; U.S. Pat. Nos. 10,938,346; 11,182,230. U.S. Provisional Patent Application No. 63/355,663; International Patent Application No PCT/US2022/037457; U.S. Provisional Application No. 63/448,414; International Application No. PCT/US2021/024134; U.S. Pat. Nos. 7,533,068, 7,843,209, U.S. Patent Application No. 63/448,537, U.S. Pat. Nos. 8,174,305, and 8,169,231.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system for scalable control, the system comprising:
- a first plurality of qubits;
- a second plurality of qubits;
- a third plurality of qubits;
- a fourth plurality of qubits, wherein the first, second, third and fourth plurality of qubits are arranged in a two-dimensional array, wherein at least one qubit in the first plurality of qubits and at least one qubit in the second plurality of qubits are each directly communicatively coupled to two respective qubits in the third plurality of qubits and to two respective qubits in the fourth plurality of qubits;
- a first set of analog lines, communicatively coupled to selectively provide analog signals to each of the qubits in the first plurality of qubits;
- a second set of analog lines, communicatively coupled to selectively provide analog signals to each of the qubits in the second plurality of qubits;
- a third set of analog lines, communicatively coupled to selectively provide analog signals to each of the qubits in the third plurality of qubits; and
- a fourth set of analog lines, communicatively coupled to selectively provide analog signals to each qubit in the fourth plurality of qubits.

2. The system of claim 1, further comprising:
- a first plurality of couplers, where each coupler of the first plurality of couplers directly communicatively couples either a respective qubit in the first plurality of qubits to a respective qubit in the third plurality of qubits or a respective qubit in the second plurality of qubits to a respective qubit in the third plurality of qubits; and
- a second plurality of couplers, where each coupler in the second plurality of couplers directly communicatively couples either a respective qubit in the first plurality of qubits to a respective qubit in the fourth plurality of qubits or a respective qubit in the second plurality of qubits to a respective qubit in the fourth plurality of qubits.

3. The system of claim 1, wherein each qubit in the first, second, third, and fourth pluralities of qubits is a respective fluxonium qubit.

4. The system of claim 3, wherein each fluxonium qubit comprises a respective kinetic inductor, the kinetic inductor comprising a segment of kinetic inductance material.

5. The system of claim 1, wherein each qubit in the first, second, third and fourth pluralities of qubits is a respective transmon qubit.

6. The system of claim 1, wherein: each qubit in the first and second pluralities of qubits is a respective data qubit; each qubit in the third and fourth pluralities of qubits is a respective stabilizer qubit; and each stabilizer qubit is operable to perform parity measurements on nearest-neighbor data qubits.

7. The system of claim 1, wherein each set of analog lines in the first, second, third and fourth sets of analog lines comprises a respective first very high frequency (VHF) control line.

8. The system of claim 7, wherein the first VHF control line in the first set of analog lines is inductively coupled to a qubit body of each qubit in the first plurality of qubits to control rotations about an axis in an XY-plane of a Bloch sphere; the first VHF control line in the second set of analog lines is inductively coupled to a qubit body of each qubit in the second plurality of qubits to control rotations about an axis in the XY-plane of the Bloch sphere; the first VHF control line in the third set of analog lines is inductively coupled to a qubit body of each qubit in the third plurality of qubits to control rotations about an axis in the XY-plane of the Bloch sphere; and the first VHF control line in the fourth set of analog lines is inductively coupled to a qubit body of each qubit in the fourth plurality of qubits to control rotations about an axis in the XY-plane of the Bloch sphere.

9. The system of claim 7, wherein each set of analog lines in the first, second, third and fourth sets of analog lines further comprises:
- a respective second VHF control line; and
- at least one respective analog bias line.

10. The system of claim 9, wherein the respective second VHF control line in the first set of analog lines is inductively coupled to a compound Josephson junction (CJJ) of each qubit in the first plurality of qubits to control rotations about a Z-axis of a Bloch sphere; the respective second VHF control line in the second set of analog lines is inductively coupled to a CJJ of each qubit in the second plurality of qubits to control rotations about the Z-axis of the Bloch sphere; the respective second VHF control line in the third set of analog lines is inductively coupled to a CJJ of each qubit in the third plurality of qubits to control rotations about the Z-axis of the Bloch sphere; and the respective second VHF control line in the fourth set of analog lines is inductively coupled to a CJJ of each qubit in the fourth plurality of qubits to control rotations about the Z-axis of the Bloch sphere.

11. The system of claim 9, wherein the at least one respective analog bias line in the first, second, third and fourth set of analog lines is inductively coupled to a respective compound-compound Josephson junction (CCJJ) in each qubit in the first, second, third and fourth pluralities of qubits.

12. The system of claim 1, wherein for each qubit in the first, second, third, and fourth pluralities of qubits the system further comprises:
- a respective first control structure communicatively coupled to a respective qubit body of each qubit in the first, second, third, and fourth pluralities of qubits, and operable to apply analog signals to the respective qubit body of each qubit in the first, second, third, and fourth pluralities of qubits from one of the first, second, third, and fourth sets of analog lines;
- a respective first digital to analog converter (DAC) communicatively coupled to a respective qubit body of each qubit in the first, second, third, and fourth pluralities of qubits and operable to apply static bias to the respective qubit body of each qubit in the first, second, third, and fourth pluralities of qubits;
- a respective second control structure communicatively coupled to a respective compound-compound Josephson junction (CCJJ) of each qubit in the first, second, third, and fourth pluralities of qubits and operable to apply analog signals to the respective CCJJ of each qubit in the first, second, third, and fourth pluralities of qubits from one of the first, second, third, and fourth sets of analog lines; and
- a respective second DAC communicatively coupled to a respective CCJJ of each qubit in the first, second, third, and fourth pluralities of qubits and operable to apply static bias to the respective CCJJ of each qubit in the first, second, third, and fourth pluralities of qubits.

13. A system for scalable control, the system comprising:

a first plurality of qubits;

a second plurality of qubits;

a third plurality of qubits;

a fourth plurality of qubits, wherein at least one qubit in the first plurality of qubits and at least one qubit in the second plurality of qubits are each directly communicatively coupled to two respective qubits in the third plurality of qubits and to two respective qubits in the fourth plurality of qubits;

a first plurality of couplers, each coupler in the first plurality of couplers directly communicatively couples either a respective one of the first plurality of qubits to a respective one of the third plurality of qubits or a respective one of the second plurality of qubits to a respective one of the third plurality of qubits;

a second plurality of couplers, each of the second plurality of couplers directly communicatively couples either a respective one of the first plurality of qubits to a respective one of the fourth plurality of qubits or a respective one of the second plurality of qubits to a respective one of the fourth plurality of qubits;

a first set of analog coupler lines, each line in the first set of analog coupler lines coupled to selectively provide a first analog signal to a respective coupler in a first subset of the second plurality of couplers;

a second set of analog coupler lines, each line in the second set of analog coupler lines coupled to selectively provide a second analog signal to a respective coupler in a second subset of the second plurality of couplers;

a third set of analog coupler lines, each line in the third set of analog coupler lines coupled to selectively provide a third analog signal to a respective coupler in a third subset of the second plurality of couplers;

a fourth set of analog coupler lines, each line in the fourth set of analog coupler lines coupled to selectively provide a fourth analog signal to a respective coupler in a fourth subset of the second plurality of couplers;

a fifth set of analog coupler lines, each line in the fifth set of analog coupler lines coupled to selectively provide a fifth analog signal to a respective coupler in a first subset of the first plurality of couplers;

a sixth set of analog coupler lines, each line in the sixth set of analog coupler lines coupled to selectively provide a sixth analog signal to a respective coupler in a second subset of the first plurality of couplers;

a seventh set of analog coupler lines, each line in the seventh set of analog coupler lines coupled to selectively provide a seventh analog signal to a respective coupler in a third subset of the first plurality of couplers; and an eighth set of analog coupler lines, each line in the eighth set of analog coupler lines coupled to selectively provide an eighth analog signal to a respective coupler in a fourth subset of the first plurality of couplers.

14. The system of claim 13, wherein each qubit in the first, second, third and fourth pluralities of qubits is a respective fluxonium qubit.

15. The system of claim 14, wherein each fluxonium qubit comprises a respective kinetic inductor, the kinetic inductor comprising a segment of kinetic inductance material.

16. The system of claim 13, wherein each qubit in the first, second, third and fourth pluralities of qubits is a respective transmon qubit.

17. The system of claim 13, wherein: each qubit in the first and second pluralities of qubits is a data qubit; and each qubit in the third and fourth pluralities of qubits is a stabilizer qubit, wherein each stabilizer qubit is operable to perform parity measurement on nearest-neighbor data qubits.

18. The system of claim 13, wherein each analog line in the first, second, third, fourth, fifth, sixth, seventh and eighth sets of analog coupler lines comprises a respective very high frequency (VHF) line.

19. The system of claim 18, wherein each VHF line in the first, second, third, fourth, fifth, sixth, seventh and eighth sets of analog coupler lines is operable to apply a control pulse with a low and a high operating level to a respective coupler in the first and second pluralities of couplers.

20. The system of claim 18, wherein each analog line in the first, second, third, fourth, fifth, sixth, seventh and eighth set of analog coupler lines further comprises at least one additional analog line.

21. The system of claim 13, wherein for each coupler in the first and second pluralities of couplers the system further comprises:

a respective first digital to analog converter (DAC) communicatively coupled to a respective coupler body of each coupler in the first and second pluralities of couplers and operable to apply a static bias to the respective coupler body of each coupler in the first and second pluralities of couplers;

a respective control structure communicatively coupled to a respective compound-compound Josephson junction (CCJJ) of each coupler in the first and second pluralities of couplers and operable to apply analog signals to the respective CCJJ of each coupler in the first and second pluralities of couplers from one of the first, second, third, fourth, fifth, sixth, seventh, and eighth sets of analog lines; and a respective second DAC communicatively coupled to a respective CCJJ of each coupler in the first and second pluralities of couplers and operable to apply static bias to the respective CCJJ of each coupler in the first and second pluralities of couplers.

22. A method to operate a quantum processor, the quantum processor comprising: a first plurality of qubits; a second plurality of qubits; a third plurality of qubits; fourth plurality of qubits, wherein at least one qubit in the first plurality of qubits and at least one qubit in the second plurality of qubits are directly communicatively coupled to two respective qubits in the third plurality of qubits and to two respective qubits in the fourth plurality of qubits; a first plurality of couplers, each coupler in the first plurality of couplers provides direct communicative coupling between either a respective one of the first plurality of qubits and a respective one of the third plurality of qubits or a respective one of the second plurality of qubits and a respective one of the third plurality of qubits; and a second plurality of couplers, each of the second plurality of couplers provides direct communicative coupling between either a respective one of the first plurality of qubits and a respective one of the fourth plurality of qubits or a respective one of the second plurality of qubits and a respective one of the fourth plurality of qubits; the method executed by a digital processor communicatively coupled to the quantum processor, the method comprising:

applying a pulse signal to qubits in the third and fourth pluralities of qubits to initialize the qubits in the third and fourth pluralities of qubits to a respective ground state of the qubits in the third and fourth pluralities of qubits;

applying a Hadamard transformation to qubits in the third plurality of qubits;

concurrently applying: a first CNOT gate using the qubits in the second plurality of qubits as a control and using qubits in the fourth plurality of qubits as a target, and a second CNOT gate using qubits in the first plurality of qubits as a target and the qubits in the third plurality of qubits as a control;

concurrently applying: a third CNOT gate using the qubits in the first plurality of qubits as a control and using qubits in the fourth plurality of qubits as a target, and a fourth CNOT gate using qubits in the second plurality of qubits as a target and the qubits in the third plurality of qubits as a control;

concurrently applying: a fifth CNOT gate using the qubits in the first plurality of qubits as a control and using qubits in the fourth plurality of qubits as a target, and a sixth CNOT gate using qubits in the second plurality of qubits as a target and the qubits in the third plurality of qubits as a control;

concurrently applying: a seventh CNOT gate using the qubits in the second plurality of qubits as a control and using qubits in the fourth plurality of qubits as a target, and an eighth CNOT gate using qubits in the first plurality of qubits as a target and the qubits in the third plurality of qubits as a control;

applying a Hadamard transformation to qubits in the third plurality of qubits; and reading out a respective state of each of the qubits in the third and fourth pluralities of qubits.

23. The method of claim 22, wherein the quantum processor further comprises:

a first set of analog lines, communicatively coupled to selectively provide a first analog signal to each qubit in the first plurality of qubits;

a second set of analog lines, communicatively coupled to selectively provide a second analog signal to each qubit in the second plurality of qubits;

a third set of analog lines, communicatively coupled to selectively provide a third analog signal to each qubit in the third plurality of qubits;

a fourth set of analog lines, communicatively coupled to selectively provide a fourth analog signal to each qubit in the fourth plurality of qubits;

a first set of analog coupler lines, each line in the first set of analog coupler lines communicatively coupled to selectively provide analog signals to a respective coupler in a first subset of the second plurality of couplers;

a second set of analog coupler lines, each line in the second set of analog coupler lines communicatively coupled to selectively provide analog signals to a respective coupler in a second subset of the second plurality of couplers;

a third set of analog coupler lines, each line in the third set of analog coupler lines communicatively coupled to selectively provide analog signals to a respective coupler in a third subset of the second plurality of couplers; and a fourth set of analog coupler lines, each line in the first set of analog coupler lines communicatively coupled to selectively provide analog signals to a respective coupler in a fourth subset of the second plurality of couplers, and wherein each set of analog lines in the first, second, third, and fourth sets of analog lines comprises a respective very high frequency (VHF) control line, and the method further comprises:

applying a signal to at least one qubit in the third and fourth pluralities of qubits to initialize the at least one qubit in the third and fourth plurality of qubits to a respective ground state of the at least one qubit in the third and fourth plurality of qubits includes:

applying a large-amplitude tilt to a respective qubit body of the at least one qubit in the third and fourth pluralities of qubits via a respective first VHF control line, wherein applying a signal to the at least one qubit in the third plurality of qubits includes applying a very high frequency signal to a qubit body of the at least one qubit in the third plurality of qubits via a respective VHF control line.

24. The method of claim 23, wherein the quantum processor further comprises:

a fifth set of analog coupler lines, each line in the fifth set of analog coupler lines communicatively coupled to selectively provide analog signals to a respective coupler in a first subset of the first plurality of couplers;

a sixth set of analog coupler lines, each line in the sixth set of analog coupler lines communicatively coupled to selectively provide analog signals to a respective coupler in a second subset of the first plurality of couplers;

a seventh set of analog coupler lines, each line in the seventh set of analog coupler lines communicatively coupled to selectively provide analog signals to a respective one coupler in a third subset of the first plurality of couplers; and an eighth set of analog coupler lines, each line in the eighth set of analog coupler lines communicatively coupled to selectively provide analog signals to a respective coupler in a fourth subset of the first plurality of couplers, wherein each analog line in the first through eighth sets of analog coupler lines comprises a respective VHF line, and the method further comprises:

concurrently applying: a first CNOT gate using the qubits in the second plurality of qubits as a control and using the qubits in the fourth plurality of qubits as a target, and a second CNOT gate using the qubits in the first plurality of qubits as a target and the qubits in the third plurality of qubits as a control includes: applying a very high frequency signal to the couplers in the first plurality of couplers via a VHF line in the fifth set of analog coupler lines, and applying a very high frequency signal to the couplers in the second plurality of couplers via a VHF line in the first set of analog coupler lines.

25. The method of claim 24, wherein concurrently applying: a third CNOT gate using the qubits in the first plurality of qubits as a control and using the qubits in the fourth plurality of qubits as a target, and a fourth CNOT gate using the qubits in the second plurality of qubits as a target and the qubits in the third plurality of qubits as a control includes: applying a very high frequency signal to the couplers in the first plurality of couplers via a VHF line in the sixth set of analog coupler lines, and applying a very high frequency signal to the couplers in the second plurality of couplers via a VHF line in the second set of analog coupler lines.

26. The method of claim 24, wherein concurrently applying: a fifth CNOT gate using the qubits in the first plurality of qubits as a control and using the qubits in the fourth plurality of qubits as a target, and a sixth CNOT gate using the qubits in the second plurality of qubits as a target and the qubits in the third plurality of qubits as a control includes: applying a very high frequency signal to the couplers in the first plurality of couplers via a VHF line in the seventh set of analog coupler lines, and applying a very high frequency signal to the couplers in the second plurality of couplers via a VHF line in the third set of analog coupler lines.

27. The method of claim 24, wherein concurrently applying: a seventh CNOT gate using the qubits in the second plurality of qubits as a control and using the qubits in the fourth plurality of qubits as a target, and an eighth CNOT gate using the qubits in the first plurality of qubits as a target and the qubits in the third plurality of qubits as a control includes: applying a very high frequency signal to the couplers in the first plurality of couplers via a VHF line in the eighth set of analog coupler lines, and applying a very high frequency signal to the couplers in the second plurality of couplers via a VHF line in the fourth set of analog coupler lines.

28. A quantum processor comprising one or more quantum logic units, each quantum logic unit respectively comprising:

- a plurality of physical qubits;
- a plurality of couplers, each coupler providing controllable coupling between a pair of physical qubits of the plurality of physical qubits;
- a plurality of logical qubits, each logical qubit comprising a subset of the physical qubits of the plurality of physical qubits coupled together, at least one logical qubit of the plurality of logical qubits comprising one or more 2-local interaction registers;
- a shift register comprising one or more logical qubits of the plurality of logical qubits; and
- a plurality of merge blocks connecting two or more adjacent logical qubits of the plurality of logical qubits;
- wherein the shift register is selectively communicatively coupled to the one or more 2-local interaction registers by a merge block of the plurality of merge blocks.

29. The quantum processor of claim 28, wherein each logical qubit comprises one or more control lines that provide a shared control bias to the at least a subset of the physical qubits in the respective logical qubit.

30. The quantum processor of claim 28, wherein the shift register comprises a plurality of logical qubits selectively coupled by one or more merge blocks of the plurality of merge blocks.

31. The quantum processor of claim 28, wherein each merge block of the plurality of merge blocks contains at least one line of physical qubits.

32. The quantum processor of claim 31, wherein each merge block comprises one or more control lines that provide a shared control bias to the at least one line of physical qubits.

33. The quantum processor of claim 28, wherein the plurality of physical qubits comprises data qubits and error measurement qubits.

34. The quantum processor of claim 33, wherein, in use, the data qubits contain quantum computation information, and the measurement qubits comprise parity enforcers.

35. The quantum processor of claim 28, further comprising a memory block in communication with the shift register.

36. The quantum processor of claim 28, wherein the one or more 2-local interaction registers connect the shift register and one or more memory blocks.

37. The quantum processor of claim 28, wherein the one or more 2-local interaction registers provide XX, XY, XZ, YY, YZ, and ZZ interactions.

38. The quantum processor of claim 37, wherein the one or more 2-local interaction registers that provide XY, XZ, YY, and YZ interactions comprise rectangular logical qubits with mixed boundary conditions.

39. The quantum processor of claim 37, wherein the one or more 2-local interaction registers that provide XX and ZZ interactions connect shift register stages to one another and connect shift register stages to one or more memory blocks.

40. The quantum processor of claim 39, wherein the 2-local interaction registers that provide XX and ZZ interactions comprise merge blocks of the plurality of merge blocks.

41. The quantum processor of claim 28, wherein, in use, the quantum processor further comprises at least one error-corrected single qubit operation block that is not in a Clifford group.

42. The quantum processor of claim 41, wherein the at least one error-corrected single qubit operation block comprises a magic state distillation module.

43. The quantum processor of claim 28, wherein the quantum processor comprises two or more communicatively coupled quantum logic units.

44. A method of operation in a quantum processor, the method comprising:

- inducing a signal in one or more target data blocks control lines to initialize a target data block, the target data block comprising a first set of one or more logical qubits, the target data block being nominally empty;
- inducing a signal in one or more merge block control lines to activate a merge block, the merge block comprising at least one line of physical qubits, the merge block connecting the target data block to a source data block, the source data block comprising a second set of one or more logical qubits and containing data;
- running a plurality of surface code cycles over the target data block, the merge block, and the source data block to move data from the source data block to the target data block through the merge block; and
- measuring the second set of logical qubits comprising the source data block and the at least one line of physical qubits comprising the merge block.

45. The method of claim 44, wherein running a plurality of surface code cycles comprises running d surface code cycles, wherein d comprises a minimum number of data qubits that must be simultaneously bit or phase flipped to realize either a logical X operation or a logical Z operation.

46. The method of claim 44, wherein the data is moved across a Z-edge to perform a merge operation corresponding to a ZZ measurement, wherein, to perform the merge operation the method includes:

- inducing a signal in one or more target data blocks control lines to initialize a target data block comprises inducing the signal in the one or more target data blocks control lines to initialize the first set of one or more logical qubits in a $|+\rangle$ state;
- inducing a signal in one or more merge block control lines to activate a merge block comprises inducing the signal in the one or more merge block control lines to initialize the at least one line of physical qubits of the merge block in a $|+\rangle$ state; and
- measuring the second set of logical qubits comprising the source data block and the at least one line of physical qubits comprising the merge block comprises measuring the second set of logical qubits comprising the source data block and the at least one line of physical qubits comprising the merge block in an X basis.

47. The method of claim 44, wherein the data is moved across a X-edge to perform a merge operation corresponding to a XX measurement, wherein, to perform the merge operation the method includes:

inducing a signal in one or more target data blocks control lines to initialize a target data block comprises inducing the signal in the one or more target data blocks control lines to initialize the first set of one or more logical qubits in a |0⟩ state;

inducing a signal in one or more merge block control lines to activate a merge block comprises inducing the signal in the one or more merge block control lines to initialize the at least one line of physical qubits of the merge block in a |0⟩ state; and measuring the second set of logical qubits comprising the source data block and the at least one line of physical qubits comprising the merge block comprises measuring the second set of logical qubits comprising the source data block and the at least one line of physical qubits comprising the merge block in a Z basis.

48. The method of claim 44, further comprising measuring one or more logical qubits of the first set of logical qubits, the one or more logical qubits having not received any of the data.

49. The method of claim 44, wherein inducing a signal in one or more target data block control lines to initialize a target data block comprises inducing the signal in a shift register, the shift register comprising the one or more target data blocks.

50. The method of claim 44, wherein inducing a signal in one or more target data block control lines to initialize a target data block comprises inducing the signal in a 2-local interaction register, the 2-local interaction register comprising the one or more target data blocks.

51. The method of claim 50, wherein inducing a signal in a 2-local interaction register comprises inducing the signal in one of a XX, XY, XZ, YY, YZ, and ZZ interaction register.

52. A quantum processor comprising:

a first surface code layer;

a second surface code layer, wherein each of the first and the second surface code layer respectively comprises:

a first plurality of qubits;

a second plurality of qubits;

a third plurality of qubits;

a fourth plurality of qubits, wherein the first, second, third and fourth plurality of qubits are arranged in a two-dimensional array; and a plurality of inter-layer couplers; wherein each coupler in the plurality of inter-layer couplers directly communicatively couples one of: a respective one qubit in the first plurality of qubits in the first surface code layer and a respective one qubit in the first plurality of qubits in the second surface code layer; a respective one qubit in the second plurality of qubits in the first surface code layer and a respective one qubit in the second plurality of qubits in the second surface code layer; a respective one qubit in the third plurality of qubits in the first surface code layer and a respective one qubit in the third plurality of qubits in the second surface code layer; and or a respective one qubit in the fourth plurality of qubits in the first surface code layer and a respective one qubit in the fourth plurality of qubits in the second surface code layer.

53. The quantum processor of claim 52, further comprising:

a first plurality of couplers, each coupler of the first plurality of couplers providing communicative coupling between either a respective one qubit in the first plurality of qubits and a respective one qubit in the third plurality of qubits or a respective one qubit in the second plurality of qubits and a respective one qubit in the third plurality of qubits; and a second plurality of couplers, each coupler in the second plurality of couplers providing communicative coupling between either a respective one qubit in the first plurality of qubits and a respective one qubit in the fourth plurality of qubits or a respective one qubit in the second plurality of qubits and a respective one qubit in the fourth plurality of qubits.

54. The quantum processor of claim 53, wherein each of the first and the second surface code layer further respectively comprises:

a first set of analog coupler lines, each line in the first set of analog coupler lines operable to transmit an analog signal to a respective one coupler in a first subset of the second plurality of couplers;

a second set of analog coupler lines, each line in the second set of analog coupler lines operable to transmit an analog signal to a respective one coupler in a second subset of the second plurality of couplers;

a third set of analog coupler lines, each line in the third set of analog coupler lines operable to transmit an analog signal to a respective one coupler in a third subset of the second plurality of couplers;

a fourth set of analog coupler lines, each line in the first set of analog coupler lines operable to transmit an analog signal to a respective one coupler in a fourth subset of the second plurality of couplers;

a fifth set of analog coupler lines, each line in the fifth set of analog coupler lines operable to transmit an analog signal to a respective one coupler in a first subset of the first plurality of couplers;

a sixth set of analog coupler lines, each line in the sixth set of analog coupler lines operable to transmit an analog signal to a respective one coupler in a second subset of the first plurality of couplers;

a seventh set of analog coupler lines, each line in the seventh set of analog coupler lines operable to transmit an analog signal to a respective one coupler in a third subset of the first plurality of couplers; and an eighth set of analog coupler lines, each line in the eighth set of analog coupler lines operable to transmit an analog signal to a respective one coupler in a fourth subset of the first plurality of couplers.

55. The quantum processor of claim 54, wherein each line in the first the second, the third, the fourth, the fifth, the sixth, the seventh, and the eighth set of analog coupler lines comprises a respective very high frequency (VHF) line.

56. The quantum processor of claim 52, wherein each qubit in the first and the second plurality of qubits in the first and the second surface code layer is a respective data qubit; and each qubit in the third and fourth plurality of qubit in the first and the second surface code layer is a respective stabilizer qubit, and each qubit in the third and fourth plurality of qubits in the first and the second surface code layer is operable to perform parity measurements on nearest-neighbor data qubits.

57. The quantum processor of claim 52, wherein each of the first and the second surface code layer further comprises:

a first set of analog lines, selectively communicatively coupled to each of the qubits in the first plurality of qubits to transmit analog signals to each of the qubits in the first plurality of qubits;

a second set of analog lines, selectively communicatively coupled to each of the qubits in the second plurality of qubits to transmit analog signals to each of the qubits in the second plurality of qubits;

a third set of analog lines, selectively communicatively coupled to each of the qubits in the third plurality of qubits to transmit analog signals to each of the qubits in the third plurality of qubits; and a fourth set of analog lines, selectively communicatively coupled to each qubit in the fourth plurality of qubits to transmit analog signals to each qubit in the fourth plurality of qubits.

58. The quantum processor of claim 57 wherein each set of analog lines in the first, the second, the third and the fourth set of analog lines comprises a respective time-dependent control line.

59. The quantum processor of claim 52, further comprising:

a first inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer;

a second inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer;

a third inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer;

a fourth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer;

a fifth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer;

a sixth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer;

a seventh inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; and an eighth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer;

and wherein each coupler in the plurality of inter-layer couplers further comprises four adiabatic quantum-flux-parametrons (aQFP) switches, wherein the aQFP switches selectively control communicative coupling of the inter-layer coupler to qubits of the first and the second surface code layers.

60. The quantum processor of claim 59, wherein each of the first, the second, the third, the fourth, the fifth, the sixth, the seventh, and the eighth inter-layer coupler control line is a respective VHF line.

61. A method to operate a quantum processor, the quantum processor comprising a first surface code layer and a second surface code layer, wherein each of the first and second surface code layer comprises: a first plurality of qubits; a second plurality of qubits; a third plurality of qubits; fourth plurality of qubits, wherein a respective qubit in the first plurality of qubits and a respective qubit in the second plurality of qubits are each directly communicatively coupled to two respective qubits in the third plurality of qubits and to two respective qubits in the fourth plurality of qubits; and a plurality of inter-layer couplers; wherein each coupler of the plurality of inter-layer couplers directly communicatively couples one of a qubit in the first surface code layer and a respective homologous qubit in the second surface code layer, the quantum processor having at least one defective qubit in the first surface code layer the method executed by a digital processor communicatively coupled to the quantum processor, the method comprising:

deactivating the defective qubit in the first surface code layer;

activating the homologous qubit in the second surface code layer by activating inter-layer couplers between qubits in the first surface code layer directly communicatively coupled to the defective qubit and the homologous qubits in the second surface code layer;

performing a surface code computation; and reading out a respective state of the qubits in the third and fourth plurality of qubits.

62. The method of claim 61, wherein each of the first and second surface code layer further comprises a respective first plurality of couplers, each coupler in the first plurality of couplers directly communicatively couples either a respective one of the first plurality of qubits and a respective one of the third plurality of qubits or a respective one of the second plurality of qubits and a respective one of the third plurality of qubits; and a second plurality of couplers, each of the second plurality of couplers directly communicatively couples either a respective one of the first plurality of qubits and a respective one of the fourth plurality of qubits or a respective one of the second plurality of qubits and a respective one of the fourth plurality of qubits and wherein deactivating the defective qubit in the first surface code layer comprises:

deactivating couplers in the first and second plurality of couplers between the at least one defective qubit in the first plurality of qubits and qubits in the third and the fourth plurality of qubits in the first surface code layer directly communicatively coupled to the at least one defective qubit; and activating the homologous qubit in the second surface code layer comprises:

activating inter-layer couplers between the qubits in the third and the fourth plurality of qubits in the first surface code layer that are directly communicatively coupled to the at least one defective qubit in the first plurality of qubits and respective qubits in the third and fourth plurality of qubits in the second surface code layer; and activating couplers in the first and the second plurality of couplers in the second surface code layer between qubits in the third and the fourth plurality of qubits that are coupled to an activated inter-layer couplers and a corresponding working qubit in the first plurality of qubits coupled thereto in the second surface code layer.

63. The method of claim 62, wherein performing a surface code computation comprises:

applying a signal to the qubits in the third and the fourth plurality of qubits in the first surface code layer to initialize ground states of the qubits in the third and the fourth plurality of qubits;

applying a Hadamard transformation to the qubits in the third plurality of qubits in the first surface code layer;

for a first one of the qubits in the third plurality of qubits in the first surface code layer coupled to an activated inter-layer coupler, applying a first SWAP gate between the first one of the qubits in the third plurality of qubits in the first surface code layer and a respective first qubit in the third plurality of qubits in the second surface code layer;

concurrently applying:

a first CNOT gate, wherein the qubits in the second plurality of qubits in the first surface code layer are controls and the qubits in the fourth plurality of qubits in the first surface code layer are targets;

and a second CNOT gate, wherein the qubits in the first plurality of qubits in the first surface code layer and the corresponding working qubit in the first plurality of qubits in the second surface code layer are targets and the qubits in the third plurality in the of qubits in the first surface code layer and the first qubits in the third plurality of qubits in the second surface code layer are controls;

applying a second SWAP gate between the first one of the qubits in the third plurality of qubits in the first surface code layer coupled to the activated inter-layer coupler and the respective first qubit in the third plurality of qubits in the second surface code layer;

for a first one of the qubits in the fourth plurality of qubits coupled to an activated inter-layer coupler, applying a third SWAP gate between the first one of the qubits in the fourth plurality of qubits in the first surface code layer and a respective first qubit in the fourth plurality of qubits in the second surface code layer;

concurrently applying:

a third CNOT gate, wherein the qubits in the first plurality of qubits in the first surface code layer and the corresponding working qubit in the first plurality of qubits in the second surface code layer are controls and the qubits in the fourth plurality of qubits in the first surface code layer and the first qubit in the fourth plurality of qubits in the second surface code layer are targets; and a fourth CNOT gate, wherein the qubits in the second plurality of qubits in the first surface code layer are targets and the qubits in the third plurality of qubits in the first surface code layer are controls;

applying a fourth SWAP gate between the first one of the qubits in the fourth plurality of qubits in the first surface code layer coupled to the activated inter-layer coupler and the respective first qubit in the fourth plurality of qubits in the second surface code layer;

for a second one of the qubits in the fourth plurality of qubits coupled to an activated inter-layer coupler, applying a fifth SWAP gate between the qubit in the fourth plurality of qubits in the first surface code layer and a respective second qubit in the fourth plurality of qubits in the second surface code layer;

concurrently applying:

a fifth CNOT gate, wherein the qubits in the first plurality of qubits in the first surface code layer and the corresponding working qubit in the first plurality of qubits in the second surface code layer are controls and the qubits in the fourth plurality of qubits in the first surface code layer and the second qubit in the fourth plurality of qubits in the second surface code layer are targets; and a sixth CNOT gate, wherein the qubits in the second plurality of qubits in the first surface code layer are targets and the qubits in the third plurality of qubits in the first surface code layer are controls;

applying a sixth SWAP gate between the second one of the qubits in the fourth plurality of qubits in the first surface code layer coupled to the activated inter-layer coupler and the respective second qubit in the fourth plurality of qubits in the second surface code layer;

for a second one of the qubits in the third plurality of qubits coupled to an activated inter-layer coupler, applying a seventh SWAP gate between the second qubit in the third plurality of qubits in the first surface code layer and a respective second qubit in the third plurality of qubits in the second surface code layer;

concurrently applying:

a seventh CNOT gate, wherein the qubits in the first plurality of qubits in the first surface code layer are controls and the qubits in the fourth plurality of qubits in the first surface code layer are targets; and an eighth CNOT gate, wherein the qubits in the second plurality of qubits in the first surface code layer and the corresponding working qubit in the first plurality of qubits in the second surface code layer are targets and the qubits in the third plurality of qubits in the first surface code layer and the second qubit in the third plurality of qubits in the second surface code layer are controls;

applying an eighth SWAP gate between the second one of the qubits in the third plurality of qubits in the first surface code layer coupled to the activated inter-layer coupler and the respective second qubit in the third plurality of qubits in the second surface code layer; and applying a Hadamard transformation to the qubits in the third plurality of qubits.

64. The method of claim 63, wherein the quantum processor further comprises, for each of the first and the second surface code layer, a first set of analog lines, selectively communicatively coupled to qubits in the first plurality of qubits to transmit an analog signal to each of the qubits in the first plurality of qubits; a second set of analog lines, selectively communicatively coupled to qubits in the second plurality of qubits to transmit an analog signal to each of the qubits in the second plurality of qubits; a third set of analog lines, selectively communicatively coupled to qubits in the third plurality of qubits to transmit an analog signal to each of the qubits in the third plurality of qubits; a fourth set of analog lines, selectively communicatively coupled to qubits in the fourth plurality of qubits to transmit an analog signal to each qubits in the fourth plurality of qubits; and wherein applying a signal to the qubits in the third and the fourth plurality of qubits to initialize ground states of the qubits in the third and the fourth plurality of qubits includes applying a large-amplitude tilt to a respective qubit body of each of the qubit in the third and the fourth plurality of qubits via a respective line of a respective one of the third and the fourth set of analog lines, and applying a Hadamard transformation to the qubits in the third plurality of qubits includes applying the Hadamard transformation to the qubits in the third plurality of qubits via the third set of analog lines.

65. The method of claim 61, wherein each of the first and the second surface code layer of the quantum processor further comprises: a first set of analog coupler lines, each line in the first set of analog coupler lines operable to transmit an analog signal to a respective one coupler in a first subset of the second plurality of couplers; a second set of analog coupler lines, each line in the second set of analog coupler lines operable to transmit an analog signal to a respective one coupler in a second subset of the second plurality of couplers; a third set of analog coupler lines, each line in the third set of analog coupler lines operable to transmit an analog signal to a respective one coupler in a third subset of the second plurality of couplers; a fourth set of analog coupler lines, each line in the first set of analog coupler lines operable to transmit an analog signal to a respective one coupler in a fourth subset of the second plurality of couplers; a fifth set of analog coupler lines, each line in the fifth set of analog coupler lines operable to transmit an analog signal to a respective one coupler in a first subset of the first plurality of couplers; a sixth set of analog coupler lines, each line in the sixth set of analog coupler lines operable to transmit an analog signal to a respective one coupler in a second subset of the first plurality of couplers; a seventh set of analog coupler lines, each line in the seventh set of analog coupler lines operable to transmit an analog signal to a respective one coupler in a third subset of the first plurality of couplers; and an eighth set of analog coupler lines, each line in the eighth set of analog coupler lines operable to transmit analog signal to a respective one coupler in a fourth subset of the first plurality of couplers; and, wherein concurrently applying a first CNOT gate and a second CNOT gate includes applying a very high frequency signal to the couplers in the first plurality of couplers via a very high frequency (VHF) line in the fifth set of analog coupler lines and applying a very high frequency signal to the couplers in the second plurality of couplers via a VHF line in the first set of analog coupler lines.

66. The method of claim 65, wherein concurrently applying a third CNOT gate and a fourth CNOT gate includes applying a very high frequency signal to the couplers in the first plurality of couplers via the VHF line in the sixth set of analog coupler lines, and applying a very high frequency signal to the couplers in the second plurality of couplers via the VHF line in the second set of analog coupler lines.

67. The method of claim 65, wherein concurrently applying a fifth CNOT gate and a sixth CNOT gate includes applying a very high frequency signal to the couplers in the first plurality of couplers via the VHF line in the seventh set of analog coupler lines, and applying a very high frequency signal to the couplers in the second plurality of couplers via the VHF line in the third set of analog coupler lines.

68. The method of claim 65, wherein concurrently applying a seventh CNOT gate and an eighth CNOT gate includes applying a very high frequency signal to the couplers in the first plurality of couplers via the VHF line in the eighth set of analog coupler lines, and applying a very high frequency signal to the couplers in the second plurality of couplers via the VHF line in the fourth set of analog coupler lines.

69. The method of claim 61, wherein the quantum processor further comprises a first inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a second inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a third inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the third plurality of qubits in the first surface code layer and qubits in the third plurality of qubits in the second surface code layer; a fourth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the third plurality of qubits in the first surface code layer and qubits in the third plurality of qubits in the second surface code layer; a fifth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer; a sixth inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; a seventh inter-layer coupler control line, operable to transmit analog signals to inter-layer couplers between qubits in the first plurality of qubits in the first surface code layer and qubits in the first plurality of qubits in the second surface code layer and to transmit analog signals to inter-layer couplers between qubits in the fourth plurality of qubits in the first surface code layer and qubits in the fourth plurality of qubits in the second surface code layer; an eighth inter-layer coupler control line, operable to transmit analog signals to inter-layer couplers between qubits in the second plurality of qubits in the first surface code layer and qubits in the second plurality of qubits in the second surface code layer and to transmit analog signals to inter-layer couplers between qubits in the fourth plurality of qubits in the first surface code layer and qubits in the fourth plurality of qubits in the second surface code layer; and wherein each coupler in the plurality of inter-layer couplers further comprises four adiabatic quantum-flux-parametrons (aQFP) switches, wherein the aQFPs selectively control communicative coupling control of the inter-layer coupler to qubits of the first and the second surface code layers; and wherein activating inter-layer couplers between the qubits in the third plurality of qubits in the first surface code layer that are directly communicatively coupled to the at least one defective qubit in the first plurality of qubits and the qubits in the third plurality of qubits in the second surface code layer and activating inter-layer couplers between the qubits in the fourth plurality of qubits in the first surface code layer that are directly communicatively coupled to the at least one defective qubit in the first plurality of qubits and the qubits in the fourth plurality of qubits in the second surface code layer comprises transmitting analog signals to the inter-layer couplers via the first, the second, the third, the fourth, the fifth, the sixth, the seventh and the eighth inter-layer coupler control lines and aQFP switches.

* * * * *